United States Patent
Tsukuba et al.

(10) Patent No.: US 10,136,151 B2
(45) Date of Patent: *Nov. 20, 2018

(54) IMAGE DECODING DEVICE AND IMAGE DECODING METHOD

(71) Applicant: Sharp Kabushiki Kaisha, Sakai, Osaka (JP)

(72) Inventors: Takeshi Tsukuba, Sakai (JP); Tomoyuki Yamamoto, Sakai (JP); Tomohiro Ikai, Sakai (JP); Yukinobu Yasugi, Sakai (JP); Sachin G. Deshpande, Camas, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/856,124

(22) Filed: Dec. 28, 2017

(65) Prior Publication Data

US 2018/0139465 A1    May 17, 2018

Related U.S. Application Data

(63) Continuation of application No. 14/431,405, filed as application No. PCT/JP2013/074726 on Sep. 12, 2013, now Pat. No. 9,894,373.

(60) Provisional application No. 61/707,714, filed on Sep. 28, 2012.

(51) Int. Cl.
| H04N 19/187 | (2014.01) |
| H04N 19/44 | (2014.01) |
| H04N 19/463 | (2014.01) |
| H04N 19/46 | (2014.01) |
| H04N 19/70 | (2014.01) |
| H04N 19/30 | (2014.01) |
| H04N 19/90 | (2014.01) |

(52) U.S. Cl.
CPC .......... *H04N 19/44* (2014.11); *H04N 19/187* (2014.11); *H04N 19/30* (2014.11); *H04N 19/46* (2014.11); *H04N 19/463* (2014.11); *H04N 19/70* (2014.11); *H04N 19/90* (2014.11)

(58) Field of Classification Search
CPC ...... H04N 19/44; H04N 19/70; H04N 19/463; H04N 19/46; H04N 19/30; H04N 19/187
See application file for complete search history.

(56) References Cited

U.S. PATENT DOCUMENTS

| 2004/0107356 A1* | 6/2004 | Shamoon ............ H04L 63/0428 713/193 |
| 2004/0196905 A1* | 10/2004 | Yamane ................. H04N 19/89 375/240.12 |
| 2012/0128151 A1* | 5/2012 | Boehm ............ G11B 20/00086 380/42 |

(Continued)

OTHER PUBLICATIONS

Tsukuba et al., "Image Decoding Device", U.S. Appl. No. 14/431,405, filed Mar. 26, 2015.

(Continued)

*Primary Examiner* — Robert J Hance
(74) *Attorney, Agent, or Firm* — Keating & Bennett, LLP

(57) ABSTRACT

An image decoding device is equipped with a header information decoding means for decoding profile/level information included in a video parameter set after decoding byte-aligned 16-bit extension information (next_essential_info_byte_offset) in the video parameter set.

2 Claims, 31 Drawing Sheets

(56) References Cited

U.S. PATENT DOCUMENTS

2014/0003493 A1* 1/2014 Chen .................... H04N 19/597
            375/240.02
2014/0022343 A1* 1/2014 Chen ..................... H04N 19/70
            348/43
2014/0086334 A1* 3/2014 Haque ................... H04N 19/30
            375/240.25

OTHER PUBLICATIONS

Tsukuba et al., "Image Decoding Device", U.S. Appl. No. 14/431,401, filed Mar. 26, 2015.

* cited by examiner

VIDEO PARAMETER SET RBSP SYNTAX

| video_parameter_set_rbsp() { | Descriptor |
|---|---|
| video_parameter_set_id | u(4) |
| vps_temporal_id_nesting_flag | u(1) |
| vps_reserved_zero_2bits | u(2) |
| vps_reserved_zero_6bits // vps_max_num_layers_minus1 | u(6) |
| vps_max_sub_layers_minus1 | u(3) |
| profile_tier_level(1, vps_max_sub_layers_minus1) | |
| vps_reserved_zero_12bits // next_essential_info_byte_offset | u(12) |
| ... | |
| } | |

(b)

SEQUENCE PARAMETER SET RBSP SYNTAX

| seq_parameter_set_rbsp() { | Descriptor |
|---|---|
| video_parameter_set_id | u(4) |
| sps_max_sub_layers_minus1 | u(3) |
| sps_reserved_zero_bit | u(1) |
| profile_tier_level(1, sps_max_sub_layers_minus1) | |
| seq_parameter_set_id | ue(v) |
| ... | |
| } | |

(c)

NAL UNIT HEADER SYNTAX

| nal_unit_header() { | Descriptor |
|---|---|
| forbidden_zero_bit | f(1) |
| nal_unit_type | u(6) |
| nuh_reserved_zero_6bits // nuh_layer_id | u(6) |
| nuh_temporal_id_plus1 | u(3) |
| } | |

FIG. 11

《PROFILE, TIER AND LEVEL SYNTAX》

| profile_tier_level(ProfilePresentFlag, MaxNumSubLayers) { | Descriptor |
|---|---|
|   if(ProfilePresentFlag) { | |
|     general_profile_space | u(2) |
|     general_tier_flag | u(1) |
|     general_profile_idc | u(5) |
|     for(i=0;i < 32;i++) | |
|       general_profile_compatibility_flag[i] | u(1) |
|     general_reserved_zero_16bits | u(16) |
|   } | |
|   general_level_idc | u(8) |
|   for(i=0;i < MaxNumSubLayers - 1;i++) { | |
|     sub_layer_profile_present_flag[i] | u(1) |
|     sub_layer_level_present_flag[i] | u(1) |
|   } | |
|   While(!byte_aligned()) | |
|     alignment_bit | f(1) |
|   for(i=0;1 < MaxNumSubLayers - 1;i++) { | |
|     ~~sub_layer_profile_present_flag[i]~~ | ~~u(1)~~ |
|     ~~sub_layer_level_present_flag[i]~~ | ~~u(1)~~ |
|     if(ProfilePresentFlag && sub_layer_profile_present_flag[i]) { | |
|       sub_layer_profile_space[i] | u(2) |
|       sub_layer_tier_flag[i] | u(1) |
|       sub_layer_profile_idc[i] | u(5) |
|       for(j=0;j < 32;j++) | |
|         sub_layer_profile_compatibility_flag[i][j] | u(1) |
|       sub_layer_reserved_zero_16bits[i] | u(16) |
|     } | |
|     if(sub_layer_level_present_flag[i]) | |
|       sub_layer_level_idc[i] | u(8) |
|   } | |
| } | |

SYNA 101 (general profile section)
SYNA 102 (sub_layer present flags through alignment)
SYNA 103 (sub_layer details)
SYNA 104 

《PROFILE, TIER AND LEVEL SYNTAX》  FIG. 13

| profile_tier_level(ProfilePresentFlag, MaxNumSubLayers) { | Descriptor |
|---|---|
| if(ProfilePresentFlag) { | |
|   general_profile_space | u(2) |
|   general_tier_flag | u(1) |
|   general_profile_idc | u(5) |
|   for(i=0;i < 32;i++) | |
|     general_profile_compatibility_flag[i] | u(1) |
|   general_reserved_zero_16bits | u(16) |
| } | |
| general_level_idc | u(8) |
| if(ProfilePresentFlag) { | |
|   for(i=0; i < MaxNumSubLayers - 1;i++) { | |
|     sub_layer_profile_present_flag[i] | u(1) |
|   } | |
|   While(!byte_aligned()) | |
|     alignment_bit | f(1) |
| } | |
| for(i=0; 1 < MaxNumSubLayers - 1;i++) { | |
|   sub_layer_level_present_flag[i] | u(1) |
| } | |
| While(!byte_aligned()) | |
|   alignment_bit | f(1) |
| for(i=0;i < MaxNumSubLayers - 1;i++) { | |
|   ~~sub_layer_profile_present_flag[i]~~ | ~~u(1)~~ |
|   ~~sub_layer_level_present_flag[i]~~ | ~~u(1)~~ |
|   if(ProfilePresentFlag && sub_layer_profile_present_flag[i]) { | |
|     sub_layer_profile_space[i] | u(2) |
|     sub_layer_tier_flag[i] | u(1) |
|     sub_layer_profile_idc[i] | u(5) |
|     for(j=0;j < 32;j++) | |
|       sub_layer_profile_compatibility_flag[i][j] | u(1) |
|     sub_layer_reserved_zero_16bits[i] | u(16) |
|   } | |
|   if(sub_layer_level_present_flag[i]) | |
|     sub_layer_level_idc[i] | u(8) |
| } | |
| } | |

SYNA 201 brackets: if(ProfilePresentFlag) block through first While alignment_bit.
SYNA 203 brackets: While(!byte_aligned()) alignment_bit (first).
SYNA 202 brackets: for(i=0; 1 < MaxNumSubLayers - 1;i++) block through second While alignment_bit.
SYNA 204 brackets: While(!byte_aligned()) alignment_bit (second).

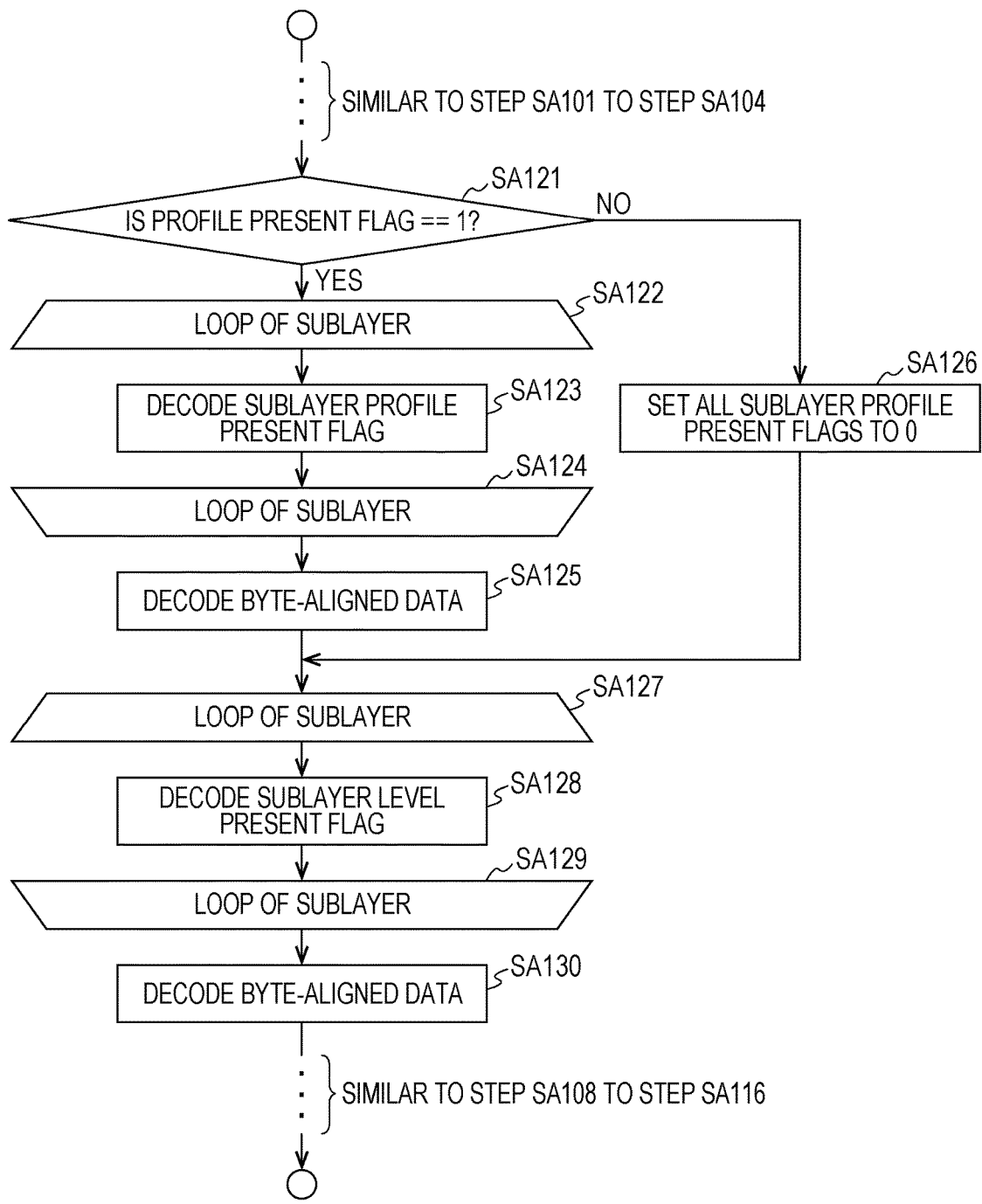

FIG. 15

《PROFILE, TIER AND LEVEL SYNTAX》

| profile_tier_level(ProfilePresentFlag, MaxNumSubLayers) { | Descriptor |
|---|---|
| if(ProfilePresentFlag) { | |
|    general_profile_space | ~~u(2)~~ u(3) |
|    ~~general_tier_flag~~ | ~~u(1)~~ |
|    general_profile_idc | u(5) |
|    for(i=0;i < 32;i++) | |
|       general_profile_compatibility_flag[i] | u(1) |
|    general_reserved_zero_16bits | u(16) |
| } | |
| general_level_idc | ~~u(8)~~ u(7) |
| general_tier_flag | u(1) |
| for(i=0;i < MaxNumSubLayers - 1;i++) { | |
|    sub_layer_profile_present_flag[i] | u(1) |
|    sub_layer_level_present_flag[i] | u(1) |
| } | |
| While(!byte_aligned()) | |
|    alignment_bit | f(1) |
| for(i=0;1 < MaxNumSubLayers - 1;i++) { | |
|    ~~sub_layer_profile_present_flag[i]~~ | ~~u(1)~~ |
|    ~~sub_layer_level_present_flag[i]~~ | ~~u(1)~~ |
|    if(ProfilePresentFlag && sub_layer_profile_present_flag[i]) { | |
|       sub_layer_profile_space[i] | ~~u(2)~~ u(3) |
|       ~~sub_layer_tier_flag[i]~~ | ~~u(1)~~ |
|       sub_layer_profile_idc[i] | u(5) |
|       for(j=0;j < 32;j++) | |
|          sub_layer_profile_compatibility_flag[i][j] | u(1) |
|       sub_layer_reserved_zero_16bits[i] | u(16) |
|    } | |
|    if(sub_layer_level_present_flag[i]) { | |
|       sub_layer_level_idc[i] | ~~u(8)~~ u(7) |
|       sub_layer_tier_flag[i] | u(1) |
|    } | |
| } | |
| } | |

Labels: SYNA 301 (general_profile_space), SYNA 302 (general_level_idc, general_tier_flag), SYNA 303 (sub_layer_profile_space[i]), SYNA 304 (sub_layer_level_idc[i], sub_layer_tier_flag[i]), SYNA 305 (general_level_idc, general_tier_flag), SYNA 306 (sub_layer_level_idc[i], sub_layer_tier_flag[i])

FIG. 16

《PROFILE, TIER AND LEVEL SYNTAX》

| | Descriptor |
|---|---|
| profile_tier_level(ProfilePresentFlag, MaxNumSubLayers) { | |
|   if(ProfilePresentFlag) { | |
|     general_profile_space | ~~u(2)~~ u(3) |
|     ~~general_tier_flag~~ | ~~u(1)~~ |
|     general_profile_idc | u(5) |
|     for(i=0;i < 32;i++) | |
|       general_profile_compatibility_flag[i] | u(1) |
|     general_reserved_zero_16bits | u(16) |
|   } | |
|   general_level_idc | u(8) |
|   general_tier_idc | u(8) |
|   for(i=0;i < MaxNumSubLayers - 1;i++) { | |
|     sub_layer_profile_present_flag[i] | u(1) |
|     sub_layer_level_present_flag[i] | u(1) |
|   } | |
|   While(!byte_aligned()) | |
|     alignment_bit | f(1) |
|   for(i=0;1 < MaxNumSubLayers - 1;i++) { | |
|     ~~sub_layer_profile_present_flag[i]~~ | ~~u(1)~~ |
|     ~~sub_layer_level_present_flag[i]~~ | ~~u(1)~~ |
|     if(ProfilePresentFlag && sub_layer_profile_present_flag[i]) { | |
|       sub_layer_profile_space[i] | ~~u(2)~~ u(3) |
|       ~~sub_layer_tier_flag[i]~~ | ~~u(1)~~ |
|       sub_layer_profile_idc[i] | u(5) |
|       for(j=0;j < 32;j++) | |
|         sub_layer_profile_compatibility_flag[i][j] | u(1) |
|       sub_layer_reserved_zero_16bits[i] | u(16) |
|     } | |
|     if(sub_layer_level_present_flag[i]) { | |
|       sub_layer_level_idc[i] | u(8) |
|       sub_layer_tier_idc[i] | u(8) |
|     } | |
|   } | |
| } | |

SYNA 301a → general_profile_space

SYNA 302a → general_level_idc, general_tier_idc

SYNA 303a → sub_layer_profile_space[i]

SYNA 304a → sub_layer_level_idc[i], sub_layer_tier_idc[i]

FIG. 17

《PROFILE, TIER AND LEVEL SYNTAX》

| profile_tier_level(~~ProfilePresentFlag,~~<br>ProfileLevelPresentFlag<br>MaxNumSubLayers) { | Descriptor |
|---|---|
| if(ProfilePresentLevelFlag) { | |
|    general_profile_space | u(2) |
|    general_tier_flag | u(1) |
|    general_profile_idc | u(5) |
|    for(i=0;i < 32;i++) | |
|      general_profile_compatibility_flag[i] | u(1) |
|    general_reserved_zero_16bits | u(16) |
|    general_level_idc | u(8) |
| } | |
| ~~general_level_idc~~ | ~~u(8)~~ |
| for(i=0;i < MaxNumSubLayers - 1;i++) { | |
|    sub_layer_profile_level_present_flag[i] | u(1) |
| } | |
| While(!byte_aligned()) | |
|    alignment_bit | f(1) |
| for(i=0;1 < MaxNumSubLayers - 1;i++) { | |
|    ~~sub_layer_profile_present_flag[i]~~ | ~~u(1)~~ |
|    ~~sub_layer_level_present_flag[i]~~ | ~~u(1)~~ |
|    if(ProfilePresentLevelFlag &&<br>     sub_layer_profile_level_present_flag[i]) { | |
|      sub_layer_profile_space[i] | u(2) |
|      sub_layer_tier_flag[i] | u(1) |
|      sub_layer_profile_idc[i] | u(5) |
|      for(j=0;j < 32;j++) | |
|         sub_layer_profile_compatibility_flag[i][j] | u(1) |
|      sub_layer_reserved_zero_16bits[i] | u(16) |
|      sub_layer_level_idc[i] | u(8) |
|    } | |
|    ~~if(sub_layer_level_present_flag[i])~~ | |
|      ~~sub_layer_level_idc[i]~~ | ~~u(8)~~ |
| } | |
| } | |

SYNA 302

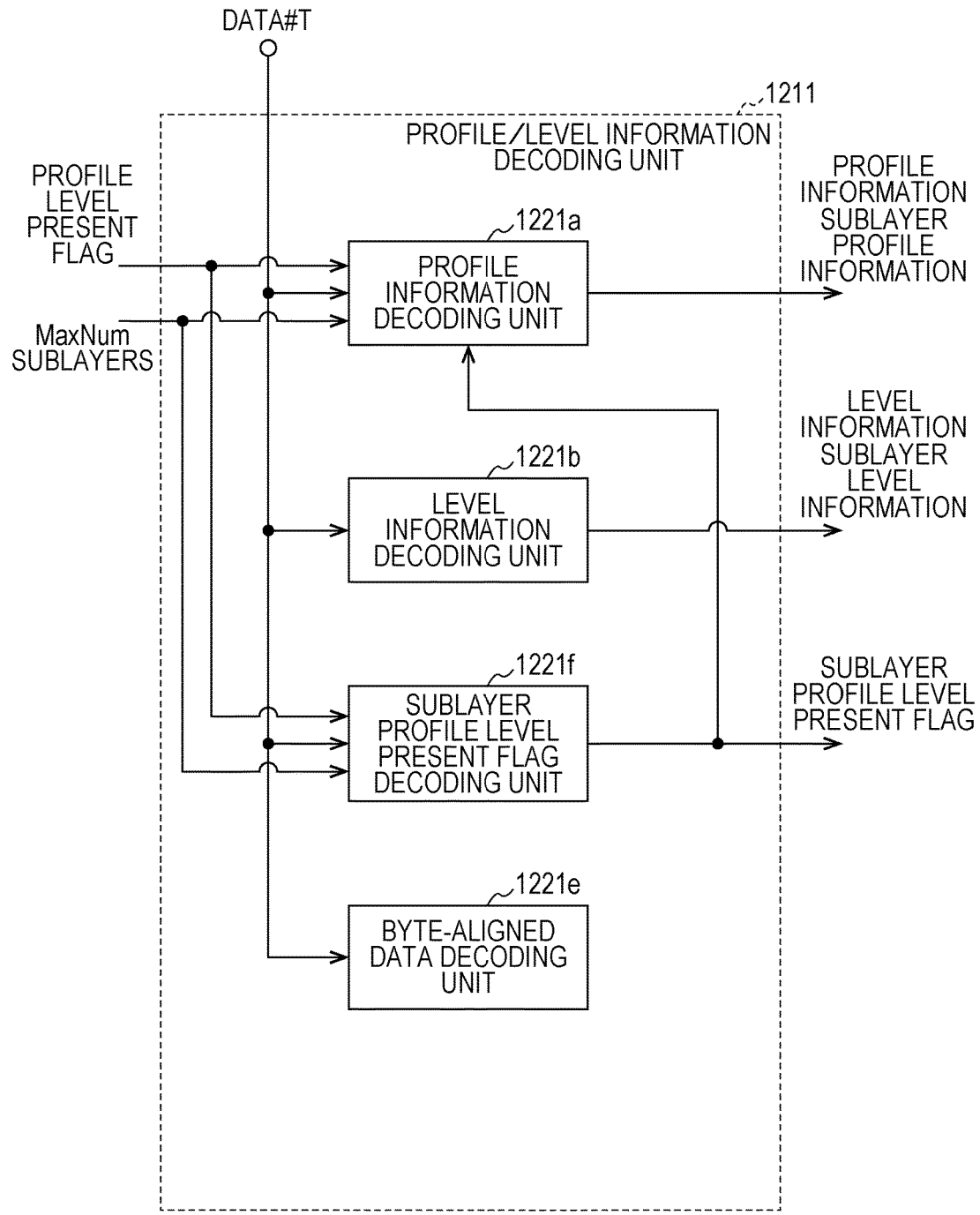

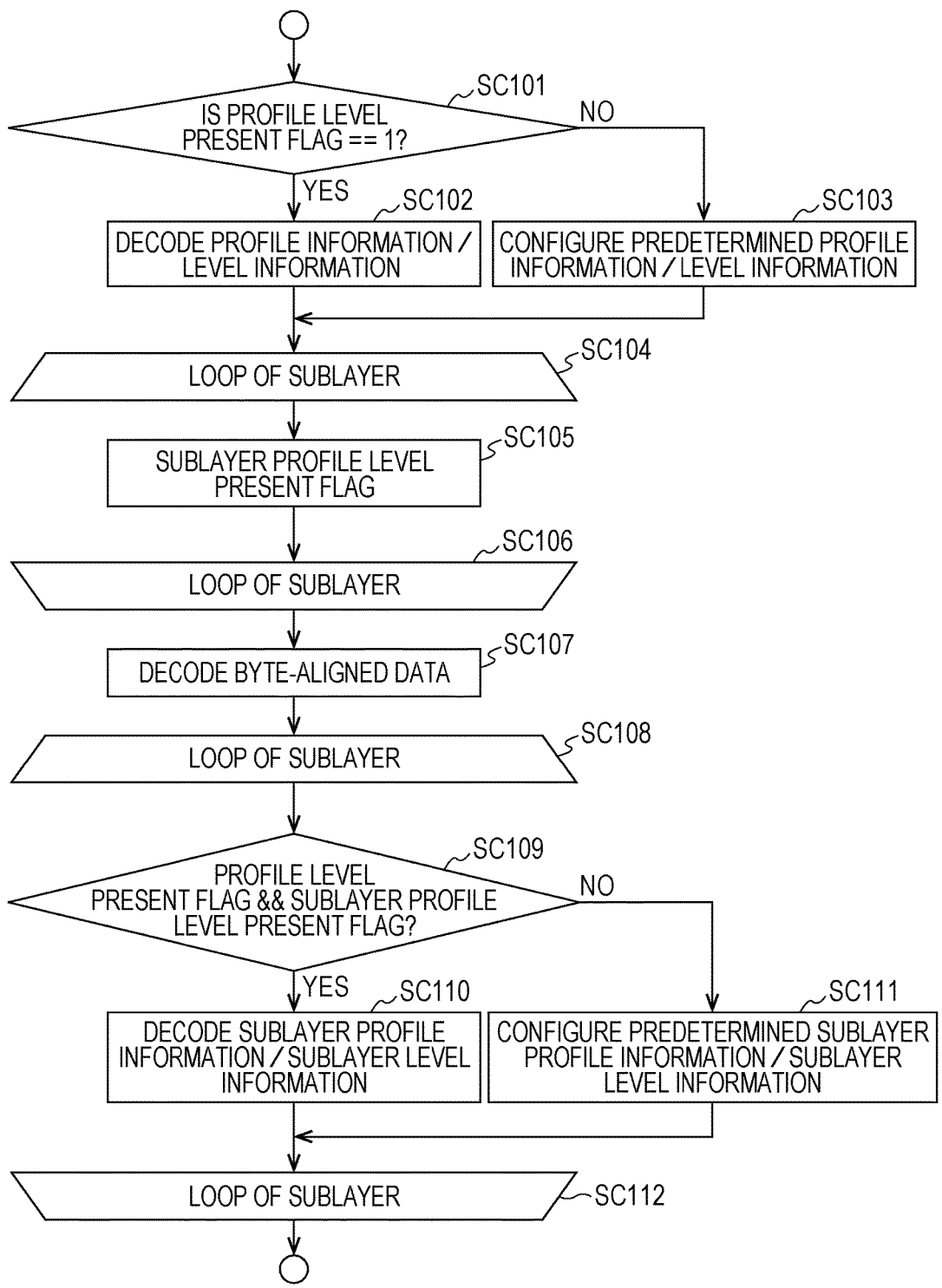

FIG. 28

LEVEL LIMITS

| LEVEL | MAX LUMA SAMPLE RATE MaxLumaSR (SAMPLES/sec) | MAX LUMA PICTURE SIZE MaxLumaPS (SAMPLES) | MAX BIT RATE MaxBR (1000 BITS/s) | | MAX CPB SIZE MaxCPB (1000 BITS) | | MIN COMPRESSION RATIO MinCR | MAX SLICES PER PICTURE MaxSlicesPerPicture | MAX # OF TILE ROWS MaxTileRows | MAX # OF TILE COLUMNS MaxTileCols |
|---|---|---|---|---|---|---|---|---|---|---|
| | | | MAIN TIER | HIGH TIER | MAIN TIER | HIGH TIER | | | | |
| 1 | 552 960 | 36 864 | 128 | – | 350 | – | 2 | 16 | 1 | 1 |
| 2 | 3 686 400 | 122 880 | 1 500 | – | 1 500 | – | 2 | 16 | 1 | 1 |
| 2.1 | 7 372 800 | 245 760 | 3 000 | – | 3 000 | – | 2 | 20 | 1 | 1 |
| 3 | 16 588 800 | 552 960 | 6 000 | – | 6 000 | – | 2 | 30 | 2 | 2 |
| 3.1 | 33 177 600 | 983 040 | 10 000 | – | 10 000 | – | 2 | 40 | 3 | 3 |
| 4 | 66 846 720 | 2 228 224 | 12 000 | 30 000 | 12 000 | 30 000 | 4 | 75 | 5 | 5 |
| 4.1 | 133 693 440 | 2 228 224 | 20 000 | 50 000 | 20 000 | 50 000 | 4 | 75 | 5 | 5 |
| 5 | 267 386 880 | 8 912 896 | 25 000 | 100 000 | 25 000 | 100 000 | 6 | 200 | 11 | 10 |
| 5.1 | 534 773 760 | 8 912 896 | 40 000 | 160 000 | 40 000 | 160 000 | 8 | 200 | 11 | 10 |
| 5.2 | 1 069 547 520 | 8 912 896 | 60 000 | 240 000 | 60 000 | 240 000 | 8 | 200 | 11 | 10 |
| 6 | 1 069 547 520 | 33 423 360 | 60 000 | 240 000 | 60 000 | 240 000 | 8 | 600 | 22 | 20 |
| 6.1 | 2 005 401 600 | 33 423 360 | 120 000 | 480 000 | 120 000 | 480 000 | 8 | 600 | 22 | 20 |
| 6.2 | 4 010 803 200 | 33 423 360 | 240 000 | 800 000 | 240 000 | 800 000 | 6 | 600 | 22 | 20 |

PARAMETER CONSTRAINTS REGARDING Main Profile (EXAMPLE)

- 4:2:0, 8 bit
- SPS: Max 16
- PPS: Max 64
- CTB SIZE: 16x16 TO 64x64
- AVAILABLE EITHER ONE OF Tile AND WPP (PARALLELIZING TOOL)
- entropy_slice_enabled_flag=0
- Tile: WIDTH IS Min 256, HEIGHT IS Min 64
- Max NUMBER OF BITS OF 1 CTB: 768 * bitDepth * (NUMBER OF PIXELS OF CTB ÷ 256)

(b)

ADDITIONAL LEVEL CONSTRAINTS REGARDING Main Profile (EXAMPLE)

- UPPER LIMIT OF NUMBER OF SLICES: CONFORMING TO LEVEL CONSTRAINTS
- VCL HRD PARAMETER:
    - BitRate[ SchedSelIdx ] <= cpbBrVclFactor * MaxBR
    - CpbSize[ SchedSelIdx ] <= cpbBrVclFactor * MaxCPB
- NAL HRD PARAMETER:
    - BitRate[ SchedSelIdx ] <= cpbBrVclFactor * MaxBR
    - CpbSize[ SchedSelIdx ] <= cpbBrVclFactor * MaxCPB
- UPPER LIMIT OF NUMBER OF NAL unit bytes
    - IN CASE OF AU = 0
      $1.5 * ( \text{Max}( \text{PicSizeInSamplesY}, fR * \text{MaxLumaSR} ) + \text{MaxLumaSR} * ( t_r(0) - t_{r,n}(0) )) \div \text{MinCR}$
    - IN CASE OF AU > 0
      $1.5 * \text{MaxLumaSR} * ( tr(n) - tr(n-1) ) \div \text{MinCR}$
- CTB SIZE LIMIT: WHEN LEVEL IS 5 OR HIGHER, 32x32 or 64x64
- NUMBER OF REFERENCE PICTURE BUFFERS: 8 OR LESS
- LIMIT OF NUMBER OF TILES: CONFORMING TO LEVEL CONSTRAINTS

FIG. 30

《PROFILE, TIER AND LEVEL SYNTAX》

| profile_tier_level(ProfilePresentFlag, MaxNumSubLayersMinus1) { | Descriptor |
|---|---|
| if(ProfilePresentFlag) { | |
| SYNZ101 → general_profile_space | u(2) |
| SYNZ102 → general_tier_flag | u(1) |
| SYNZ103 → general_profile_idc | u(5) |
| for(i=0;i < 32;i++) | |
| SYNZ104 → general_profile_compatibility_flag[i] | u(1) |
| SYNZ105 → general_reserved_zero_16bits | u(16) |
| } | |
| SYNZ106 → general_level_idc | u(8) |
| for(i=0;i < MaxNumSubLayersMinus1;i++) { | |
| SYNZ107 → sub_layer_profile_present_flag[i] | u(1) |
| SYNZ108 → sub_layer_level_present_flag[i] | u(1) |
| if(ProfilePresentFlag && sub_layer_profile_present_flag[i]) { | |
| SYNZ109 → sub_layer_profile_space[i] | u(2) |
| SYNZ110 → sub_layer_tier_flag[i] | u(1) |
| SYNZ111 → sub_layer_profile_idc[i] | u(5) |
| for(j=0;j < 32;j++) | |
| SYNZ112 → sub_layer_profile_compatibility_flag[i][j] | u(1) |
| SYNZ113 → sub_layer_reserved_zero_16bits[i] | u(16) |
| } | |
| if(sub_layer_level_present_flag[i]) | |
| SYNZ114 → sub_layer_level_idc[i] | u(8) |
| } | |
| } | |

SYNZ 201 (bracket covering rows SYNZ107–SYNZ114)

FIG. 31

VIDEO PARAMETER SET RBSP SYNTAX

| video_parameter_set_rbsp() { | Descriptor |
|---|---|
|   video_parameter_set_id | u(4) |
|   vps_temporal_id_nesting_flag | u(1) |
|   vps_reserved_zero_2bits | u(2) |
|   vps_reserved_zero_6bits<br>  // vps_max_num_layers_minus1 | u(6) |
|   vps_max_sub_layers_minus1 | u(3) |
|   next_essential_info_byte_offset | u(16) |
|   profile_tier_level(1, vps_max_sub_layers_minus1) | |
|   ~~vps_reserved_zero_12bits~~<br>  ~~// next_essential_info_byte_offset~~ | ~~u(12)~~ |
|   . . . | |
| } | |

SYNL101 → next_essential_info_byte_offset

BYTE-ALIGNED

IMAGE DECODING DEVICE AND IMAGE DECODING METHOD

TECHNICAL FIELD

The present invention relates to an image decoding device that decodes hierarchically coded data which has been obtained by hierarchically coding an image."

BACKGROUND ART

An example of either information transmitted in a communication system or information recorded in a storage device is an image or a moving image. In the related art, in order to transmit and store the image (hereinafter, including the moving image), a technology of coding the image has been known.

As moving image coding schemes, H.264/MPEG-4, AVC, and high-efficiency video coding (HEVC) that is succeeding codec have been known (NPL 1).

In such a moving image coding scheme, images (pictures) constituting the moving image are managed, and coded/decoded by a hierarchical structure which is constituted by slices obtained by splitting an image, coding tree blocks (hereinafter, referred to as a CTB) obtained by splitting the slice, and coding units obtained by recursively quad-splitting the CTB.

Further, the coding unit (hereinafter referred to as CU) is further appropriately split to conversion units for managing a process for a transform coefficient and prediction units for managing a process for a predicted image.

Further, in these moving image coding schemes, normally, a predicted image is generated based on a local decoded image obtained by coding/decoding an input image, and a prediction residual (also referred to as "a difference image" or "a residual image") obtained by subtracting the predicted image from the input image (an original image) is coded through orthogonal transformation and quantization.

Examples of a generation method of the predicted image described above include an inter-picture prediction (inter-prediction) and an intra-picture prediction (intra-prediction).

In the inter-prediction, the predicted image is generated by inter-frame motion compensation. In contrast, in the intra-prediction, the predicted images of a frame are sequentially generated, based on the local decoded image in the same frame.

Further, in HEVC, a prediction unit size of the motion compensation in inter-prediction is represented by a combination of split by CU and a split type to be signaled for each CU.

Further, in recent years, a hierarchical coding technology for hierarchically coding an image according to a required data rate has been proposed.

Examples of the hierarchical coding method include an H.264/AVC Annex G Scalable Video coding (SVC) as the standard of ISO/IEC and ITU-T.

The SVC supports spatial scalability, temporal scalability, and SNR scalability. For example, in a case of the spatial scalability, first, an image obtained by down-sampling an original image to a desired resolution is coded as a lower layer in the H.264/AVC. In addition, a lower layer referred to in a target layer to be decoded is termed a reference layer. Next, in the target layer, inter-layer prediction is performed in order to remove redundancy between layers. Examples of the inter-layer prediction include motion information prediction that predicts information regarding the motion prediction, from information regarding the reference layer at the same time, or texture prediction that performs prediction from an image obtained by up-sampling a decoded image of the reference layer at the same time (NPL 2). In the motion information prediction, motion information is coded, with the motion information (a motion vector or the like) of a reference layer as an estimation value.

Further, according to NPL 1, the following concepts are defined in order to indicate a function or a parameter regarding a range of coded data (or hierarchically coded data) of an image that an image decoding device (decoder) can handle (can decode).

(1) "profile" defining a combination of coding tools (element technology), assuming a specific application (2) "level" defining limits of parameters (configuring information), in accordance with the size of an image, and the like The profile defines a set of coding tools (element technology) required for decoding coded data of a coded image. Since the profile has been defined, only a suitable profile rather than the entire specification may be implemented in an individual application, and there is an advantage of being able to reduce the complexity of the decoder/encoder.

Further, the level defines the capability of a decoder and the complexity of a bit stream. For example, the level defines the decoder's decoding speed for the bit stream. Further, the level defines a range of supporting a tool defined in each profile. Therefore, it is necessary to support the lower level, in the higher level.

For example, in NPL 1, as illustrated in FIG. 28, various parameters limited by the levels include a maximum luminance sample rate (Max luma sample rate), a maximum luminance picture size (Max luma picture size), a maximum bit rate (Max bitrate), a maximum CPB size (Max CPB size), a minimum compression ratio (Min compression Ratio), a maximum number of slices per picture (Max slices per picture), and the like. In addition, a sub-concept of the level includes "tier" indicating whether the maximum bit rate of a bit stream (coded data) corresponding to each level and the maximum CPB size for storing a bit stream are values defined by a main tier (for consumer) or values defined by a high tier (for business).

For example, in NPL 1, the main profile is defined as a profile. In the main profile, for example, constraints of the coding tool illustrated in FIG. 29(a) are defined. Further, in the main profile, additional level limits illustrated in FIG. 29(b) are defined in addition to the limits defined by the level illustrated in FIG. 28.

Further, in NPL 1, a profile to which a bit stream conforms is designated by a profile identifier general_profile_idc (SYNZ103 in FIG. 30) in the profile/level information profile_tier_level( ) illustrated in FIG. 30. For example, when a bit stream conforms to the main profile, the value of the general_profile_idc is set to 1.

Further, there is general_profile_compatibility_flag[i] (SYNZ104 in FIG. 30) indicating whether or not a decoder conforming to a profile other than the profiles designated by the profile identifier general_profile_idc can decode a current bit stream. For example, if a profile is compatible with the main profile, general-profile-compatibility-flag [1]=1 is set.

Further, whether or not a level indicating the complexity of the bit stream or the capability of a decoder required for decoding the bit stream conforms to any level of FIG. 28 is designated by a level identifier general_level_idc (SYNZ106 in FIG. 30) in the profile/level information profile_tier_level( ). For example, when the value of the level identifier general_level_idc indicates "61", it indicates that the level corresponds to level 6.1 in FIG. 28; and when the value of the level identifier general_level_idc indicates "10", it indicates that the level corresponds to level 1 in FIG. 28. In other words, a tens digit (second digit) and units digit (first digit) of the value indicated by the level identifier general_level_idc respectively correspond to the integer and the value of the decimal point of the level in FIG. 28.

Further, the levels designated by the level identifier general_level_idc include a tier flag general_tier_flag (SYNZ102 in FIG. 30) indicating whether a tier is the main tier or the high tier. When the value of the tier flag general_tier_flag is 0, it indicates the main tier, and when the value is 1, it indicates the high tier.

Further, in the profile/level information profile_tier_level( ) illustrated in FIG. 30, if the sublayer profile present flag sub_layer_profile_present_flag[i] (SYNZ107 in FIG. 30) and the sublayer level present flag sub_layer_level_present_flag[i] (SYNZ108 in FIG. 30) are both 1, the profile information (hereinafter, also referred to as sublayer profile information, SYNZ111, SYNZ112, SYNZ110, SYNZ109, and SYNZ113 in FIG. 30) and the level information (hereinafter, referred to as sublayer level information, syntax SYNZ114 in FIG. 30) for each layer regarding time scalability (hereinafter, also referred to as a sublayer) can explicitly be designated.

In addition, in NPL 1, the profile/level information profile_tier_level( ) is signaled in both parameter sets of a video parameter set VPS illustrated in FIG. 7(*a*) and a sequence parameter set SPS illustrated in FIG. 7(*b*).

CITATION LIST

Non Patent Literature

[NPL 1] "High efficiency video coding (HEVC) text specification draft 8 (JCTVC-J1003-d7)", Joint Collaborative Team on Video coding (JCT-VC) of ITU-T SG16 WP3 and ISO/IEC JTC1/SC29/WG11 10th Meeting: Stockholm, SE, 11-20 Jul. 2012 (published Jul. 28, 2012)
[NPL 2] ITU-T H.264 "Advanced video coding for generic audiovisual services" (published in November, 2007)

SUMMARY OF INVENTION

Technical Problem

However, the profile/level information profile_tier_level( ) (FIG. 30) in the related art has the following problems.

(1) In a data structure of syntax regarding the profile/level information profile_tier_level( ) illustrated in FIG. 30, a sublayer profile present flag and a sublayer level present flag regarding the i-th sublayer, and sublayer profile information and sublayer level information regarding the sublayer are represented per sublayer. Accordingly, in order to achieve sublayer profile information and sublayer level information regarding a specific j-th sublayer, it is necessary to decode syntax regarding the 0-th to (j−1)-th pieces of the sublayer profile information and the sublayer level information. In other words, there is a problem in that it is not easy to decode and extract the sublayer profile information and the sublayer level information regarding any sublayer.

(2) The sublayer profile present flag and the sublayer level present flag are both represented by one bit. Further, the sublayer profile information (a portion of "SYNZ201" in FIG. 30 (SYNZ109, SYNZ110, SYNZ111, SYNZ112, and SYNZ113)) is represented by a total of 56 bits (7 bytes), and the sublayer level information (SYN114 in FIG. 30) is represented by 8 bits (1 byte). Therefore, syntax after the sublayer profile present flag and the sublayer level present flag, in other words, the sublayer profile information and the sublayer level information are not byte-aligned. Accordingly, since the sublayer profile information and the sublayer level information regarding the sublayer are over a byte boundary, there is a problem in that the number of reading/writing from the memory is increased.

(3) In the profile/level information profile_tier_level( ), when the value of the profile present flag ProfilePresentFlag is 0, the sublayer profile information is not signaled, without being dependent on the value of the sublayer profile present flag of the sublayer. Accordingly, when the value of the profile present flag ProfilePresentFlag is 0, there is a problem in that the sublayer profile present flag of the sublayer is redundantly signaled.

(4) In the profile/level information profile_tier_level( ), the tier flag general_tier_flag related to the level information is signaled, while being dependent on the value of the profile present flag ProfilePresentFlag. When the value of the ProfilePresentFlag is 0, only the level identifier general_level_idc is signaled, and thus there is a problem in that it is difficult for the decoder to achieve constraints of a level determined by the level identifier general_level_idc and the tier flag general_tier_flag. Similarly, even in the sublayer, the sublayer tier flag sub_layer_tier_flag[i] related to the sublayer level information is signaled while being dependent on the values of the profile present flag and the sublayer profile present flag. When the value of the profile present flag or the sublayer profile present flag is 0 and the value of the sublayer level present flag is 1, only the sublayer level identifier sub_layer_level_idc[i] is signaled, and there is a problem in that it is difficult for the decoder to achieve constraints of a level determined by the sublayer level identifier sub_layer_level_idc[i] and the sublayer tier flag sub_layer_tier_flag[i] regarding a certain sublayer.

As described above, from (1) and (2), in the data structure of the profile/level information, a process regarding coding/decoding of the profile information and the level information is complicated, and thus the data structure is not desirable from the point of view of implementation of an coder/decoder. Further, from the problem of (3), the redundancy of the sublayer profile present flag causes an increase in the amount of symbols. Further, from the problem of (4), there is a problem in that it is difficult for the decoder to achieve some parameters regarding level constraints in a specific condition.

The present invention has been made in view of the above problems, and an object thereof is to realize an image decoding device capable of reducing a processing amount for decoding profile information and level information, by improving a syntax and a data structure related to the profile/level information required for determining whether or not a decoder can decode coded data (or hierarchically coded data) obtained by coding an image.

Solution to Problem

In order to solve the above problems, according to an aspect of the present invention, there is provided an image decoding device which decodes hierarchically coded data obtained by hierarchically coding image information regarding images of different qualities for respective layers, and restores an image of a target layer to be decoded, the image decoding device including profile information decoding means for decoding profile information regarding the target layer from the coded data, in a case where a profile present flag (ProfilePresentFlag) indicating whether or not to present profile information indicating that the coded data of the target layer can be decoded by an image decoding device including which profile indicates that the profile information regarding the target layer is presented, and configuring profile information regarding a predetermined decoded layer to profile information regarding the target layer, in a case where the profile present flag indicates that profile information regarding the target layer is not presented, level information decoding means for decoding, from the coded data, level information indicating that the coded data of the target layer can be decoded by an image decoding device including which level, sublayer profile present flag decoding means for decoding, from the coded data, a sublayer profile present flag (sub_layer_profile_flag) indicating whether or not to present sublayer profile information regarding each sublayer included in the target layer, sublayer level present flag decoding means for decoding, from the coded data, a sublayer level present flag (sub_layer_level_flag) indicating whether or not to present sublayer level information regarding each sublayer included in the target layer, sublayer profile information decoding means for decoding the sublayer profile information regarding each sublayer included in the target layer, in a case where after the decoding of the sublayer profile present flag regarding each sublayer, the sublayer profile present flag indicates that the sublayer profile information is presented, and configuring the profile information regarding the target layer to the sublayer profile information regarding the sublayer in a case where the sublayer profile present flag indicates that the sublayer profile information is not presented, and sublayer level information decoding means for decoding the sublayer level information regarding each sublayer included in the target layer, in a case where after the decoding of the sublayer level present flag regarding each sublayer, the sublayer level present flag indicates that the sublayer level information is presented, and configuring the level information regarding the target layer to the sublayer level information regarding the sublayer in a case where the sublayer level present flag indicates that the sublayer level information is not presented.

In order to solve the above problems, according to another aspect of the present invention, there is provided an image decoding device which decodes hierarchically coded data obtained by hierarchically coding image information regarding images of different qualities for respective layers, and restores an image of a target layer to be decoded, the image decoding device including profile information decoding means for decoding, from the coded data, profile information regarding the target layer, in a case where a profile level present flag (ProfileLevelPresentFlag) indicating whether or not to present the profile information and the level information respectively indicating that the coded data of the target layer can be decoded by an image decoding device including which profile and which level indicates that profile information and level information regarding the target layer are presented, and configuring profile information regarding a predetermined decoded layer to the profile information regarding the target layer, in a case where the profile level present flag indicates that the profile information and the level information regarding the target layer are not presented, level information decoding means for decoding, from the coded data, level information regarding the target layer, in a case where the profile level present flag indicates that the profile information and the level information regarding the target layer are presented, and configuring level information regarding a predetermined decoded layer to the level information regarding the target layer, in a case where the profile level present flag indicates that the profile information and the level information regarding the target layer are not presented, sublayer profile level present flag decoding means for decoding, from the coded data, a sublayer profile level present flag indicating whether or not to present sublayer profile information and sublayer level information regarding each sublayer included in the target layer, sublayer profile information decoding means for decoding the sublayer profile information regarding each sublayer included in the target layer, in a case where the sublayer profile level present flag indicates that the sublayer profile information and the sublayer level information are presented, and configuring the profile information regarding the target layer to the sublayer profile information regarding the sublayer, in a case where the sublayer profile level present flag indicates that the sublayer profile information and the sublayer level information are not presented, and sublayer level information decoding means for decoding the sublayer level information regarding each sublayer included in the target layer, in a case where the sublayer profile level present flag indicates that the sublayer profile information and the sublayer level information are presented, and configuring the level information regarding the target layer to the sublayer level information regarding the sublayer, in a case where the sublayer profile level present flag indicates that the sublayer profile information and the sublayer level information are not presented.

According to another aspect of the present invention, there is provided an image decoding device which decodes coded data obtained by coding image information, the image decoding device comprising: header information decoding means for decoding header information for decoding a video parameter set included in the coded data, wherein the header information decoding means decodes information for extension in the video parameter set, and thereafter decodes profile/level information included in the video parameter set.

Advantageous Effects of Invention

According to the aspects of the present invention, it is possible to reduce a processing amount for decoding the profile/level information required for determining whether an image decoding device can decode coded data (or hierarchically coded data) obtained by coding an image.

BRIEF DESCRIPTION OF DRAWINGS

FIG. 7 is a diagram illustrating an example of syntax according to hierarchically coded data. (a) is a diagram illustrating an example of syntax of a video parameter set VPS, (b) is a diagram illustrating an example of syntax of a sequence parameter set SPS, and (c) is a diagram illustrating an example of syntax of an NAL unit header.

FIG. 11 is a data structure of profile/level information according to Example 1.

FIG. 13 is a data structure of another example (Modification 1) of profile/level information according to Example 1.

FIG. 14 is a flowchart illustrating another example (Modification 1) of an operation of a decoding process of profile/level information in the profile/level information decoding unit 1211 according to Example 1.

FIG. 15 is a data structure of another example (Modification 2) of profile/level information according to Example 1.

FIG. 16 is a data structure of another example (Modification 2a) of profile/level information according to Example 1.

FIG. 17 is a data structure of another example (Modification 3) of profile/level information according to Example 1.

FIG. 18 is a functional block diagram illustrating another schematic configuration of the profile/level information decoding unit 1211 according to an embodiment of the present invention (Modification 3).

FIG. 19 is a flowchart illustrating another example (Modification 3) of an operation of a decoding process of profile/level information in the profile/level information decoding unit 1211 according to Example 1.

FIG. 28 represents a limit value of each parameter regarding level constraints in NPL 1.

FIG. 29 (a) is an example of parameter constraints regarding a main profile, and (b) is an example of additional level constraints regarding the main profile in NPL 1.

FIG. 30 is a data structure of profile/level information according to NPL 1.

FIG. 31 is a diagram illustrating another example of syntax of a video parameter set VPS.

DESCRIPTION OF EMBODIMENTS

A hierarchical moving image decoding device 1 and a hierarchical moving image coding device 2 according to an embodiment of the present invention will be described with reference to FIGS. 1 to 27.

[Overview]

The hierarchical moving image decoding device (image decoding device) 1 according to the embodiment decodes coded data that has been subjected to scalable video coding (SVC) by the hierarchical moving image coding device (image coding device) 2. The scalable video coding refers to a coding scheme for hierarchically coding a moving image from a low quality to a high quality. The scalable video coding is standardized by, for example, H.264/AVC Annex G SVC. Further, the quality of the moving image described herein broadly means the elements affecting the subjective and objective appearance of the moving image. The quality of a moving image includes, for example, "a resolution", "a frame rate", "an image quality", and "representation accuracy of a pixel". Accordingly, hereinafter, the meaning of a different quality of the moving image illustratively indicates that "the resolutions" and the like are different, but is not limited thereto. For example, in the case of the moving images which are quantized in different quantization steps (in other words, in the case of the moving image which is coded by different coding noises), it may be said that the qualities of the moving images are different.

Further, the SVC may be classified into (1) spatial scalability, (2) time scalability, and (3) signal to noise ratio (SNR) scalability, in terms of the type of information to be hierarchized. The spatial scalability is a technology for hierarchizing data in a resolution or an image size. The time scalability is a technology for hierarchizing data in a frame rate (the number of frames per unit time). Further, the SNR scalability is a technology for hierarchizing data in a coding noise.

Prior to the detailed description of the hierarchical moving image coding device 2 and the hierarchical moving image decoding device 1 according to the present embodiment, first, (1) a layer structure of the hierarchically coded data to be generated by the hierarchical moving image coding device 2 and decoded by the hierarchical moving image decoding device 1 will be described, and subsequently, (2) a detailed example of a data structure that can be employed in each layer will be described.

[Layer Structure of Hierarchically Coded Data]

Figure 2:
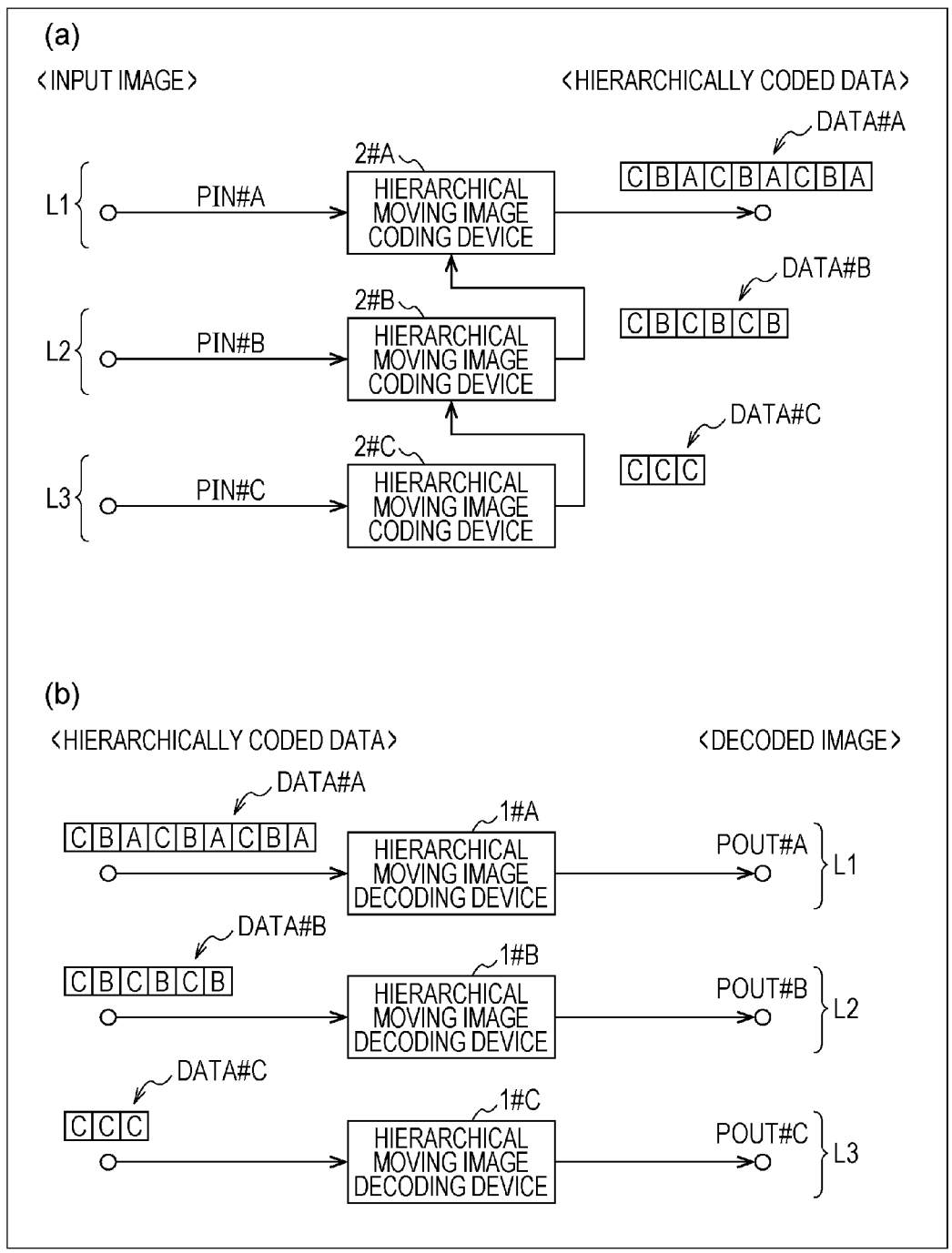
FIG. 2 is a diagram illustrating a layer structure of hierarchically coded data according to the embodiment of the present invention, (a) illustrates hierarchically coded data on a hierarchical moving image coding device, and (b) illustrates hierarchically coded data on a hierarchical moving image decoding device.
Figure 3:
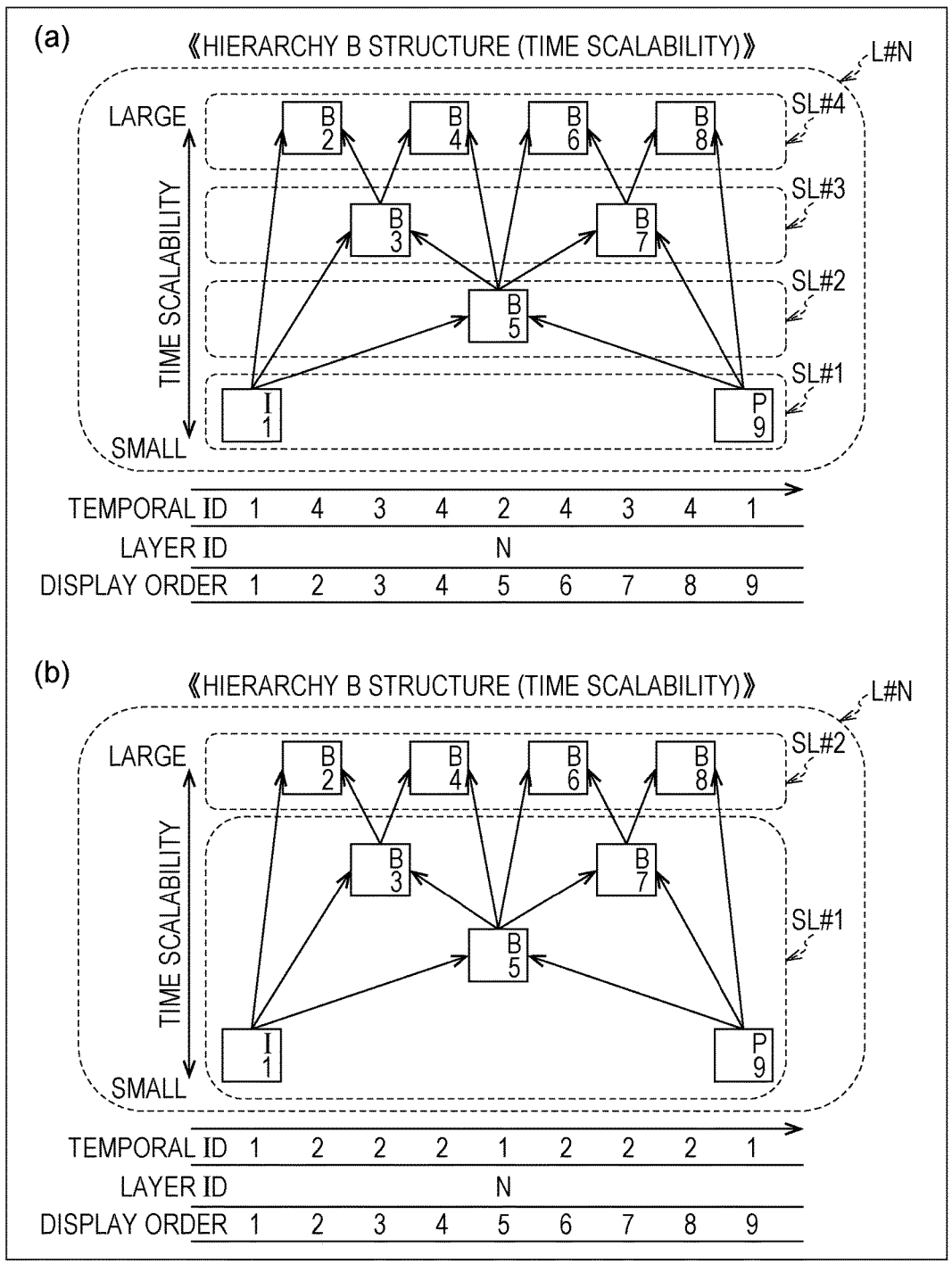
FIG. 3 is a diagram illustrating a sublayer regarding time scalability. (a) is a diagram illustrating an example of a sublayer regarding time scalability, and (b) is a diagram illustrating another example of a sublayer regarding time scalability.

Here, a description of coding and decoding of the hierarchically coded data using FIG. 2 is as follows. FIG. 2 is a diagram schematically illustrating a case of hierarchically coding/decoding a moving image into three hierarchies moving image of a lower hierarchy L3, a middle hierarchy L2, and a higher hierarchy L1. In other words, in the examples illustrated in FIGS. 2(a) and (b), among three hierarchies, the higher hierarchy L1 is a highest layer, and the lower hierarchy L3 is a lowest layer.

In the following description, a decoded image corresponding to a specific quality which is obtained by decoding the hierarchically coded data is referred to as a decoded image of a specific hierarchy (or a decoded image corresponding to a specific hierarchy) (for example, a decoded image POUT#A of the higher hierarchy L1).

FIG. 2(a) illustrates hierarchical moving image coding devices 2#A to 2#C that generate coded data DATA#A to DATA#C by hierarchically coding respective input images PIN#A to PIN#C. FIG. 2(b) illustrates hierarchical moving image decoding devices 1#A to 1#C that generate decoded images POUT#A to POUT#C by decoding respective pieces of coded data DATA#A to DATA#C which are hierarchically coded.

First, a description will be given of the coding devices with reference to FIG. 2(a). The input images PIN#A, PIN#B, and PIN#C which are inputs of the coding devices have the same original image, but have different image qualities (resolution, frame rate, image quality, and the like). The image quality is lowered in the order of the input images PIN#A, PIN#B, and PIN#C.

The hierarchical moving image coding device 2#C of the lower hierarchy L3 generates the coded data DATA#C of the lower hierarchy L3 by coding the input image PIN#C of the lower hierarchy L3. The coded data DATA#C includes basic information required for decoding the decoded image POUT#C of the lower hierarchy L3 (denoted by "C" in FIG. 2). Since the lower hierarchy L3 is a lowest hierarchy, the coded data DATA#C of the lower hierarchy L3 is referred to as basic coded data.

Further, the hierarchical moving image coding device 2#B of the middle hierarchy L2 generates coded data DATA#B of the middle hierarchy L2 by coding the input image PIN#B of the middle hierarchy L2 while referring to the coded data DATA#C of the lower hierarchy. The coded data DATA#B of the middle hierarchy L2 includes additional information (denoted by "B" in FIG. 2) required for decoding the decoded image POUT#B of the middle hierarchy, in addition to the basic information "C" included in the coded data DATA#C.

Further, the hierarchical moving image coding device 2#A of the higher hierarchy L1 generates coded data DATA#A of the higher hierarchy L1 by coding the input image PIN#A of the higher hierarchy L1 while referring to the coded data DATA#B of the middle hierarchy L2. The coded data DATA#A of the higher hierarchy L1 includes additional information (denoted by "A" in FIG. 2) required for decoding the decoded image POUT#A of the higher hierarchy, in addition to the basic information "C" required for decoding the decoded image POUT#C of the lower hierarchy L3, and the additional information "B" required for decoding the decoded image POUT#B of the middle hierarchy L2.

In this manner, the coded data DATA#A of the higher hierarchy L1 includes information regarding the decoded image of a plurality of different qualities.

Next, a description will be given of the decoding devices with reference to FIG. 2(b). On the decoding device side, the decoding devices 1#A, 1#B, and 1#C respectively corresponding to the higher hierarchy L1, the middle hierarchy L2, and the lower hierarchy L3 respectively decode the coded data DATA#A, DATA#B, and DATA#C so as to output the decoded images POUT#A, POUT#B, and POUT#C.

In addition, some pieces of information regarding hierarchically coded data of the higher hierarchy are extracted and a specific decoding device of the lower hierarchy decodes the extracted information, thereby allowing a moving image of a specific quality to be played.

For example, the hierarchical moving image decoding device 1#B of the middle hierarchy L2 may extract information (in other words, "B" and "C" included in the hierarchically coded data DATA#A) required for decoding the decoded image POUT#B, among the hierarchically coded data DATA#A of the higher hierarchy L1, and decode the decoded image POUT#B. In other words, the decoding devices can decode the decoded images POUT#A, POUT#B, and POUT#C, based on the information included in the hierarchically coded data DATA#A of the higher hierarchy L1.

In addition, hierarchically coded data is not limited to the hierarchically coded data of the above three hierarchies, and the hierarchically coded data may be hierarchically coded into two hierarchies, and hierarchically coded into hierarchies of the number greater than three hierarchies.

Further, a part or all of the coded data regarding the decoded image of the specific hierarchy is coded independently of the other hierarchies, during decoding of a specific hierarchy, the hierarchically coded data may be configured to be completed without referring to other hierarchical information. For example, in the example described above with reference to FIGS. 2(a) and (b), the decoding of the decoded image POUT#B has been described with reference to "C" and "B", but is not limited thereto. It is possible to configure the hierarchically coded data such that the decoded image POUT#B can be decoded by using only "B".

In addition, in a case of realizing the SNR scalability, after the same original image is used as the input images PIN#A, PIN#B, and PIN#C, it is possible to generate hierarchically coded data such that the decoded images POUT#A, POUT#B, and POUT#C have different image qualities. In this case, the hierarchical moving image coding device of the lower hierarchy generates hierarchically coded data by quantizing a prediction residual by using a larger quantization width, compared to the hierarchical moving image coding device of the higher hierarchy.

In this specification, for convenience of explanation, terms are defined as follows. The following terms are used to represent the following technical matters, unless otherwise indicated.

Upper layer: A hierarchy which is located higher than a certain hierarchy is referred to as a higher layer. For example, in FIG. 2, the higher layer of the lower hierarchy L3 is the middle hierarchy L2 and the higher hierarchy L1. Further, the decoded image of the higher layer refers to a decoded image of a higher quality (for example, a resolution is high, a frame rate is high, an image quality is high, and the like).

Lower layer: A hierarchy which is located lower than a certain hierarchy refers to a lower layer. For example, in FIG. 2, the lower layer of the higher hierarchy L1 is the middle hierarchy L2 and the lower hierarchy L3. Further, the decoded image of the lower layer refers to a decoded image of a lower quality.

Target layer: A hierarchy which is a decoding target or coding is referred to as a target layer.

Reference layer: A certain lower layer to be referred for decoding a decoded image corresponding to the target layer is referred to as a reference layer.

In the example illustrated in FIGS. 2(a) and (b), the reference layer of the higher hierarchy L1 is the middle hierarchy L2 and the lower hierarchy L3. However, without being limited thereto, it is possible to configure the hierarchically coded data such that all lower layers may not be referred for decoding a certain layer. For example, the hierarchically coded data may be configured such that the reference layer of the higher hierarchy L1 is one of the middle hierarchy L2 and the lower hierarchy L3.

Base layer: A hierarchy which is located in the lowest layer is referred to as a base layer. The decoded image of the base layer is a decoded image which is obtained by decoding the coded data and has the lowest quality, and is referred to as a base decoded image. In other words, the base decoded image is a decoded image corresponding to a hierarchy of the lowest layer. Some pieces of coded data of the hierarchically coded data required for decoding the basic decoded image is referred to as basic coded data. For example, basic information "C" included in the hierarchically coded data DATA#A of the higher hierarchy L1 is basic coded data.

Enhancement layer: the higher layer of the base layer is referred to as an enhancement layer.

Layer identifier: A layer identifier is intended to identify a hierarchy, and has a one-to-one correspondence with the hierarchy. The hierarchically coded data includes a hierarchical identifier used for selecting partially coded data required for decoding the decoded image of a specific hierarchy. The subset of the hierarchically coded data associated with the layer identifier corresponding to the specific layer is referred to as layer representation.

In general, the layer representation of the hierarchy and/or the layer representation corresponding to the lower layer of the hierarchy are used for decoding of the decoded image of the specific hierarchy. In other words, the layer representation of the target layer and/or the layer representation of one or more hierarchies included in the lower layer of the target hierarchy are used for decoding of the decoded image of the target layer.

Inter-layer prediction: Inter-layer prediction means predicting a syntax element value of a target layer, coding parameter used for decoding the target layer, and the like based on the syntax element value included in the layer representation of a hierarchy (reference layer) different from the layer representation of the target layer, a value derived from the syntax element value, and a decoded image. The inter-layer prediction for predicting the information regarding motion prediction from information regarding a reference layer (at the same time) may be referred to as motion information prediction. Further, the inter-layer prediction for performing prediction from an image obtained by up-sampling the decoded image of the lower layer (at the same time) may be referred to as texture prediction (or inter-layer intra-prediction). In addition, the hierarchy used for the inter-layer prediction is exemplarily a lower layer of the target layer. Further, the prediction performed in the target layer without using the reference layer may be referred to as intra-layer prediction.

Temporal identifier: a temporal identifier is an identifier for identifying a layer regarding time scalability (hereinafter, a sublayer). The temporal identifier is for identifying the sublayer, and corresponds to the sublayer one-to-one. The coded data includes a temporal identifier used to select partially coded data necessary for decoding of the decoded image of a specific sublayer.

Sublayer: a sublayer is a layer regarding a time scalability specified by the temporal identifier. The layer is referred to as a sublayer (also referred to as a temporal layer) in order to distinguish the time scalability from other scalability such as a partial scalability and SNR scalability.

In addition, hereinafter, the time scalability is realized by sublayers included in the coded data of the base layer or the hierarchically coded data required for decoding a certain layer.

The time scalability will be described with reference to FIG. 3(a). In the SVC and the HEVC, in order to realize the time scalability, a hierarchical B picture has been introduced in which pictures of a B picture are referred to in a nested manner. FIG. 3(a) illustrates a picture reference relationship of the hierarchical B picture. Here, a symbol L#N indicates a certain layer N, and a symbol SL#M indicates a sublayer (subhierarchy) M of time scalability belonging to a certain layer N. In a case of realizing the time scalability by changing a frame rate, the coded data of the B picture which is not referred to in other pictures is first discarded. In the case of FIG. 3(a), the coded data of the sublayers SL#1 to SL#3 having a frame rate of 1/2 is generated by discarding the coded data of the B pictures (B2, B4, B6, and B8) belonging to sublayer SL#4. Further, the coded data of the sublayers SL#1 and SL#2 having a frame rate of 1/4 is generated by discarding the coded data of the B pictures (B3, and B7) belonging to sublayer SL#3, in the B picture (FIG. 3(a)) which is not referred to from other pictures. It is possible to adjust the frame rate in a stepwise manner by repeating the above process. Further, there is a temporal identifier (also referred to as a temporalId; tId, temporal_id) as an identifier for identifying each sublayer. Although FIG. 3(a) is an example of associating the number of stages of a reference structure of each B picture with the sublayer one-to-one, it is not limited thereto. For example, the number of stages of the reference structures of a plurality of B pictures may be associated with the sublayer one-to-one or multiple-to-one. For example, in FIG. 3(b), the sublayer SL#1 may be associated so as to be constituted by pictures I1, B3, B5, B7, and P9, and the sublayer SL#2 may be associated so as to be constituted by pictures B2, B4, B6, and B8.

In addition, the above terms are defined for only convenience of explanation, and the technical matters may be represented by different terms.

[Data Structure of Hierarchically Coded Data]

Hereinafter, a case of using HEVC and the extension method as a coding scheme of generating coded data of respective hierarchy will be described. However, without being limited thereto, the coded data of respective hierarchies may be generated by a coding scheme such as MPEG-2 and H.264/AVC.

Further, the lower layer and the higher layer may be coded by different coding schemes. Further, the coded data of respective hierarchies may be supplied to the hierarchical moving image decoding device 1 through transmission paths different from each other, or may be supplied to the hierarchical moving image decoding device 1 through the same transmission path.

For example, in a case of performing scalable coding on a high-resolution video (a moving image, 4K video data) in the base layer and one enhancement layer, and transmitting the video; in the base layer, the 4K video data is downscaled, an interlaced video data is coded by the MPEG-2 or H.264/AVC and transmitted over a television broadcasting network; and in the enhancement layer, the 4K video (progressive) is coded by the HEVC, and may be transmitted over the Internet.

(Base Layer)

Figure 4:
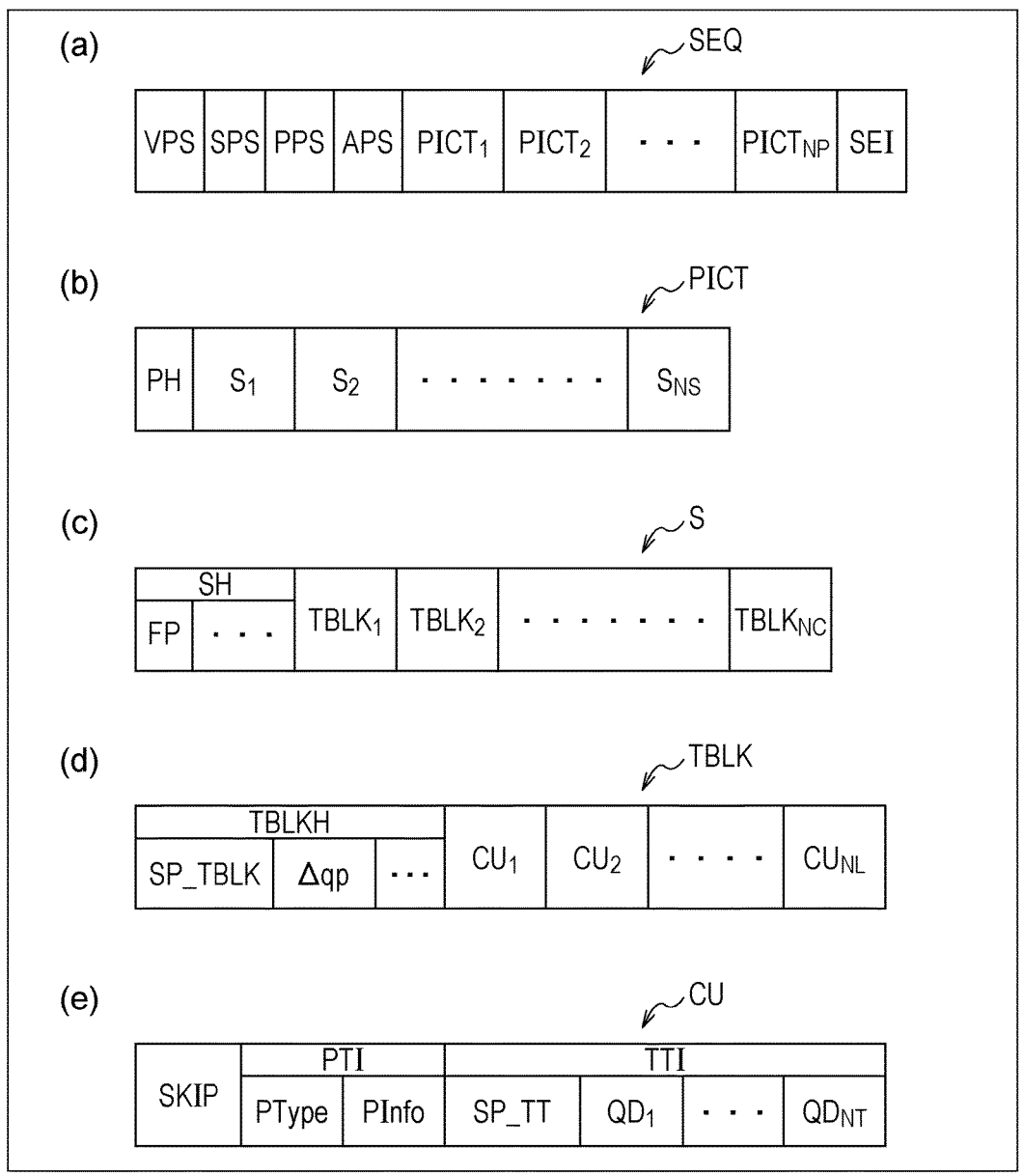
FIG. 4 is a diagram illustrating a configuration of hierarchically coded data according to the embodiment of the present invention, (a) illustrates a sequence layer defining a sequence SEQ, (b) illustrates a picture layer defining a picture PICT, (c) illustrates a slice layer defining a slice S, (d) illustrates a tree block layer defining a tree block TBLK, and (e) illustrates a CU layer defining a coding unit (CU) included in the tree block TBLK.

FIG. 4 is a diagram illustrating a data structure of the coded data (in the example of FIG. 2, the hierarchically coded data DATA#C) that may be employed in the base layer. The hierarchically coded data DATA#C for example includes a sequence, and a plurality of pictures constituting the sequence.

FIG. 4 illustrates a hierarchical structure of data of the hierarchically coded data DATA#C. (a) to (e) of FIG. 4 are diagrams respectively illustrating (a) a sequence layer defining a sequence SEQ, (b) a picture layer defining a picture PICT, (c) a slice layer defining a slice S, (d) a tree block layer defining a tree block TBLK, and (e) a CU layer defining a coding unit (CU) included in the tree block TBLK.

(Sequence Layer)

In the sequence layer, a set of data that is referred to by the hierarchical moving image decoding device 1 in order to decode a sequence to be processed SEQ (hereinafter, also referred to as a target sequence) is defined. The sequence SEQ, as shown in (a) of FIG. 4, includes a video parameter set VPS, a sequence parameter set SPS, picture parameter set PPS, adaptation parameter set APS, pictures $PICT_1$ to $PICT_{NP}$ (NP is the total number of pictures included in the sequence SEQ), and supplemental enhancement information SEI.

In the video parameter set VPS, a set of common coding parameters to be referred to by the hierarchical moving image decoding apparatus 1 for decoding the target sequence is defined in the base layer and the enhancement layer. The details of the VPS will be described later.

In the sequence parameter set SPS, a set of coding parameters which are referred to by the hierarchical moving image decoding device 1 for decoding the target sequence is defined.

In the picture parameter set PPS, a set of coding parameters which are referred to by the hierarchical moving image decoding device 1 for decoding each picture in the target sequence is defined. In addition, a plurality of PPSs may exist. In this case, one of the plurality of PPSs is selected from each picture in the target sequence.

In the adaptation parameter set APS, a set of coding parameters which are referred to by the hierarchical moving image decoding device 1 for decoding each slice in the target sequence is defined. A plurality of APSs may exist. In this case, one of the plurality of APSs is selected from each slice in the target sequence.

(Picture Layer)

In the picture layer, a set of data which is referred to by the hierarchical moving image decoding device 1 for decoding a picture PICT to be processed (hereinafter, also referred to as a target picture) is defined. The picture PICT, as shown in (b) of FIG. 4, includes a picture header PH, and slices $S_1$ to $S_{NS}$ (NS is the total number of slices included in the picture PICT).

In addition, hereinafter, when there is no need to distinguish respective slices $S_1$ to $S_{NS}$, they may be described by omitting subscripts of symbols. Further, the same applies to other data, denoted by subscripts, which is included in the hierarchically coded data DATA#C that will be described below.

The picture header PH includes a coding parameter group which is referred to by the hierarchical moving image decoding device 1 for determining a target picture decoding method. In addition, the coding parameter group does not necessarily need to be included in the picture header PH, and the coding parameter group may be indirectly included in the picture header PH by referring to, for example, the picture parameter set PPS.

(Slice Layer)

In the slice layer, a set of data which is referred to by the hierarchical moving image decoding device 1 for decoding the slice S to be processed (also referred to as a target slice) is defined. The slice S includes, as illustrated in (c) of FIG. 4, a slice header SH, and a sequence of tree blocks $TBLK_1$ to $TBLK_{NC}$ (NC is the total number of tree blocks included in the slice S).

The slice header SH includes a coding parameter group which is referred to by the hierarchical moving image decoding device 1 for determining a target slice decoding method. Slice type designation information (slice-type) for designating a slice type is an example of coding parameters included in the slice header SH.

Examples of the slice type that can be designated by the slice type designation information include (1) an I slice using only intra-prediction in the case of coding, (2) a P slice using unidirectional prediction or intra-prediction in the case of coding, and (3) a B slice using unidirectional prediction, bidirectional prediction, or intra-prediction in the case of coding.

In addition, the slice header SH may include reference to the picture parameter set PPS (pic_parameter_set_id), and reference to the adaptation parameter set APS (aps_id) which are included in the sequence layer.

Further, the slice header SH includes filter parameters FP which are referred to by an adaptation filter included in the hierarchical moving image decoding device 1. The filter parameter FP includes a filter coefficient group. The filter coefficient group includes (1) number-of-taps designation information designating the number of taps of a filter, (2) filter coefficients $a_0$ to $a_{NT-1}$ (NT is the total number of filter coefficients included in the filter coefficient group), and (3) offset.

(Tree Block Layer)

In the tree block layer, a set of data which is referred to by the hierarchical moving image decoding device 1 for decoding the tree block TBLK to be processed (hereinafter, also referred to as a target tree block) is defined. In addition, the tree block may be referred to as a coding tree block (CTB) or largest cording unit (LCU).

The tree block TBLK includes a tree block header TBLKH, and coding unit information $CU_1$ to $CU_{NL}$ (NL is the total number of coding unit information pieces included in the tree block TBLK). Here, first, a description of a relationship between the tree block TBLK and the coding unit information CU is as follows.

The tree block TBLK is split into partitions for specifying a block size for intra-prediction or inter-prediction, and each process for conversion.

The partition of the tree block TBLK is split by quad-tree recursive splitting. The tree structure obtained by the quad-tree recursive splitting is referred to as, hereinafter, a coding tree.

Hereinafter, a partition corresponding to a leaf which is a node of a terminal of the coding tree is referred to as a coding node. Further, since the coding node is a basic unit of a coding process, hereinafter, the coding node is also referred to as a coding unit (CU). In addition, the coding node is also referred to as a coding block (CB).

In other words, the coding unit information (hereinafter, also referred to as CU information) $CU_1$ to $CU_{NL}$ is information corresponding to each coding node (coding unit) obtained by recursively quad-tree-splitting the tree block TBLK.

Further, the root of the coding tree is associated with the tree block TBLK. In other words, the tree block TBLK is associated with the highest node of the tree structure of the quad-tree splitting recursively including a plurality of coding nodes.

In addition, the size of each coding node is half of the horizontal and vertical sizes of a coding node to which the coding node directly belongs (in other words, the partition of a node which is one hierarchy higher than the coding node).

Further, the size of the tree block TBLK and the size of each coding node depend on size designation information regarding a minimum coding node and the difference in hierarchy depths of the maximum coding node and the minimum coding node, which are included in the sequence parameter set SPS of the hierarchically coded data DATA#C. For example, when the size of the minimum coding node is 8×8 pixels and the difference in hierarchy depths of the maximum coding node and the minimum coding node is 3, the size of the tree block TBLK is 64×64 pixels, and one of four types of sizes, in other words, 64×64 pixels, 32×32 pixels, 16×16 pixels, and 8×8 pixels, may be used as the size of the coding node.

(Tree Block Header)

The tree block header TBLKH includes coding parameters which are referred to by the hierarchical moving image decoding device 1 for determining a target tree block decoding method. Specifically, as shown in (d) of FIG. 4, the tree block header includes tree block split information SP_TBLK designating a split pattern of the target tree block into each CU, and quantization parameter difference Δqp(qp-delta) designating the size of a quantization step.

The tree block split information SP_TBLK is information indicating a coding tree for splitting the tree block, specifically, information designating the shape and size of each CU included in the target tree block, and the position of the CU in the target tree block.

Further, the quantization parameter difference Δqp is a difference qp-qp' between the quantization parameter qp of the target tree block and the quantization parameter qp' in the coded tree block immediately before the target tree block.

(CU Layer)

In the CU layer, a set of data which is referred to by the hierarchical moving image decoding device 1 for decoding the CU to be processed (hereinafter, referred to as an object CU) is defined.

Here, prior to the description of the specific contents of data included in the CU information CU, a tree structure of data included in the CU will be described. The coding node is a root node of a prediction tree (PT) and a transform tree (TT). The descriptions of the prediction tree and the transform tree are as follows.

In the prediction tree, the coding node is split into one or a plurality of prediction blocks, and the position and the size of each prediction block are defined. In other words, the prediction block is one or a plurality of regions, which do not overlap with each other, constituting the coding node. Further, the prediction tree includes one or a plurality of prediction blocks which are obtained by the above division.

The prediction process is performed for each prediction block. Hereinafter, a prediction block which is a unit of prediction is also referred to as a prediction unit (PU).

Further, in the transform tree, the coding node is split into the one or a plurality of transform blocks, and the position and size of each transform block is defined. In other words, a transform block is one or a plurality of regions constituting the coding node, which do not overlap with each other. Further, the transform tree includes one or a plurality of transform blocks which are obtained from the above splitting.

The transform process is performed for each transform block. Hereinafter, a transform block which is a unit of transform is referred to as a transform unit (TU).

(Data Structure of CU Information)

Subsequently, the specific contents of data included in the CU information CU will be described with reference to FIG. 4(e). As illustrated in FIG. 4(e), the CU information CU includes, specifically, a skip flag SKIP, prediction tree information (hereinafter, abbreviated as PT information) PTI, and transform tree information (hereinafter, abbreviated as TT information) TTI.

(Skip Flag)

The skip flag SKIP is a flag indicating whether or not the skip mode is applied to the target PU. When the value of the skip flag SKIP is 1, in other words, when the skip mode is applied to the target CU, some pieces of PT information PTI and TT information TTI in the CU information CU are omitted. In addition, the skip flag SKIP is omitted in the I slice.

[PT Information]

The PT information PTI is information regarding the prediction tree (hereinafter, abbreviated as PT) included in the CU. In other words, the PT information PTI is a set of information regarding each of one or a plurality of PUs included in the PT, and is referred when a predicted image is generated by the hierarchical moving image decoding device 1. As illustrated in FIG. 4(e), the PT information PTI includes prediction type information PType and prediction information PInfo.

The prediction type information PType is information designating whether an intra-prediction is used or an inter-prediction is used as a predicted image generation method for the target PU.

The prediction information PInfo includes intra-prediction information PP-Intra or inter-prediction information PP-Inter, depending on which prediction method is designated by the prediction type information Ptype. Hereinafter, a PU to which the intra-prediction is applied is referred to as an intra-PU, and a PU to which the inter-prediction is applied is referred to as an inter-PU.

The inter-prediction information PP-Inter includes coding parameters which are referred to by the hierarchical moving image decoding device 1 when generating an inter-predicted image by the inter-prediction. More specifically, the inter-prediction information PP-Inter includes inter-PU split information designating a split pattern of the target CU to each inter-PU, and inter-prediction parameter for each inter-PU. Examples of the inter-prediction parameter include an estimated motion vector index (mvp_idx), a reference image index (ref_idx), an inter-prediction flag (inter_pred_flag), and a motion vector residual (mvd).

The intra-prediction information PP-Intra includes coding parameters which are referred to by the hierarchical moving image decoding device 1 when generating an intra-predicted image by the intra-prediction. More specifically, the intra-prediction information PP-Intra includes intra-PU split information designating a split pattern of the target CU to each intra-PU, and intra-prediction parameter for each intra-PU. The intra-prediction parameter is a parameter for designating an intra-prediction method (prediction mode) for each intra-PU. Examples of intra-prediction parameter include an estimated prediction mode flag, an estimated prediction mode index, and a residual prediction mode index.

Further, the PU split information may include information designating the shape, size, and position of the target PU. Assuming that the size of the target CU is 2N×2N pixels, the PU split type designated by the PU split information have a total of eight types of patterns as follows. In other words, they are four types of symmetric splittings such as 2N×2N pixels, 2N×N pixels, N×2N pixels, and N×N pixels, and four types of asymmetric splitting such as 2N×nU pixels, 2N×nD pixels, nL×2N pixels, and nR×2N pixels. In addition, it means that N=$2^m$ (m is an arbitrary integer of 1 or more). Hereinafter, a region obtained by splitting the target CU is also referred to as a partition.

[TT Information]

TT information TTI is information regarding a transform tree (hereinafter, abbreviated as TT) included in the CU. In other words, the TT information TTI is a set of information regarding one or each of a plurality of TUs included in the TT, and is referred during the decoding of the residual data by the hierarchical moving image decoding device 1. In addition, hereinafter, the TU is referred to as a block.

As illustrated in FIG. 4(e), the TT information TTI includes TT split information SP_TT for designating a splitting pattern of the target CU to each transform block, and quantized prediction residuals QD1 to QDrr (NT is a total number of blocks included in the target CU).

Specifically, the TT split information SP_TT is information for determining the shape and size of each TU included in the target CU, and the position of each TU in the target CU. For example, it is possible to realize the TT split information SP_TT from the information (split_transform_unit_flag) indicating whether or not to perform splitting of a node which is a target and the information (trafoDepth) indicating the depth of the splitting.

Further, for example, when the size of CU is 64×64, each TU obtained by splitting has a size of 32×32 pixels to 4×4 pixels.

Each quantized prediction residual QD is coded data generated by the hierarchical moving image coding device 2 performing the following processes 1 to 3 on the target block which is a processing target block.

Process 1: Frequency conversion (for example, discrete cosine transform (DCT) and discrete sine transform (DST)) of a prediction residual obtained by subtracting a predicted image from a coding target image;

Process 2: Quantization of transform coefficients obtained by the process 1;

Process 3: Variable-length coding of the transform coefficients quantized in the process 2;

In addition, the quantization parameter qp described above represents the size of the quantization step QP used when the hierarchical moving image coding device 2 quantizes the transform coefficients (QP=$2^{qp/6}$).

(Enhancement Layer)

It is possible to employ, for example, a data structure similar to the data structure shown in FIG. 4, for the coded data of the enhancement layer. However, in the coded data of the enhancement layer, it is possible to add additional information or to omit a parameter as follows.

Information indicating hierarchical coding may be coded in the VPS or the SPS.

Further, respective pieces of hierarchical identification information regarding the spatial scalability, the time scalability, and the SNR scalability (respectively, dependency_id, temporal_id, and quality_id) may be coded in the slice layer. It is possible to code filter information and on/off information regarding a filter (described later) by the PPS, the slice header, the macro block header, and the like.

Further, a skip flag (skip_flag), a base mode flag (base_mode_flag) and a prediction mode flag (pred_mode_flag) may be coded in the CU information CU.

Further, the flags may specify that the CU type of the target CU is any of the intra-CU, the inter-CU, the skip CU and the base skip CU.

It is possible to define the intra-CU and the skip CU similar to the case of the HEVC method described above. For example, in the skip CU, "1" is set in the skip flag. In the case of not skip CU, "0" is set in the skip flag. Further, in the intra-CU, "0" is set in the prediction mode flag.

Further, the inter-CU may be defined as a CU to which a non-skip or motion compensation (MC) is applied. In the inter-CU, for example, "0" is set in the skip flag, and "1" is set in the prediction mode flag.

The base skip CU is a CU type of estimating the information regarding the CU or the PU from the reference layer. Further, in the base skip CU, for example, "1" is set in the skip flag, "1" is set in the base mode flag.

Further, the PT information PTI may specify that the PU type of the target PU is any of the intra-PU, the inter-PU, the merge PU, and the base merge PU.

It is possible to define the intra-PU, the inter-PU, and the merge PU, similar to the case of the HEVC method described above.

In addition, it is possible to use a configuration of omitting the motion vector information which can be derived from the motion vector information included in the lower layer among motion vector information included in the enhancement layer from the enhancement layer. By such a configuration, it is possible to reduce the code amount of the enhancement layer, and thus the coding efficiency is improved.

Further, the coded data of the enhancement layer may be generated by the coding scheme different from the coding scheme of the lower layer, as described above. In other words, the coding and decoding process of the enhancement layer is not dependent on the type of the codec of the lower layer.

The lower layer may be coded by, for example, the MPEG-2 or the H.264/AVC method.

When the target layer and the reference layer are coded by different coding schemes, it is possible to maintain compatibility of each other in the inter-layer by transforming the parameter of the reference layer into a corresponding parameter or a similar parameter of the target layer. For example, it is possible to read and interpret the macro block of the MPEG-2 or the H.264/AVC method as the CTB of the HEVC.

In addition, the parameters described above may be coded alone, and a plurality of parameters may be coded in a complex manner. When the plurality of parameters are coded in a complex manner, an index is assigned to the combination of the parameter values, and the assigned index is coded. Further, if the parameters can be derived from another parameter and decoding information, it is possible to omit coding of the parameters.

[Hierarchical Moving Image Decoding Device]

Hereinafter, the configuration of the hierarchical moving image decoding device 1 according to the present example will be described with reference to FIGS. 1 to 19.

(Configuration of Hierarchical Moving Image Decoding Device)

Figure 5:
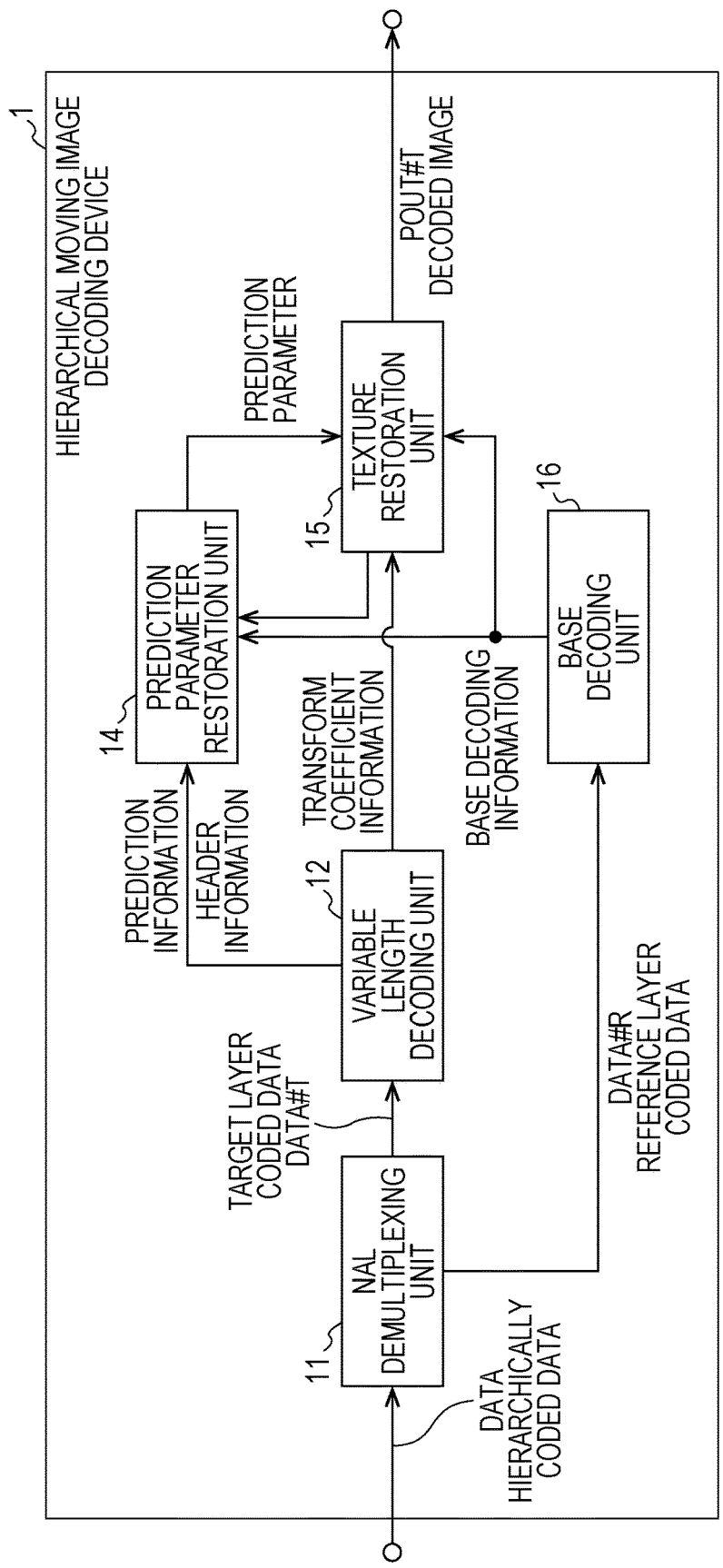
FIG. 5 is a functional block diagram illustrating a schematic configuration of a hierarchical moving image decoding device according to an embodiment of the present invention.

The description of a schematic configuration of the hierarchical moving image decoding device 1 with reference to FIG. 5 is as follows. FIG. 5 is a functional block diagram illustrating a schematic configuration of the hierarchical moving image decoding device 1. The hierarchical moving image decoding device 1 generates a decoded image POUT#T of a target layer by decoding the hierarchically coded data DATA supplied from the hierarchical moving image coding device 2 by an HEVC method.

As illustrated in FIG. 5, the hierarchical moving image decoding device 1 includes an NAL demultiplexing unit 11, a variable length decoding unit 12, a prediction parameter restoration unit 14, a texture restoration unit 15, and a base decoding unit 16.

[NAL Demultiplexing Unit 11]

The NAL demultiplexing unit 11 demultiplexes the hierarchically coded data DATA which is transmitted in an NAL unit in a network abstraction layer (NAL).

The NAL is a layer provided in order to abstract the communication between a video coding layer (VCL) and a lower system that transmits and stores the coded data.

The VCL is a layer for performing a moving image coding process, and coding is performed by the VCL. Meanwhile, the lower system referred to herein corresponds to the file formats of H.264/AVC and HEVC, and an MPEG-2 system. In the example illustrated below, the lower system corresponds to the decoding process in the target layer and reference layer.

In addition, in the NAL, a bit stream generated by the VCL is separated into an NAL unit, and transmitted to the lower system which is a destination. The NAL unit includes coded data which has been coded by the VCL, and a header (NAL unit header: nal_unit_header( )) for the coded data to appropriately reach the lower system which is the destination. In addition, the NAL unit header may be represented by the syntax shown in, for example, FIG. 7(c). The NAL unit header includes an "nal_unit_type" representing a type of coded data stored in the NAL unit, "nuh_temporal_id_plus1" representing an identifier (temporal identifier) of a sublayer to which the stored coded data belongs, and "nuh_layer_id" (or nuh_reserved_zero_6bits) representing an identifier of a layer (layer identifier) to which the stored coded data belongs.

Further, the coded data in each hierarchy is stored in an NAL unit, such that the coded data is NAL multiplexed and transmitted to the hierarchical moving image decoding device 1.

The NAL demultiplexing unit 11 extracts target layer coded data DATA#T and reference layer coded data DATA#R (hereinafter, simply referred to as coded data DATA#R) by demultiplexing the hierarchically coded data DATA. Further, the NAL demultiplexing unit 11 supplies the target layer coded data DATA#T (hereinafter, simply referred to as coded data DATA#T) to the variable length decoding unit 12, and supplies the reference layer coded data DATA#R to the base decoding unit 16.

[Variable Length Decoding Unit 12]

The variable length decoding unit 12 performs a decoding process of information for decoding various syntax values from binary values included in the target layer coded data DATA#T.

Figure 6:
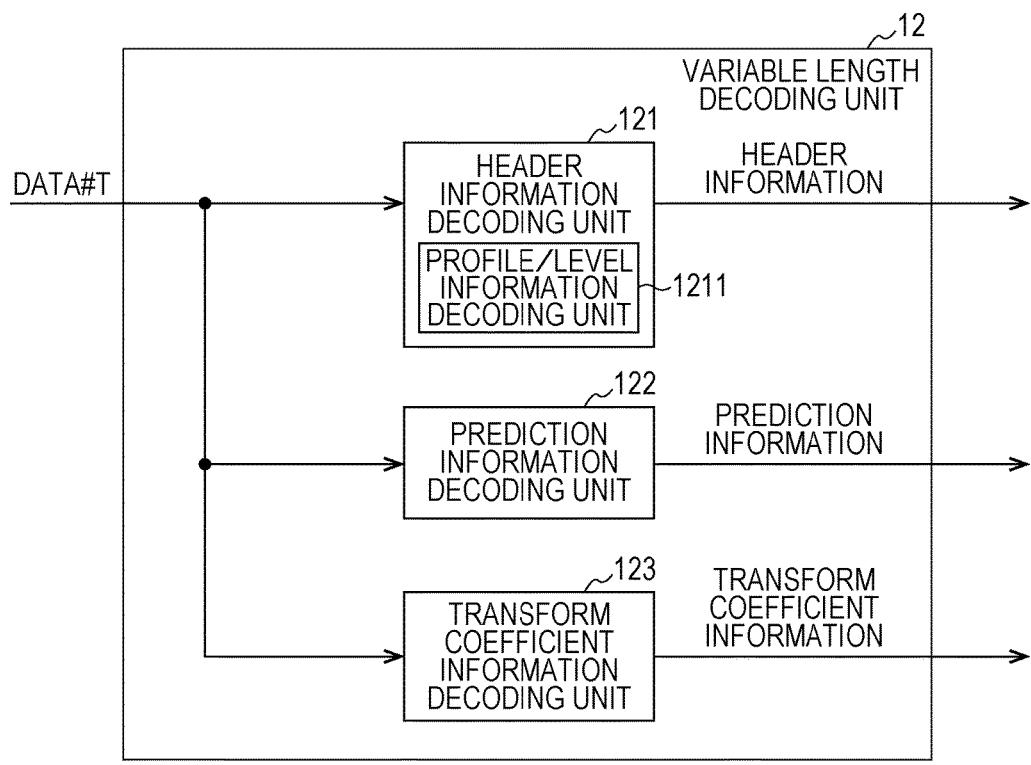
FIG. 6 is a functional block diagram illustrating a schematic configuration of a variable length decoding unit 12 according to an embodiment of the present invention.

Specifically, the variable length decoding unit 12 includes, as illustrated in FIG. 6, a header information decoding unit 121, a prediction information decoding unit 122, and a transform coefficient information decoding unit 123. Further, the header information decoding unit 121 includes a profile/level information decoding unit 1211.

[Header Information Decoding Unit 121]

The header information decoding unit 121 decodes the header information regarding parameters used for decoding, per sequence, per picture, or per slice, from the coded data DATA#T.

The header information decoding unit 121 decodes information used for decoding per sequence, based on syntax definition defining a VPS and an SPS included in the coded data DATA#T.

For example, from the VPS, the syntax shown in FIG. 7(a) is decoded. Each syntax has a meaning as follows. In addition, the syntax shown in FIG. 7(a) is an example of the syntax of the VPS, and the syntax includes set HRD parameters of parameters (hrd-parameters) for operating a virtual decoder so as to satisfy the capabilities of a decoder (sizes of a CPB and a DPB, and the like) defined by level information (including sublayer level information) determined for each layer which is not shown in FIG. 7(a), the enhancement flags of the VPS, the enhancement data of the VPS, and the like.

"video_parameter_set_id" is an identifier for identifying each VPS.

"vps_temporal_id_nesting_flag" is a flag indicating whether to additionally constrain inter-prediction of a picture referring to the VPS.

"vps_resereved_zero_2bits" is syntax that is reserved when extending the future HEVC.

"vps_reserved_zero_6bits", or "vps_max-_num_layers_minus1" is syntax used to calculate an upper limit MaxNumLayers of the number of layers for the other scalabilities, other than the time scalability, with respect to the hierarchically coded data including at least the base layer. In addition, the upper limit MaxNumLayers of the number of layers is represented by MaxNumLayers=vps_max_num_layers_minus1+1. When the hierarchically coded data is constituted only by the base layer, it is established that vps_max_num_layers_minus1=0.

"vps_max_sub_layer_minus1" is syntax that is used to calculate an upper limit MaxNumSubLayers of the number of layers (sublayers) regarding the time scalability of the hierarchically coded data including at least the base layer. In addition, the upper limit Max- NumSubLayers of the number of sublayers is represented by MaxNumSubLayers=vps_max_sub_layers_minus1+1.

"profile_tier_level(X,Y)" is syntax (hereinafter, also referred to as profile/level information) indicating the profile information and the level information regarding the hierarchically coded data. In addition, an argument X is the value of the profile information present flag ProfilePresentFlag, and an argument Y is a value of (the upper limit of the number of sublayers−1), that is, MaxNumSubLayersMinus1. In addition, the argument Y may be the value of the MaxNumSubLayers, instead of the value of (the upper limit of the number of sublayers−1) MaxNumSubLayersMinus1. In this case, the MaxNumSubLayersMinus1 of the profile/level information profile_tier_level( ) is interpreted as "MaxNumSubLayers−1". Hereinafter, a description will be made by using the upper limit of the number of sublayers MaxNumSubLayers, instead of the value of (the upper limit of the number of sublayers−1) MaxNumSubLayersMinus1. In addition, the profile/level information profile_tier_level( ) will be described later. In addition, in the profile/level information defined herein, the maximum of the profile/level information required for the decoder to decode all layers (including the base layer, the enhancement layer, and sublayers associated with each layer) is set.

In addition, the profile/level information profile_tier_level( ) included in the VPS is decoded in the profile/level information decoding unit 1211 described later.

"vps_reserved_zero_12bits" or "next_essensial_info_byte_offset" is an offset value indicating the number of bytes from the first position of the NAL unit including the VPS to the next important syntax represented by a fixed length symbol on the VPS.

Further, from the SPS, for example, the syntax illustrated in FIG. 7(*b*) is decoded. The meaning of each syntax is as follows. In addition, the syntax illustrated in FIG. 7(*b*) is an example of syntax of the SPS, and includes information regarding the image size which is not illustrated in FIG. 7(*b*), information regarding a crop, an enhancement flag of the SPS, enhancement data of the SPS, and the like.

"video_parameter_set" is a VPS identifier (video_parameter_set_id) for specifying a VPS to be referenced by the SPS corresponding to the SPS identifier (seq_parameter_set_id) described later.

"sps_max_sub_layers_minus1" is syntax used to calculate an upper limit MaxNumSubLayers of the number of sublayers regarding the time scalability of the target layer. In addition, the upper limit MaxNumSubLayers of the number of sublayers is represented by MaxNumSubLayers=sps_max_sub_layers_minus1+1.

"sps_reserved_zero_bit" is syntax reserved when extending a future HEVC.

"profile_tier_level(X,Y)" is syntax representing the profile information and the level information regarding the coded data of the target layer DATA#T. In addition, an argument X is the value of the profile information present flag ProfilePresentFlag, and an argument Y is the value of (the upper limit of the number of sublayers−1), in other words, MaxNumSubLayersMinus1. In addition, in the profile/level information defined in the SPS, the profile/level information required for the decoder to decode the target layer and the sublayer associated with the target layer is set. In addition, the profile/level information profile_tier_level( ) included in the SPS is decoded in the profile/level information decoding unit 1211 described later.

"seq_parameter_set_id" is an identifier for identifying each SPS.

The header information decoding unit 121 further includes a profile/level information decoding unit 1211 that decodes profile/level information profile_tier_level( ) included in the VPS and the SPS. The profile/level information decoding unit 1211 decodes the profile/level information profile_tier_level( ) from the coded data DATA#T, with the profile present flag ProfilePresentFlag and the number of sublayers MaxNumSubLayers as inputs. The details will be described later.

In addition, with respect to the syntax placed at the beginning on the VPS, as illustrated in FIG. 31, the syntax "next_essensial_info_byte_offset" ("vps_reserved_zero_12bits") denoted by a symbol SYNL101 is placed immediately before the profile/level information profile_tier_level( ), and thus each syntax may be decoded/coded in the following order.

video_parameter_set_id
vps_temporal_id_nesting_flag
vps_reserved_zero_2bits
vps_reserved_zero_6bits
vps_max_sub_layers_minus1
next_essensial_info_byte_offset
profile_tier_level(ProfilePresentFlag, vps_max_sub_layers_minus1)
. . . following omitted . . . .

Since the syntax "next_essensial_info_byte_offset" is placed immediately before the profile/level information on the VPS, even if the entire profile/level information on the VPS is not decoded, there is an effect in that it is possible to directly and early access and decode important information located in the byte offset position designated by "next_essensial_info_byte_offset". Further, in order to keep the byte alignment of the first syntax of the VPS, it is preferable to change the code length of the syntax "next_essensial_info_byte_offset" from 12 bits to 16 bits. Further, it is possible to extend the byte offset that can be designated, by extending the code length of the syntax "next_essensial_info_byte_offset" to 16 bits.

[Prediction Information Decoding Unit 122]

The prediction information decoding unit 122 decodes prediction information regarding each CU or PU from the coded data DATA#T.

The prediction information includes, for example, information designating a CU type or a PU type and information for specifying the shape, size, and position of the CU.

When the CU is the inter-CU, the prediction information decoding unit 122 decodes PU split information from the coded data DATA#T. In addition, in each PU, the prediction information decoding unit 122 further decodes a reference image index (refIdx), motion information such as an estimated motion vector index (mvp_idx), and a motion vector residual (mvd), and mode information, as the prediction information, from the coded data DATA#T.

Meanwhile, when the CU is an intra-CU, the prediction information decoding unit 122 decodes (1) size designation information for designating a size of a prediction unit and (2) prediction index designation information for designating a prediction index, as prediction information, from coded data DATA#T.

Further, the prediction information decoding unit 122 decodes tree block split information for designating a split pattern of the target tree block to each CU, in other words, information for designating the shape, the size, and the position in the target tree block of each CU included in the target tree block (information for specifying the shape, the size, and the position of the CU) from coded data DATA#T.

Further, the prediction information decoding unit 122 supplies the decoded prediction information to the prediction parameter restoration unit 14.

[Transform Coefficient Information Decoding Unit 123]

The transform coefficient information decoding unit 123 decodes the quantization prediction residual QD regarding each block and a quantization parameter difference Δqp regarding a tree block including the block, from the coded data DATA#T. The transform coefficient information decoding unit 123 supplies the quantization prediction residual QD and the quantization parameter difference Δqp which are decoded, as the transform coefficient information, to the texture restoration unit 15.

[Base Decoding Unit 16]

The base decoding unit 16 decodes base decoding information which is information regarding a reference layer which is referred to when decoding the decoded image corresponding the target layer, from the reference layer coded data DATA#R. The base decoding information includes a base prediction parameter, a base transform coefficient, and a base decoded image. The base decoding unit 16 supplies the decoded base decoding information to the prediction parameter restoration unit 14 and the texture restoration unit 15.

[Prediction Parameter Restoration Unit 14]

The prediction parameter restoration unit 14 restores a prediction parameter by using prediction information and base decoding information. The prediction parameter restoration unit 14 supplies the restored prediction parameter to the texture restoration unit 15. In addition, when restoring the prediction parameter, the prediction parameter restoration unit 14 can refer to the inter-prediction parameter which is stored in the frame memory 155 (described later) included in the texture restoration unit 15.

[Texture Restoration Unit 15]

The texture restoration unit 15 generates a decoded image POUT#T by using the transform coefficient information, the base decoding information, and the prediction parameter, and outputs the decoded image POUT#T to the outside. In addition, in the texture restoration unit 15, information regarding the restored decoded image is stored in a frame memory 155 (described later) provided therein.

Hereinafter, a description will be made regarding respective details of the base decoding unit 16, the prediction parameter restoration unit 14, and the texture restoration unit 15.

(Prediction Parameter Restoration Unit)

Figure 8:
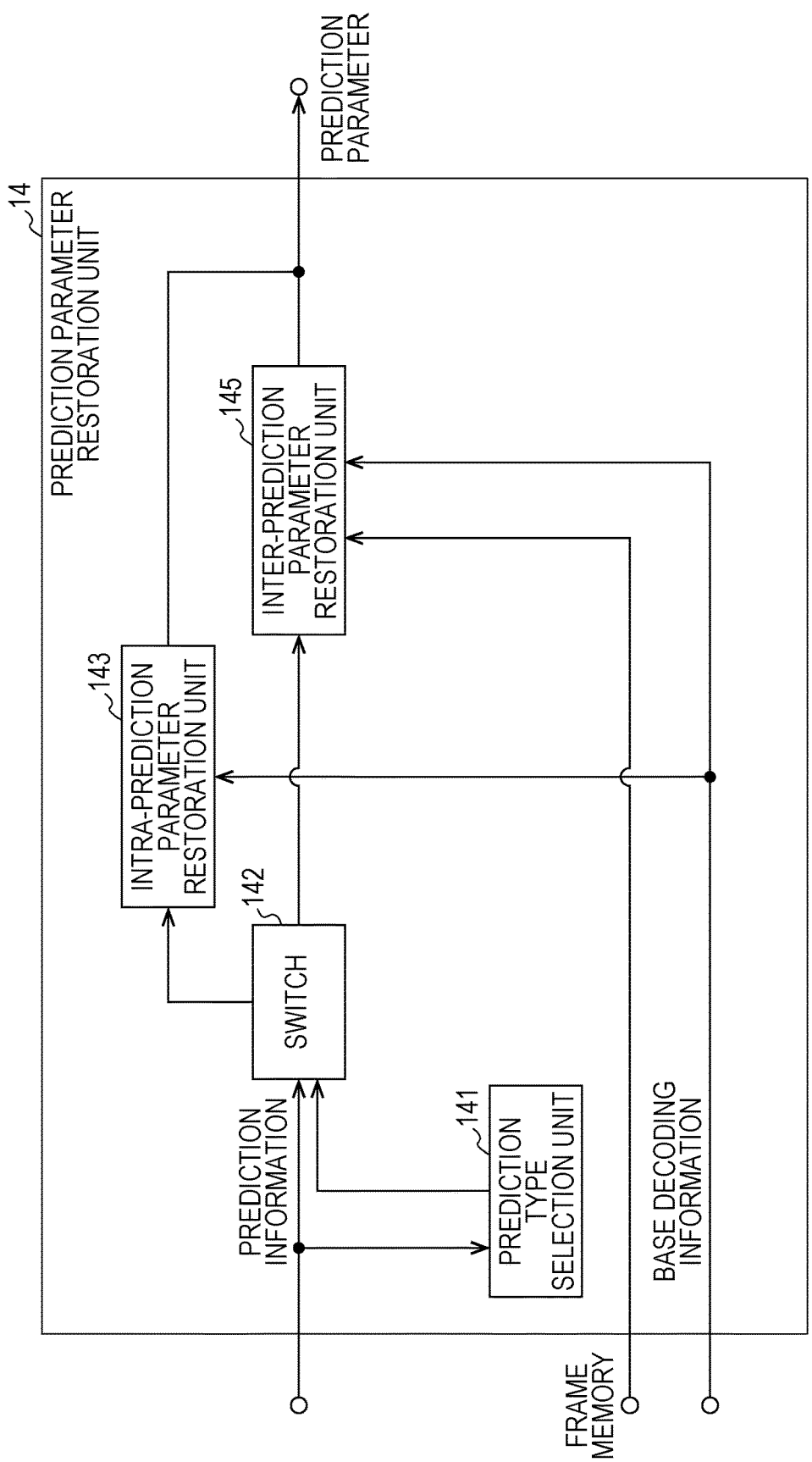
FIG. 8 is a functional block diagram illustrating a schematic configuration of a prediction parameter restoration unit included in the hierarchical moving image decoding device.

The detailed configuration of the prediction parameter restoration unit 14 will be described with reference to FIG. 8. FIG. 8 is a functional block diagram illustrating a configuration of the prediction parameter restoration unit 14.

As illustrated in FIG. 8, the prediction parameter restoration unit 14 includes a prediction type selection unit 141, a switch 142, an intra-prediction parameter restoration unit 143, and an inter-prediction parameter restoration unit 145.

The prediction type selection unit 141 controls the derivation process of the prediction parameter by sending a switching instruction to the switch 142 depending on the CU type or the PU type. The details are as follows.

When the intra-CU or the intra-PU is designated, the prediction type selection unit 141 controls the switch 142 so as for the intra-prediction parameter restoration unit 143 to derive the prediction parameter.

When the inter-CU and the inter-PU are designated, the prediction type selection unit 141 controls the switch 142 so as for the inter-prediction parameter restoration unit 145 to derive the prediction parameter.

The switch 142 supplies the prediction information to either of the intra-prediction parameter restoration unit 143 or the inter-prediction parameter restoration unit 145, in response to the instruction from the prediction type selection unit 141. The prediction parameter is derived in the supply destination of the prediction information.

The intra-prediction parameter restoration unit 143 derives a prediction mode from the base decoding information or the prediction information. In other words, the intra-prediction parameter restoration unit 143 restores the prediction mode (intra-prediction mode) as the prediction parameter.

In addition, the intra-prediction mode includes "Intra-Planar (planar prediction mode, a flat prediction mode)", "Intra DC (intra DC prediction mode)", "Intra Angular (direction prediction)", "Intra From Luma" for predicting color difference based on the prediction of luminance, and the like.

When the target CU (PU) is the inter-CU (inter-PU), the inter-prediction parameter restoration unit 145 restores an inter-prediction parameter from the prediction information, the base decoding information, and the decoded inter-prediction parameter which is stored in a frame memory. More specifically, the inter-prediction parameter restoration unit 145 first derives estimated motion vector candidates by an intra-layer motion estimation process or an inter-layer motion estimation process, by using the base decoding information. Subsequently, the inter-prediction parameter restoration unit 145 acquires a motion vector residual (mvd), an estimated motion vector index (mvp_idx), an inter-prediction flag (inter_pred_flag) and a reference image index (refIdx). Then, based on the value of the inter-prediction flag, reference image list available flags are respectively determined for the reference image list L0 and the reference image list L1. Subsequently, when the corresponding reference image list available flag indicates that the reference image is used, the inter-prediction parameter restoration unit 145 derives the estimated motion vector, based on the value of the estimated motion vector index, and derives the motion vector, based on the motion vector residual and the estimated motion vector. The inter-prediction parameter restoration unit 145 outputs the inter-prediction parameter, by combining the derived motion vectors, the reference image list available flag and the reference image index.

(Texture Restoration Unit)

Figure 9:
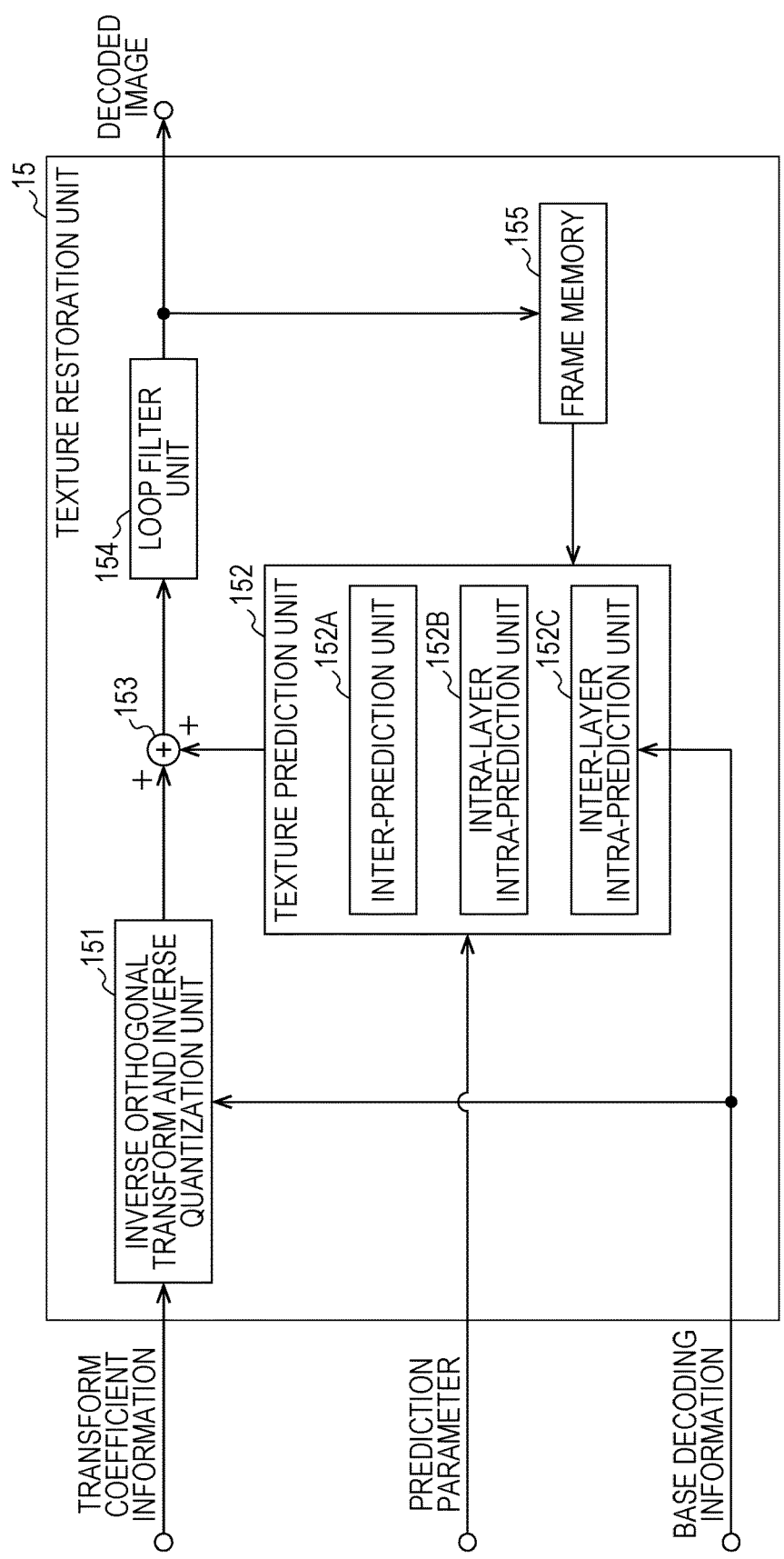
FIG. 9 is a functional block diagram illustrating a schematic configuration of a texture restoration unit included in the hierarchical moving image decoding device.

The detailed configuration of the texture restoration unit 15 will be described with reference to FIG. 9. FIG. 9 is a functional block diagram illustrating a configuration of the texture restoration unit 15.

As illustrated in FIG. 9, the texture restoration unit 15 includes an inverse orthogonal transform and inverse quantization unit 151, a texture prediction unit 152, an adder 153, a loop filter unit 154, and a frame memory 155.

The inverse orthogonal transform and inverse quantization unit 151, (1) inverse quantizes the quantized prediction residual QD included in the transform coefficient information supplied from the variable length decoding unit 12, (2) inverse orthogonal transforms the DCT coefficient obtained by the inverse quantization (for example, discrete cosine transform (DCT) transform), and (3) supplies prediction residual D obtained by the inverse orthogonal transform to the adder 153. In addition, when the quantized prediction residual QD is inverse quantized, the inverse orthogonal transform and inverse quantization unit 151 derives a quantization step QP from the quantization parameter difference Δqp included in the transform coefficient information. The quantization parameter qp can be derived by adding the quantization parameter difference Δqp to the quantization parameter qp' regarding the tree block which is inverse quantized/inverse orthogonal transformed immediately before, and the quantization step QP can be derived by $QP=2^{qp/6}$ from the quantization parameter qp. Further, the generation of the prediction residual D by the inverse orthogonal transform and inverse quantization unit 151 is performed with the block (transform unit) as a unit.

The texture prediction unit 152 generates a predicted image, with reference to the base decoded image included in the base decoding information or the decoded image, for which decoding has been completed, stored in the frame memory, according to the prediction parameter.

More specifically, the texture prediction unit 152 includes an inter-prediction unit 152A, an intra-layer intra-prediction unit 152B, and an inter-layer intra-prediction unit 152C.

The inter-prediction unit 152A generates a predicted image regarding each inter-prediction partition by the inter-prediction. Specifically, the inter-prediction unit 152A generates the predicted image from the reference image, by using the motion information supplied from the motion information restoration unit 145 or the merge information restoration unit 147, as the prediction parameter.

The intra-layer intra-prediction unit 152B generates the predicted image regarding each intra-prediction partition by the intra-layer intra-prediction. Specifically, the intra-layer intra-prediction unit 152B generates the predicted image from the decoded image for which decoding has been completed, by using the prediction mode supplied from the intra-prediction mode restoration unit 143, as the prediction parameter.

The inter-layer intra-prediction unit 152C generates a predicted image regarding each intra-prediction partition by the inter-layer intra-prediction. Specifically, the inter-layer intra-prediction unit 152C generates a predicted image based on the base decoded image included in the base decoding information, by using the prediction mode supplied from the intra-prediction mode restoration unit 143, as the prediction parameter. The base decoded image may be appropriately up-sampled in accordance with the resolution of the target layer.

The texture prediction unit 152 supplies the predicted images which are generated by the inter-prediction unit 152A, the intra-layer intra-prediction unit 152B, or the inter-layer intra-prediction unit 152C, to the adder 153.

The adder 153 generates a decoded image by adding the texture prediction unit 152 predicted image and the prediction residual D supplied from the inverse orthogonal transform and inverse quantization unit 151.

The loop filter unit 154 performs a de-blocking process and a filter process by an adaptive filter parameter on the decoded image supplied from the adder 153.

The frame memory 155 stores the decoded image which is filtered by the loop filter unit 154.

(Base Decoding Unit)

Figure 10:
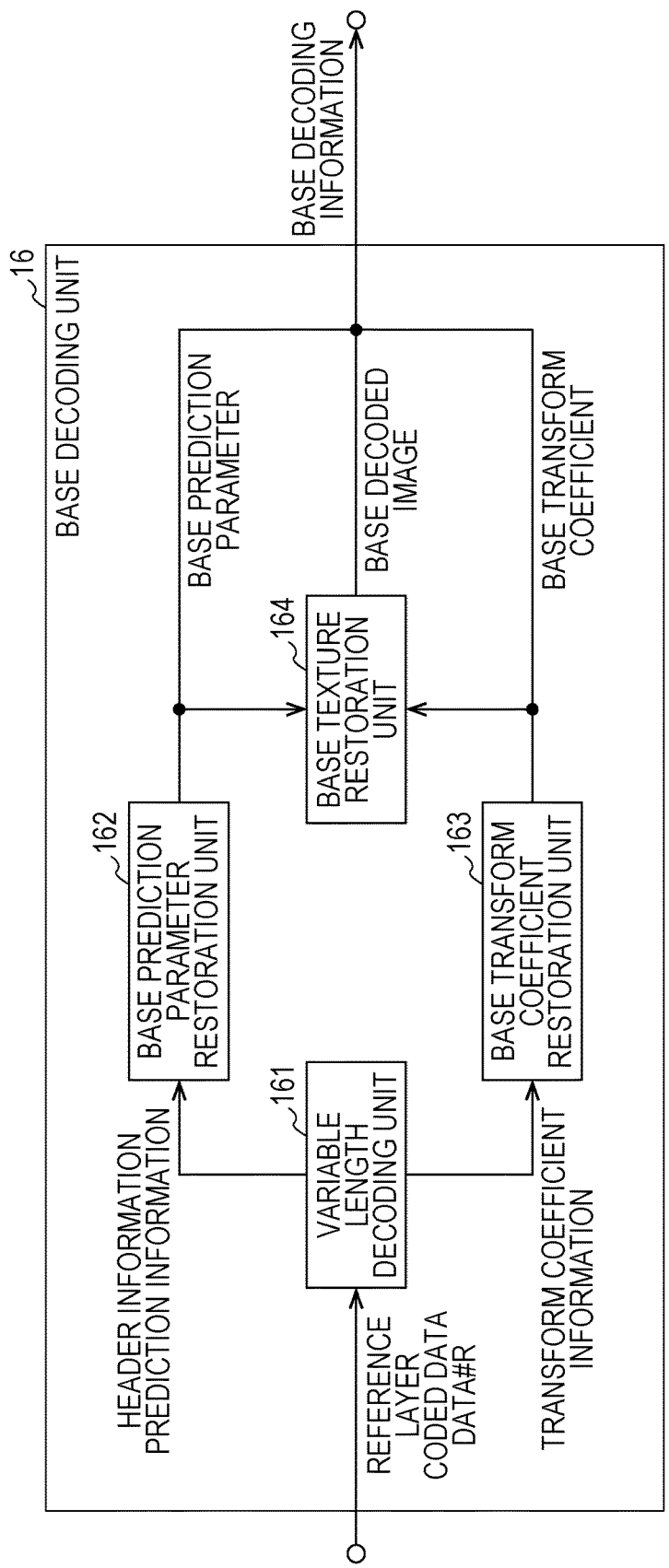
FIG. 10 is a functional block diagram illustrating a schematic configuration of a base decoding unit included in the hierarchical moving image decoding device.

The detailed configuration of the base decoding unit 16 will be described with reference to FIG. 10. FIG. 10 is a functional block diagram illustrating a configuration of the base decoding unit 16.

As illustrated in FIG. 10, the base decoding unit 16 includes a variable length decoding unit 161, a base prediction parameter restoration unit 162, a base transform coefficient restoration unit 163, and a base texture restoration unit 164.

The variable length decoding unit 161 performs a decoding process of information for decoding various syntax values from binary data included in the reference layer coded data DATA#R.

Specifically, the variable length decoding unit 161 decodes the prediction information and the transform coefficient information from the coded data DATA#R. Since the syntaxes of the prediction information and the transform coefficient which are decoded by the variable length decoding unit 161 are the same as in the variable length decoding unit 12, the detailed description thereof will be omitted.

The length decoding unit 161 supplies the decoded prediction information to the base prediction parameter restoration unit 162, and supplies the decoded transform coefficient information to the base transform coefficient restoration unit 163.

The base prediction parameter restoration unit 162 restores the base prediction parameter, based on the prediction information supplied from the variable length decoding unit 161. A method by which the base prediction parameter restoration unit 162 restores the base prediction parameter is similar to the prediction parameter restoration unit 14, and thus the detailed description thereof will be omitted here. The base prediction parameter restoration unit 162 supplies the restored base prediction parameter to the base texture restoration unit 164, and outputs the restored base prediction parameter to the outside.

The base transform coefficient restoration unit 163 restores the transform coefficient, based on the transform coefficient information supplied from the variable length decoding unit 161. A method by which the base transform coefficient restoration unit 163 restores the transform coefficient is similar to the inverse orthogonal transform and inverse quantization unit 151, and thus the detailed description thereof will be omitted here. The base transform coefficient restoration unit 163 supplies the restored base transform coefficient to the base texture restoration unit 164, and outputs the restored base transform coefficient to the outside.

The base texture restoration unit 164 generates a decoded image, by using the base prediction parameter supplied from the base prediction parameter restoration unit 162 and the base transform coefficient supplied from the base transform coefficient restoration unit 163. Specifically, the base texture restoration unit 164 generates a predicted image by performing the same texture prediction as that by the texture prediction unit 152, based on the base prediction parameter. Further, the base texture restoration unit 164 generates the prediction residual based on the base transform coefficient, and generates the base decoded image by adding the generated prediction residual and the predicted image generated by the texture prediction.

In addition, the base texture restoration unit 164 may perform the same filter process as that by the loop filter unit 154 on the base decoded image. Further, the base texture restoration unit 164 may include a frame memory for storing the decoded base decoded image, and may refer the decoded base decoded image which is stored in the frame memory for the texture prediction.

Example 1

<<Details of Profile/Level Information Decoding Unit 1211>>

Next, the details of a profile/level information decoding unit 1211 according to an example 1 will be described with reference to FIG. 1, FIG. 11, and FIG. 12.

Figure 1:
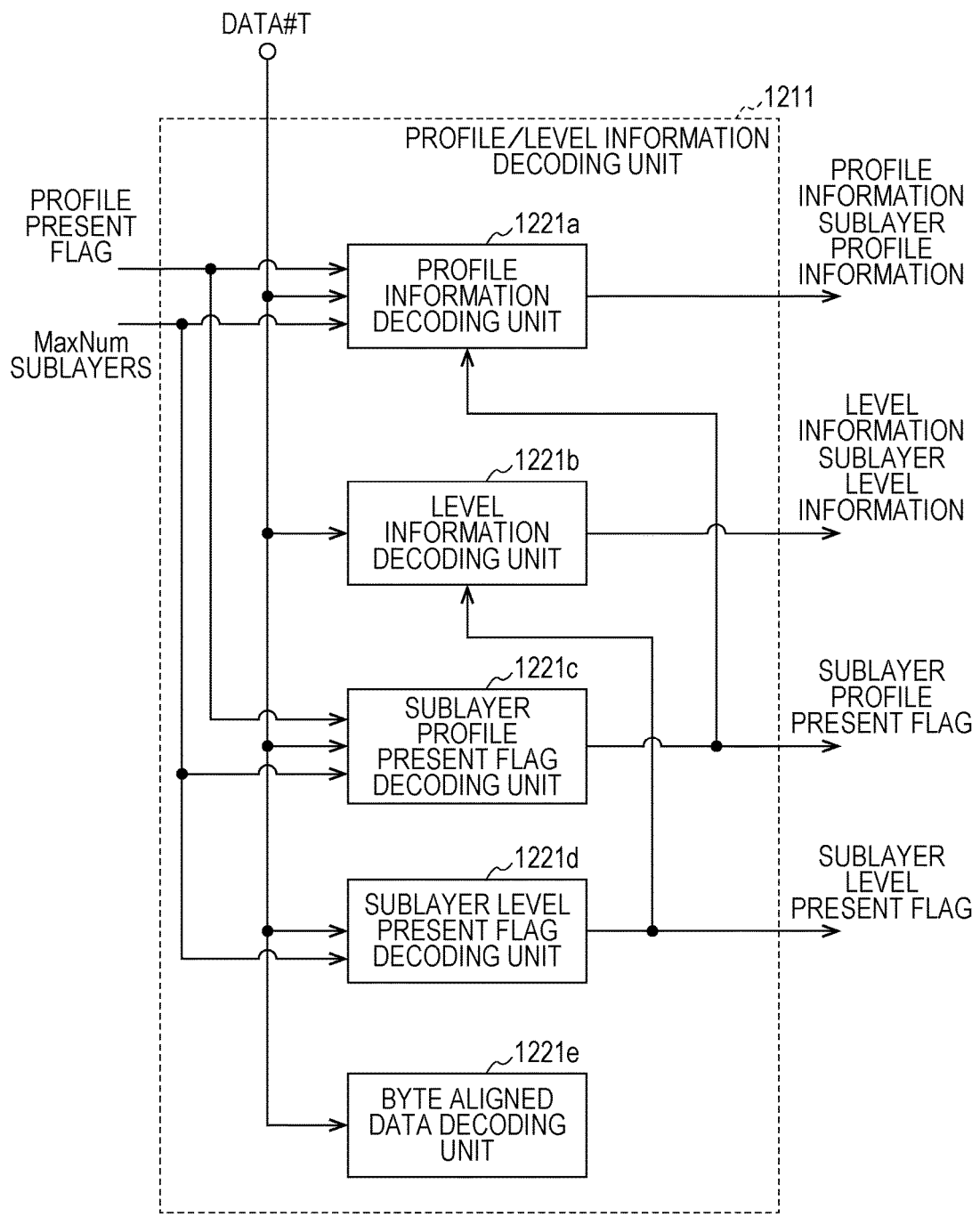
FIG. 1 is a functional block diagram illustrating a schematic configuration of a profile/level information decoding unit 1211 according to an embodiment of the present invention.

FIG. 1 is a block diagram illustrating a configuration of the profile/level information decoding unit 1211.

As illustrated in FIG. 1, the profile/level information decoding unit 1211 includes a profile information decoding unit 1221a, a level information decoding unit 1221b, a sublayer profile present flag decoding unit 1221c, a sublayer level present flag decoding unit 1221d, and a byte-aligned data decoding unit 1221e.

[Profile Information Decoding Unit 1221a]

The profile information decoding unit 1221a decodes and outputs the profile information regarding the target layer from the coded data DATA#T, based on the profile present flag ProfilePresentFlag. Specifically, when the profile present flag ProfilePresentFlag is 1, the profile information regarding the target layer is decoded from the coded data DATA#T. When the profile present flag ProfilePresentFlag is 0, it is determined that the profile information is the same as the decoded VPS, or the profile information regarding the lower layer (for example, base layer), and the decoded VPS, or the profile information regarding the lower layer is output as the profile information regarding the target layer. In addition, in the VPS which is referred to in a plurality of layers and the SPS of the base layer, the profile information is necessarily signaled on the coding side.

Further, the profile information decoding unit 1221a decodes and outputs sublayer profile information regarding each sublayer included in the target layer from the coded data DATA#T, based on the profile present flag ProfilePresentFlag, the number of sublayers MaxNumSubLayers, and the sublayer profile present flag sub_layer_profile_present_flag[i] which is supplied from the sublayer profile present flag decoding unit 1221c. Specifically, when the profile present flag is 1, and the sublayer profile present flag of the sublayer i (temporalId=i+1) is 1, it is determined that the decoded profile information and the sublayer profile information are different, and the sublayer profile information regarding the sublayer i is decoded from the coded data DATA#T. Otherwise, it is determined that the sublayer profile information regarding the sublayer i and the decoded profile information regarding the target layer are different, and the decoded profile information regarding the target layer is output as the sublayer profile information.

[Level Information Decoding Unit 1221b]

The level information decoding unit 1221b decodes and outputs the level information regarding the target layer from the coded data DATA#T. Further, the level information decoding unit 1221b decodes and outputs sublayer level information regarding each sublayer included in the target layer from the coded data DATA#T, based on the number of sublayers MaxNumSubLayers, and the sublayer level present flag sub_layer_level_present_flag[i] which is supplied from the sublayer level present flag decoding unit 1221d. Specifically, when the sublayer level present flag sub_layer_level_present_flag[i] is 1, it is determined that the sublayer level information regarding the sublayer i (temporalId=i+1) is different from the decoded level information regarding the target layer, and the sublayer level information regarding the sublayer i is decoded from the coded data DATA#T and output. Otherwise (when the sublayer level present flag sub_layer_level_present_flag[i] is 0), it is determined that the decoded level information regarding the target layer and the sublayer level information regarding the sublayer i are the same, and the decoded level information regarding the target layer is output as the sublayer level information regarding the sublayer i.

[Sublayer Profile Present Flag Decoding Unit 1221c]

The sublayer profile present flag decoding unit 1221c decodes the sublayer profile present flag of the sublayer included in the target layer from the coded data DATA#T, based on the number of sublayers MaxNumSubLayers, and outputs it to the profile information decoding unit 1221a and the outside.

[Sublayer Level Present Flag Decoding Unit 1221d]

The sublayer level present flag decoding unit 1221d decodes the sublayer level present flag of each sublayer included in the target layer from the coded data DATA#T, based on the number of sublayers MaxNumSubLayers, and outputs it to the level information decoding unit 1221b and the outside.

[Byte-Aligned Data Decoding Unit 1221e]

The byte-aligned data decoding unit 1221e reads (decodes) the byte-aligned data alignment_bit per bit, until the current position (per bit) on the coded data is a byte boundary, in other words, a bit located in the next position of the current position on the coded data is a first bit of a byte (a bit to be first read).

(Flow of Decoding Process of Profile/Level Information profile_tier_level( ))

Figure 12:
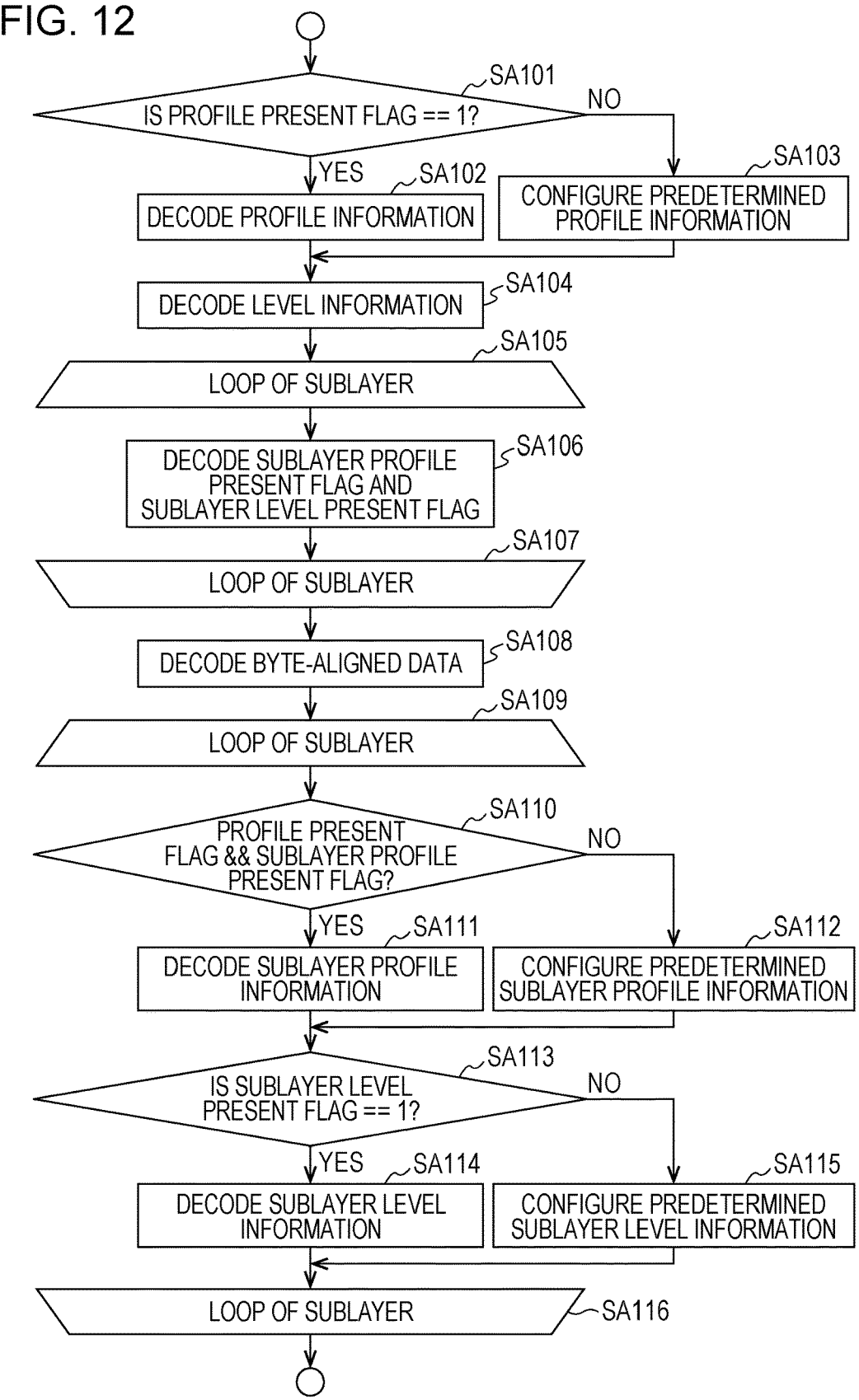
FIG. 12 is a flowchart illustrating an operation of a decoding process of profile/level information in the profile/level information decoding unit 1211 according to Example 1.

FIG. 11 illustrates a data structure of syntax of profile/level information profile_tier_level( ) to be decoded in the profile/level information decoding unit 1211, and FIG. 12 is a flowchart illustrating a decoding process of the profile/level information profile_tier_level( ) illustrated in FIG. 11. Hereinafter, the operation of the profile/level information decoding unit 1211 will be described. In addition, in FIG. 11, as compared to FIG. 30, portions for which syntax or statement is added or deleted are respectively indicated by a shaded line or a strike-through line. The same is applied to FIGS. 15, 16, and 17.

(Step SA101)

The profile information decoding unit 1221a determines whether or not the profile present flag ProfilePresentFlag is 1. When the profile present flag ProfilePresentFlag is 1 (Yes in step SA101), the process proceeds to step SA102, or in other cases (No in step SA101), the process proceeds to step SA103.

(Step SA102)

The profile information decoding unit 1221a decodes the syntax shown in FIG. 11, profile space general_profile_space tier flag general_tier_flag profile identifier general_profile_idc profile capability flag general_profile_compatibility_flag[i], and profile reserved syntax general_reserved_zero_16bits, from the coded data DATA#T, and outputs it as profile information regarding a target layer.

(Step SA103)

The profile information decoding unit 1221a determines that the profile information regarding a target layer is the same as the VPS or the profile information regarding a lower layer (for example, a base layer), and outputs the VPS or the profile information regarding the lower layer which is configured to the profile information regarding a target layer.

(Step SA104)

The level information decoding unit 1221 decodes the syntax shown in FIG. 11, level identifier general_level_idc, from the coded data DATA#T, and outputs it as level information regarding a target layer.

(Step SA105)

A loop regarding decoding of a sublayer profile present flag and a sublayer level present flag of a sublayer is started. Before starting the loop, a variable i is initialized to 0. The process of the loop is executed when the variable i is less than the number of sublayers−1 "MaxNumSubLayers−1", and every time the process of the loop is executed, the variable i is incremented by "1".

(Step SA106)

The sublayer profile present flag decoding unit 1221c decodes and outputs a sublayer profile present flag sub_layer_profile_present_flag[i] regarding the sublayer designated by the variable i, from the coded data DATA#T.

The sublayer level present flag decoding unit 1221d decodes and outputs a sublayer level present flag sub_layer_level_present_flag[i] regarding the sublayer designated by the variable i, from the coded data DATA#T.

(Step SA107)

The loop regarding the decoding of the sublayer profile present flag and the sublayer level present flag of the sublayer is ended.

(Step SA108)

The byte-aligned data decoding unit 1221e decodes the byte-aligned data from the coded data, and moves the decoding start point to a decoding start point (a first bit) of the next syntax. More specifically, until the current position (per bit) on the coded data is a byte boundary, in other words, a bit located in the next position of the current position on the coded data is a first bit of a byte (a bit to be read first), the byte-aligned data alignment_bit is read per bit from the coded data. In addition, the value of the alignment_bit is 0 or 1, but it is desirable to set the value to one value.

A pseudo-code A is represented as follows. Here, a function byte_aligned( ) is a process of determining whether or not the current position (per bit) on the coded data is the byte boundary, and when the current position on the coded data is the byte boundary, it is determined as "true", and otherwise, it is determined as "false". Further, a function read_bits (N) is a process of reading bit strings of the number of bits that are designated by an argument N, from the coded data.

```
== pseudo-code A start=====================================
============
while ( !byte_aligned() ) {
  read_bits ( 1 )
}
== pseudo-code A end=======================================
============
```

In addition, an offset from the current position on the coded data to the decoding start point of the syntax to be decoded next is obtained through calculation, without actually reading, and the position may be moved by the number of bits indicated by the offset. The offset is obtained by the following equation.

offset=8−(2*(MaxNumSubLayers−1)% 8)

Specifically, in step SA105 to step SA107, since the symbol amounts of the sublayer profile present flag and the sublayer level present flag which are decoded for each sublayer are each one bit and total two bits, and the number of sublayers is MaxNumSubLayers, the sum of the symbol amounts which are decoded in step SA105 to step SA107 is 2*(MaxNumSubLayers−1). Accordingly, the offset is determined by "8−(residual obtained by dividing the sum of the symbol amounts by 8)".

(Step SA109)

A loop regarding decoding of the sublayer profile information and the sublayer level information regarding the sublayer is started. Before starting the loop, a variable i is initialized to 0. The process of the loop is executed when the variable i is less than the number of sublayers−1 "MaxNumSubLayers−1", and every time the process of the loop is executed, the variable i is incremented by "1".

(Step SA110)

The profile information decoding unit 1221a determines whether the profile present flag ProfilePresentFlag and the sublayer profile present flag of the sublayer designated by the variable i sub_layer_profile_present_flag[i] are both 1. When the profile present flag and the sublayer profile present flag are both 1 (Yes in step SA110), the process proceeds to step SA111, or in other cases (No in step SA110), the process proceeds to step SA112.

(Step SA111)

The profile information decoding unit 1221a decodes and outputs sublayer profile space sub_layer_profile_space[i]
sublayer tier flag sub_layer_tier_flag[i]
sublayer profile identifier sub_layer_profile_idc[i]
sublayer profile capability flag sub_layer_profile_compatibility_flag[i][j]
sublayer profile reserved syntax sub_layer_reserved_zero_16bits[i], as the sublayer profile information regarding the sublayer designated by the variable i, from the coded data DATA#T.

(Step SA112)

The profile information decoding unit 1221a determines that the sublayer profile information regarding the sublayer i is the same as the profile information regarding a target layer, and outputs the sublayer profile information which is configured to the profile information regarding a target layer.

(Step SA113)

The level information decoding unit 1221b determines that the sublayer level present flag sub_layer_level_present_flag[i] of the sublayer designated by the variable i is 1. When the sublayer level present flag is 1 (Yes in step SA113), the process proceeds to step SA114, or in other cases (No in step SA113), the process proceeds to step SA115.

(Step SA114)

The level information decoding unit 1221b decodes and outputs sublayer level identifier sub_layer_level_idc[i], as the sublayer level information regarding the sublayer which is designated by the variable i, from the coded data DATA#T.

(Step S115)

The level information decoding unit 1221b determines that the sublayer level information regarding the sublayer i is the same as the level information regarding the target layer, and outputs the sublayer level information which is configured to the level information regarding the target layer.

(Step SA116)

The loop regarding the decoding of the sublayer profile information and the sublayer level information regarding the sublayer is ended.

Hitherto, the operation of the profile/level information decoding unit 1211 according to Example 1 has been described, but the operation is not limited to the steps, and the steps may be changed in a feasible range.

Further, the data structure of the profile/level information shown in FIG. 11 has the following features.

A syntax portion denoted by a symbol SYNA102 shown in FIG. 11 in other words, the sublayer profile present flag and the sublayer level present flag corresponding to each sublayer, and a syntax portion denoted by a symbol SYNA103 shown in FIG. 11, in other words, the sublayer profile information and the sublayer level information corresponding to each sublayer are separately signaled, and data for byte alignment (byte-aligned data) is inserted therebetween. Accordingly, all of a syntax portion denoted by a symbol SYNA101, the syntax portion denoted by the symbol SYNA102, and the syntax portion denoted by the symbol SYNA103, which are shown in FIG. 11, are byte-aligned.

Accordingly, as compared to the related art, it is possible to reduce the number of times of memory access regarding reading/writing when decoding/coding the sublayer profile present flag, the sublayer level present flag, the sublayer profile information, and the sublayer level information. There is an effect of reducing a processing amount required for decoding/coding the profile/level information.

Further, it is possible to calculate a offset per byte byte_offset from the position denoted by the symbol SYNA104 in FIG. 11 up to the decoding start point of the sublayer profile information and the sublayer level information regarding the specific sublayer X (the syntax portion denoted by the symbol SYN103 in FIG. 11), based on a value of the sublayer profile present flag, a symbol amount (7 bytes (54 bits)) of the sublayer profile information, a value of the sublayer level present flag, and a symbol amount (1 byte (8 bits)) of the sublayer profile information, by the next pseudo-code B. In addition, instead of the offset per byte, the offset per bit may be calculated.

```
== pseudo-code B start =========================================================
byte_offset = 0
for (i = 0; i<X; i++) {
  byte_offset = byte_offset +
  (sub_layer_profile_present_flag[i] * 7 +
  sub_layers_level_present_flag[i] * 1)
}
== pseudo-code B end ===========================================================
```

Accordingly, without decoding the sublayer profile information/sublayer profile information regarding the previous sublayer of the sublayer X, it is possible to easily specify the decoding start point of the sublayer profile information/sublayer profile information regarding the sublayer X through calculation, and easily extract the sublayer profile information/sublayer level information regarding only the specific sublayer X. In other words, there is an effect of reducing a processing amount required for decoding the sublayer profile information/sublayer level information.

Further, at a time when the profile information and the level information regarding a target layer are decoded, if it is determined that the decoder is capable of decoding the coded data of a target layer, it is obvious that the coded data of each sublayer can be decoded without decoding the profile information/level information regarding each sublayer belonging to the target layer. Accordingly, in the case of the configuration, since the symbol amount of the profile information/level information regarding the sublayer can be easily specified, it is possible to omit the decoding of the profile information/level information regarding the sublayer.

<<Modification 1 of Profile/Level Information Decoding Unit 1211>>

Next, Modification 1 of the profile/level information decoding unit 1211 according to Example 1 will be described with reference to FIG. 13 and FIG. 14.

Since a profile/level information decoding unit 1211' according to Modification 1 has the same configuration as in FIG. 1, the description will be omitted.

FIG. 13 illustrates a data structure of the syntax of profile/level information profile_tier_level( ) which is decoded by the profile/level information decoding unit 1211', and FIG. 14 is a flowchart illustrating a decoding process of the syntax illustrated in FIG. 13. The difference in the data structures of the profile/level information illustrated in FIG. 13 according to Modification 1 and the profile/level information illustrated in FIG. 11 according to Example 1 is as follows.

As illustrated in portions respectively denoted by symbols SYNA201 and SYNA202 in FIG. 13, the sublayer profile present flag and the sublayer level present flag are separately signaled.

As illustrated in a portion denoted by a symbol SYNA201 in FIG. 13, only when the profile present flag is 1, the sublayer profile present flag is signaled.

As illustrated in portions denoted by the symbols SYNA201 and SYNA202 in FIG. 13, the byte-aligned data is inserted respectively after the sublayer profile present flag and the sublayer level present.

Accordingly, as compared to the related art, in Modification 1, when the profile present flag ProfilePresentFlag is 0, since the sublayer profile present flag of the sublayer is not signaled, it is possible to solve the problem in that the sublayer profile present flag of the sublayer is redundantly signaled. In other words, there is an effect of reducing the redundancy (symbol amount) of the profile/level information.

Further, similar to Example 1, since all of the profile/level information is byte-aligned in Modification 1, it is possible to reduce the number of times of memory access regarding reading/writing when decoding/coding the sublayer profile present flag, the sublayer level present flag, the sublayer profile information, and the sublayer level information. There is an effect of reducing a processing amount required for decoding/coding the profile/level information.

Further, similar to Example 1, it is possible to easily extract the sublayer profile information/sublayer level information regarding only the specific sublayer X also in Modification 1. In other words, there is an effect of reducing a processing amount required for decoding the sublayer profile information/sublayer level information.

Hereinafter, the operation of the profile/level information decoding unit 1211' according to Modification 1 will be described with reference to FIG. 14. In addition, since the decoding process of the profile information/level information is similar to the steps SA101 to SA104 of FIG. 12, the description thereof will be omitted. Further, since the decoding process of the sublayer profile information/sublayer level information is similar to the step SA108 to step SA116 of FIG. 12, the description thereof will be omitted.

(Step SA121)

The sublayer profile present flag decoding unit 1221c determines whether the profile present flag is 1. When the profile present flag is 1 (Yes in step SA121), the process of step SA122 to SA125 is performed. In other cases (No in step SA121), the process proceeds to step SA126.

(Step SA122)

A loop regarding decoding of a sublayer profile present flag of a sublayer is started. Before starting the loop, a variable i is initialized to 0. The process of the loop is executed when the variable i is less than the number of sublayers−1 "MaxNumSubLayers−1", and every time the process of the loop is executed, the variable i is incremented by "1".

(Step SA123)

The sublayer profile present flag decoding unit 1221*c* decodes and outputs a sublayer profile present flag sub_layer_profile_present_flag[i] regarding the sublayer designated by the variable i, from the coded data DATA#T.

(Step SA124)

The loop regarding the decoding of the sublayer profile present flag of the sublayer is ended.

(Step SA125)

The byte-aligned data decoding unit 1221*e* decodes the byte-aligned data from the coded data, and moves the decoding start point to the decoding start point (first bit) of the next syntax.

(Step SA126)

When the profile present flag is 0 (No in step SA121), the sublayer profile present flag decoding unit 1221*c* outputs the sublayer profile present flag sub_layer_profile_present_flag[i] of each sublayer i which is set to 0.

(Step SA127)

A loop regarding decoding of a sublayer level present flag of a sublayer is started. Before starting the loop, a variable i is initialized to 0. The process of the loop is executed when the variable i is less than the number of sublayers−1 "MaxNumSubLayers−1", and every time the process of the loop is executed, the variable i is incremented by "1".

(Step SA128)

The sublayer level present flag decoding unit 1221*d* decodes and outputs a sublayer level present flag sub_layer_level_present_flag[i] regarding the sublayer designated by the variable i, from the coded data DATA#T.

(Step SA129)

The loop regarding the decoding of the sublayer level present flag is ended.

(Step SA130)

The byte-aligned data decoding unit 1221*e* decodes the byte-aligned data from the coded data, and moves the decoding start point to the decoding start point (first bit) of the next syntax.

<<Modification 2 of Profile/Level Information Decoding Unit 1211>>

Next, Modification 2 of the profile/level information decoding unit 1211 according to Example 1 will be described with reference to FIG. 13 and FIG. 14.

Since a profile/level information decoding unit 1211" according to Modification 2 has the same configuration as in FIG. 1, the description will be omitted.

FIG. 15 illustrates a data structure of the syntax of profile/level information profile_tier_level( ) which is decoded by the profile/level information decoding unit 1211", and FIG. 12 is a flowchart illustrating a decoding process of the syntax illustrated in FIG. 15. The difference in the data structures of the profile/level information illustrated in FIG. 15 according to Modification 2 and the profile/level information illustrated in FIG. 11 according to Example 1 is as follows.

As illustrated in portions respectively denoted by symbols SYNA302 and SYNA304 in FIG. 15, syntax related to the level information, and the tier flag general_tier_flag/sublayer tier flag sub_layer_tier_flag[i] are signaled so as not to be dependent on the profile present flag ProfilePresentFlag/sublayer profile present flag sub_layer_profile_present_flag[i]. Specifically, the tier flag general_tier_flag and the level identifier general_level_idc are signaled, and the sublayer tier flag sub_layer_tier_flag[i] and the sublayer level identifier sub_layer_level_idc[i] are signaled. Accordingly, as compared to the related art, without being dependent on the profile present flag ProfilePresentFlag, the decoder can acquire constraint of the level determined by the level identifier general_level_idc and the tier flag general_tier_flag. Similarly, even in the sublayer, without being dependent on the profile present flag and the sublayer profile present flag, the decoder can acquire constraints of the level determined by the sublayer level identifier sub_layer_level_idc[i] and the sublayer tier flag sub_layer_tier_flag[i]. Further, locally the level identifier and the tier flag are signaled, such that the decoder can easily specify whether or not the coded data can be decoded.

The symbol lengths of the profile space general_profile_space denoted by the symbol SYNA301 and the sublayer profile space sub_layer_profile_space[i] denoted by the symbol SYNA303 in FIG. 15 are changed from two bits to three bits, and the symbol lengths of the level identifier general_level_idc denoted by the symbol SYNA305 and the sublayer level identifier denoted by the symbol SYNA306 in FIG. 15 are changed from eight bits to seven bits such that all of the profile/level information is byte-aligned. Accordingly, similar to Example 1, since all of the profile/level information is byte-aligned even in Modification 2, it is possible to reduce the number of times of memory access regarding reading/writing when decoding/coding each syntax of the profile/level information. In other words, there is an effect of reducing a processing amount required for decoding/coding the profile/level information. In addition, even if the symbol lengths of the level identifier/sublayer level identifier are changed from eight bits to seven bits, since it is possible to use values from 0 to 127, it is possible to sufficiently handle the further extension of the level number. Further, the symbol length of the profile space is changed to three bits, such that it is possible to use values from 0 to 7, and it is possible to have more flexibility for further extension of the profile.

Further, similar to Example 1, it is possible to easily extract the sublayer profile information/sublayer level information regarding only the specific sublayer X also in Modification 2. In other words, there is an effect of reducing a processing amount required for decoding the sublayer profile information/sublayer level information.

Further, similar to Example 1, also in Modification 2, at a time when the profile information regarding a target layer and level information are decoded, if it is determined that the decoder is capable of decoding the coded data of a target layer, since the symbol amount of the profile information/level information regarding the sublayer can be easily specified, it is possible to omit the decoding of the profile information/level information regarding the sublayer.

(Flow of Decoding Process of Profile/Level Information profile_tier_level( ))

Hereinafter, the operation of the profile/level information decoding unit 1211" according to Modification 2 will be described with reference to FIG. 12. In addition, with respect to the decoding process of the profile information/level information, only steps SA102, SA104, SA111, and SA114 in FIG. 12 which are to be changed will be described. Since the other steps are common, the description thereof will be omitted. In other words, in the following description, steps SA102, SA104, SA111, and SA114 in FIG. 12 are respectively replaced with steps SA102', SA104', SA111', and SA114'.

(Step SA102')

The profile information decoding unit 1221a decodes the syntax shown in FIG. 15,
profile space general_profile_space
profile identifier general_profile_idc
profile capability flag general_profile_compatibility_flag [i], and
profile reserved syntax general_reserved_zero_16bits, from the coded data DATA#T,
and outputs it as profile information regarding a target layer.

(Step SA104')

The level information decoding unit 1221 decodes the syntax shown in FIG. 15,
level identifier general_level_idc,
tier flag general_tier_flag,
from the coded data DATA#T,
and outputs it as level information regarding a target layer.

(Step SA111')

The profile information decoding unit 1221a decodes and outputs
sublayer profile space sub_layer_profile_space[i]
sublayer profile identifier sub_layer_profile_idc[i]
sublayer profile capability flag sub_layer_profile_compatibility_flag[i][j]
sublayer profile reserved syntax sub_layer_reserved_zero_16bits[i],
as the sublayer profile information regarding the sublayer designated by the variable i, from the coded data DATA#T.

(Step SA114')

The level information decoding unit 1221b decodes and outputs
sublayer level identifier sub_layer_level_idc[i],
sublayer tier flag sub_layer_tier_flag [i],
as the sublayer level information regarding the sublayer which is designated by the variable i, from the coded data DATA#T.

<<Modification 2a of Profile/Level Information Decoding Unit 1211>>

In addition, although the symbol lengths of the level identifier/sublayer level identifier denoted by symbols SYNA305 and SYNA306 in FIG. 15 are changed from eight bits to seven bits in order to keep byte-alignment of the profile/level information in Modification 2, it is not limited thereto. The syntax regarding tier, and the tier flag general_tier_flag/sub_layer_tier_flag[i] are extended from one bit to eight bits, as denoted by the symbols SYN302a and SYN304a in FIG. 16, but may be replaced with the tier identifier general_tier_idc/sub_layer_tier_idc[i]. In this case, since the tier has a value of 0 to 255, it allows the parameters regarding the level constraints determined by the level identifier and the tier to have scalability.

<<Modification 3 of Profile/Level Information Decoding Unit 1211>>

In the related art, it is possible to control whether or not to omit the decoding the profile information, depending on the profile present flag. However, in a case of using a plurality of layers, since layers have a common level, there is a case of redundantly signaling the level information. Therefore, in order to reduce the redundancy of the signal of the level information, as illustrated in FIG. 17, in the data structure of the profile/level information profile_tier_level( ), the profile present flag ProfilePresentFlag is replaced with the profile level present flag ProfileLevelPresentFlag indicating whether or not to present the profile information and the level information, and similarly, the sublayer profile present flag and the sublayer level present flag are replaced with the sublayer profile level present flag sub_layer_profile_level_present_flag indicating whether or not to present the sublayer profile information and the sublayer level information.

Hereinafter, the configuration of the profile/level information decoding unit 1211 in Modification 3 will be described with reference to FIG. 18. As illustrated in FIG. 18, the profile/level information decoding unit 1211 includes a profile information decoding unit 1221a, a level information decoding unit 1221b, a sublayer profile level present flag decoding unit 1221f, and a byte-aligned data decoding unit 1221e. In addition, since the profile information decoding unit 1221a, the level information decoding unit 1221b, and the byte-aligned data decoding unit 1221e are the same as in Example 1, the description thereof will be omitted. Here, interpretation is performed by respectively replacing the profile present flag ProfilePresentFlag and the sublayer profile present flag/sublayer level present flag in Example 1 with the profile level present flag ProfileLevelPresentFlag and the sublayer profile level present flag.

[Sublayer Profile Level Present Flag Decoding Unit 1221f]

The sublayer profile level present flag decoding unit 1221f decodes the sublayer profile level present flag of each sublayer included in the target layer from the coded data DATA#T, based on the profile level present flag ProfileLevelPresentFlag and the number of sublayers MaxNumSubLayers, and outputs it to the profile information decoding unit 1221a, the level information decoding unit 1221b, and the outside.

(Flow of Decoding Process of Profile/Level Information profile_tier_level( ))

Hereinafter, the operation of the profile/level information decoding unit 1211 according to Modification 3 will be described with reference to FIG. 19.

(Step SC101)

The profile information decoding unit 1221a determines that the profile level present flag ProfilelevelPresentFlag is 1. When the profile level present flag ProfileLevelPresentFlag is 1 (Yes in step SC101), the process proceeds to step SC102, or in other cases (No in step SC101), the process proceeds to step SC103.

(Step SC102)

The profile information decoding unit 1221a decodes
profile space general_profile_space
profile identifier general_profile_idc
profile capability flag general_profile_compatibility_flag [i]
profile reserved syntax general_reserved_zero_16bits, from the coded data DATA#T, and outputs it as the profile information regarding a target layer.
The level information decoding unit 1221b decodes
level identifier general_level_idc
tier flag general_tier_flag, from the coded data DATA#T, and outputs it as the level information regarding the target layer.

(Step SC103)

The profile information decoding unit 1221a determines that the profile information regarding the target layer is the same as the VPS or the profile information regarding a lower layer (for example, a base layer), and outputs the VPS or the profile information regarding the lower layer which is configured to the profile information regarding the target layer.

Further, the level information decoding unit 1221b determines that the level information regarding the target layer is the same as the VPS or the level information regarding the lower layer (for example, the base layer), and outputs the VPS or the level information regarding the lower layer which is configured to the level information regarding the target layer.

(Step SC104)

A loop regarding decoding of a sublayer profile level present flag of a sublayer is started. Before starting the loop, a variable i is initialized to 0. The process of the loop is executed when the variable i is less than the number of sublayers−1 "MaxNumSubLayers−1", and every time the process of the loop is executed, the variable i is incremented by "1".

(Step SC105)

The sublayer profile present flag decoding unit 1221f decodes and outputs a sublayer profile level present flag sub_layer_profile_level_present_flag[i] regarding the sublayer designated by the variable i, from the coded data DATA#T.

(Step SC106)

The loop regarding the decoding of the sublayer profile level present flag is ended.

(Step SC107)

The byte-aligned data decoding unit 1221e decodes the byte-aligned data from the coded data, and moves the decoding start point to the decoding start point (first bit) of the next syntax.

(Step SC108)

A loop regarding decoding of sublayer profile information and sublayer level information regarding a sublayer is started. Before starting the loop, a variable i is initialized to 0. The process of the loop is executed when the variable i is less than the number of sublayers−1 "MaxNumSubLayers−1", and every time the process of the loop is executed, the variable i is incremented by "1".

(Step SC109)

The profile information decoding unit 1221a determines whether the profile level present flag ProfileLevelPresentFlag and the sublayer profile level present flag sub_layer_profile_level_present_flag[i] of the sublayer designated by the variable i are both 1. When the profile level present flag and the sublayer profile level present flag are both 1 (Yes in step SC109), the process proceeds to step SC110, or in other cases, the process proceeds to step SC111.

(Step SC110)

The profile information decoding unit 1221a decodes
sublayer profile space sub_layer_profile_space[i]
sublayer profile identifier sub_layer_profile_idc[i]
sublayer profile capability flag sub_layer_profile_compatibility_flag[i][j]
sublayer profile reserved syntax sub_layer_reserved_zero_16bits[i], from the coded data DATA#T, and outputs it as the sublayer profile information regarding the sublayer designated by the variable i.

Further, the level information decoding unit 1221b decodes
sublayer level identifier sub_layer_level_idc[i]
sublayer tier flag sub_layer_tier_flag[i], from the coded data DATA#T, and outputs it as the sublayer level information regarding the sublayer designated by the variable i.

(Step SC111)

The profile information decoding unit 1221a determines that the sublayer profile information regarding the sublayer i is the same as the profile information regarding the target layer, and outputs the sublayer profile information which is configured to the profile information regarding the target layer.

Further, the level information decoding unit 1221b determines that the sublayer level information regarding the sublayer i is the same as the level information regarding the target layer, and outputs the sublayer level information which is configured to the profile information regarding the target layer.

(Step SC112)

The loop regarding the decoding of the sublayer profile information and the sublayer level information regarding the sublayer is ended.

Hitherto, the operation of the profile/level information decoding unit 1211 according to Modification 3 has been described, but the operation is not limited to the steps, and the steps may be changed in a feasible range.

As described above, similar to Example 1, since all syntax of the profile/level information is byte-aligned in Modification 3, it is possible to reduce the number of times of memory access regarding reading/writing when decoding/coding the sublayer profile level present flag, the sublayer profile information, and the sublayer level information. In other words, there is an effect of reducing a processing amount required for decoding/coding the profile/level information.

Further, since it is possible to reduce the redundancy of the level information, there is an effect of reducing a processing amount required for decoding the profile/level information.

Similar to Example 1, also in Modification 3, at a time when the profile information regarding the target layer and the level information are decoded, if it is determined that the decoder is capable of decoding the coded data of the target layer, since the symbol amount of the profile information/level information regarding the sublayer can be easily specified, it is possible to omit the decoding of the profile information/level information regarding the sublayer.

Hierarchical Moving Image Coding Device

Hereinafter, the configuration of the hierarchical moving image coding device 2 according to the present example will be described with reference to FIGS. 20 to 25.

(Configuration of Hierarchical Moving Image Coding Device)

Figure 20:
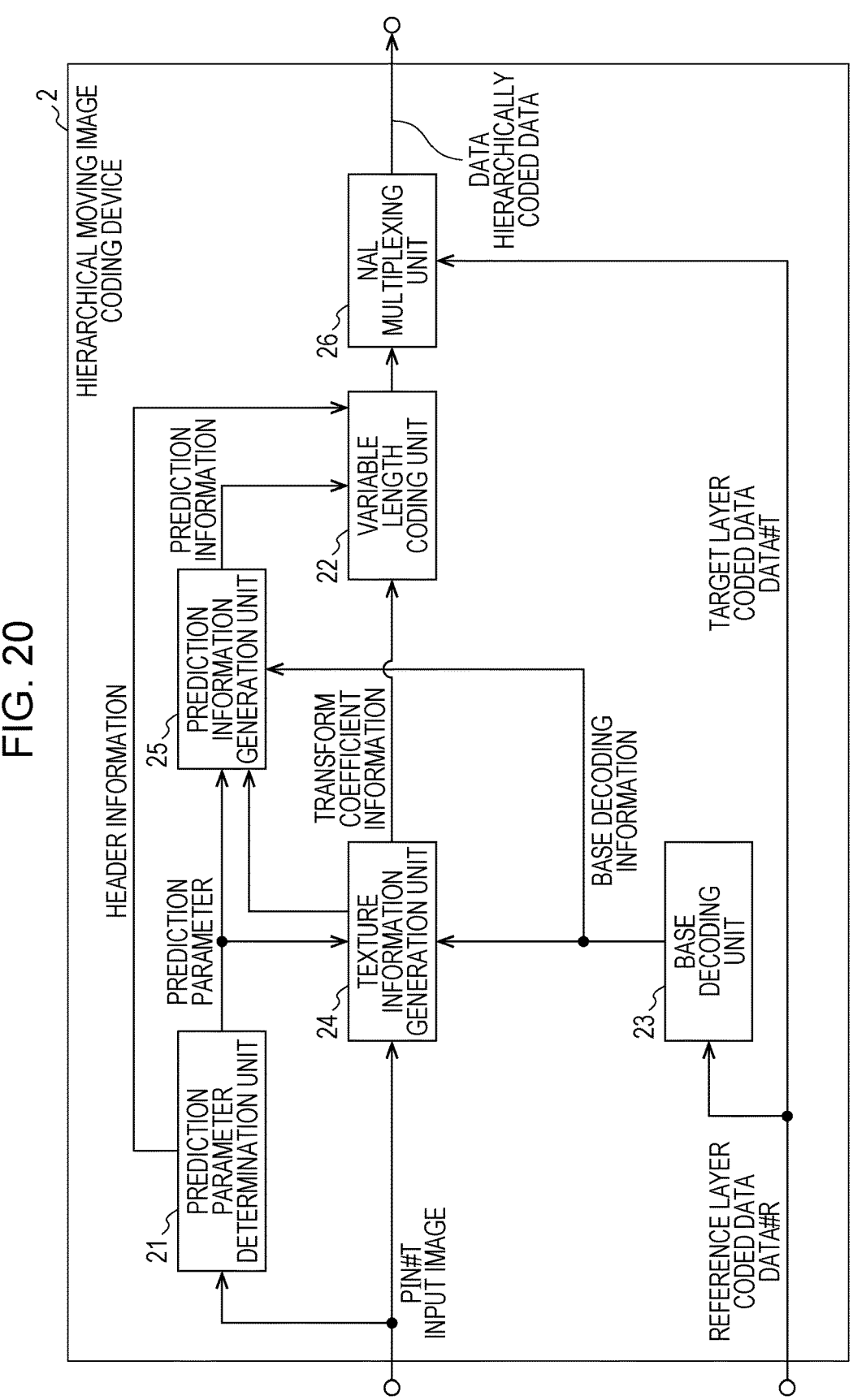
FIG. 20 is a functional block diagram illustrating a schematic configuration of the hierarchical moving image coding device according to the embodiment of the present invention.

The description of the schematic configuration of the hierarchical moving image coding device 2 by using FIG. 20 is as follows. FIG. 20 is a functional block diagram illustrating a schematic configuration of the hierarchical moving image coding device 2. The hierarchical moving image coding device 2 generates the hierarchically coded data DATA of the target layer, by coding the input image PIN#T of the target layer while referring to the reference layer coded data DATA#R. In addition, it is assumed that the reference layer coded data DATA#R has been coded by the hierarchical moving image coding device corresponding to the reference layer.

As illustrated in FIG. 20, the hierarchical moving image coding device 2 includes a prediction parameter determination unit 21, a prediction information generation unit 25, a base decoding unit 23, a texture information generation unit 24, a variable length coding unit 22, and an NAL multiplexing unit 26.

[Prediction Parameter Determination Unit 21]

The prediction parameter determination unit 21 determines a prediction parameter used for prediction of a predicted image and another configuration of coding (header information), based on an input image PIN#T.

First, the prediction parameter determination unit 21 generates the VPS, the SPS, the PPS, and the slice header, based on the input image PIN#T, and outputs it as header information. In addition, the VPS and the SPS include the profile/level information profile_tier_level( ) regarding the profile and the level required for coding/decoding the target layer.

The prediction parameter determination unit 21 performs the configuration of coding based on the prediction parameter as follows.

The prediction parameter determination unit 21 performs the following processing in the profile/level information. The prediction parameter determination unit 21 sets the values of the profile present flag of the target layer, the profile present flag (sublayer present flag) of the sublayer, and the level present flag (sublayer level present flag) of the sublayer, based on the profile information and the level information (profile/level/tier) of the lower layer (for example, base layer), the target layer, and each sublayer belonging to the target layer, which are supplied from the outside or preset, and the supplies the profile present flag, and the profile present flag/level present flag of each sublayer which are set, to the header information coding unit 221.

In addition, if the profile information regarding the lower layer and the profile information regarding the target layer are the same, or the profile information regarding the target layer and the profile information regarding the sublayer (sublayer profile information) are the same, it refers to at least the following things.

The values of the profile spaces are the same
The values of the profile identifiers are the same
The values of the profile capability flags are the same Further, if the level information regarding the lower layer and the level information regarding the target layer are the same, or the level information regarding the target layer and the level information regarding the sublayer (sublayer level information) are the same, it refers to at least the following things.

The values of the level identifiers are the same
The values of the tier flags are the same In addition, the tier flag may be included in the profile information. In this case, if the profile information pieces are the same, the values of the tier flags are the same, in addition to the above constraints.

The ProfilePresentFlag indicating whether or not to explicitly coding the profile information is determined as follows. When the profile information regarding the lower layer and the profile information regarding the target layer are the same, the profile information regarding the target layer is configured from the profile of a predetermined layer, such that the profile present flag is set to 0, and otherwise, the profile present flag is set to 1 in order to explicitly code the profile information regarding the target layer.

Subsequently, when the profile present flag is 1, the profile present flag (sublayer profile present flag) of each sublayer is determined as follows. When the profile information regarding the target layer and the sublayer profile information regarding the sublayer are the same, in order to configure the sublayer profile information regarding the sublayer from the profile information regarding the target layer, the sublayer profile present flag is set to 0, and otherwise, the sublayer profile present flag is set to 1 in order to explicitly code the sublayer profile information regarding the sublayer.

Further, the level present flag (sublayer level present flag) of each sublayer is determined as follows. When the level information regarding the target layer and the sublayer level information regarding the sublayer are the same, in order to configure the sublayer level information regarding the sublayer from the level information regarding the target layer, the sublayer level present flag is set to 0, and otherwise, the sublayer level present flag is set to 1 in order to explicitly code the sublayer profile information regarding the sublayer.

In addition, the prediction parameter determination unit 21 may determine the profile information, the profile level present flag indicating whether or not to present the level information, the sublayer profile information, and the sublayer profile level present flag indicating whether or not to present the sublayer level information, instead of the profile present flag, the sublayer profile present flag, and the sublayer level present flag, and supplies the determined information to the header information coding unit 221.

In other words, the ProfileLevelPresentFlag indicating whether or not to explicitly code the profile information and the level information is determined as follows. If the profile information and the level information regarding the lower layer and the profile information and the level information regarding the target layer are respectively the same, since the profile information and the level information regarding the target layer are configured from the profile information and the level information regarding a predetermined layer, the profile level present flag is set to 0, or otherwise, the profile level present flag is set to 1 in order to explicitly code the profile information and the level information regarding the target layer.

Subsequently, when the profile level present flag is 1, the profile level present flag of each sublayer (sublayer profile level present flag) is determined as follows. When the profile information and the level information regarding the target layer and the sublayer profile information and the sublayer level information regarding the sublayer are respectively the same, in order to configure the sublayer profile information and the sublayer level information regarding the sublayer from the profile information and the level information regarding the target layer, the sublayer profile present flag is set to 0, or otherwise, the sublayer profile present flag is set to 1 in order to explicitly code the sublayer profile information regarding the sublayer.

First, the prediction parameter determination unit 21 generates the CU image for the target CU, by sequentially splitting the input image PIN#T into the slice unit, the tree block unit, and the CU unit.

Further, the prediction parameter determination unit 21 generates the coding information (referred to as header information), based on the result of the split process. The coding information includes (1) tree block information which is information regarding the size and shape of the tree block belonging to the target slice and the position of the tree block in the target slice, and (2) CU information which is information regarding the size and shape of the CU belonging to each tree block and the position of the CU in the target tree block.

Further, the prediction parameter determination unit 21 derives the prediction type of the target CU, the split information regarding the target CU to the PU, and the prediction parameter, by referring to the CU image, the tree block information, and the CU information (when the target CU is the intra-CU, the intra-prediction mode; when the target CU is the inter-CU, the motion compensation parameter of each PU).

The prediction parameter determination unit 21 calculates the cost for a combination of all of (1) the prediction type of the target CU, (2) the available splitting pattern of the target CU to each PU, and (3) the prediction mode which can be assigned to each PU (in the case of the intra-CU, the intra-prediction mode; in the case of the inter-CU, the motion compensation parameter), and determines the prediction type, the split pattern, and the prediction mode of the lowest cost.

The prediction parameter determination unit 21 supplies the coding information and the prediction parameter to the prediction information generation unit 25 and the texture information generation unit 24. In addition, although not shown for convenience of explanation, the configuration of the coding which is determined in the prediction parameter determination unit 21 can be referred in each unit of the hierarchical moving image coding device 2.

[Prediction Information Generation Unit 25]

The prediction information generation unit 25 generates prediction information including a syntax value regarding the prediction parameter, based on the prediction parameter supplied from the prediction parameter determination unit 21 and the reference layer coded data DATA#R. The prediction information generation unit 25 supplies the generated prediction information to the variable length coding unit 22. In addition, when the prediction parameter is restored, the prediction information generation unit 25 can refer to the inter-prediction parameter stored in the frame memory (described later) included in the texture information generation unit 24. In addition, the details of the prediction information generation unit 25 will be described later.

[Base Decoding Unit 23]

Since the base decoding unit 23 is the same as the base decoding unit 16 of the hierarchical moving image decoding device 1, here, the description thereof will be omitted.

[Texture Information Generation Unit 24]

The texture information generation unit 24 generates the transform coefficient information including the transform coefficient by performing orthogonal transform and quantization on the prediction residual obtained by subtracting the predicted image from the input image PIN#T. The texture information generation unit 24 supplies the generated transform coefficient information to the variable length coding unit 22. In addition, information regarding the decoded image which is restored is stored in the frame memory included in the inside of the texture information generation unit 24.

[Variable Length Coding Unit 22]

The variable length coding unit 22 generates target layer coded data DATA#T by variable length coding the header information supplied from the prediction parameter determination unit 21, the prediction information supplied from the prediction information generation unit 25 and the transform coefficient information supplied from the texture information generation unit 24. The variable length coding unit 22 supplies the generated target layer coded data DATA#T to the NAL multiplexing unit 26.

Figure 21:
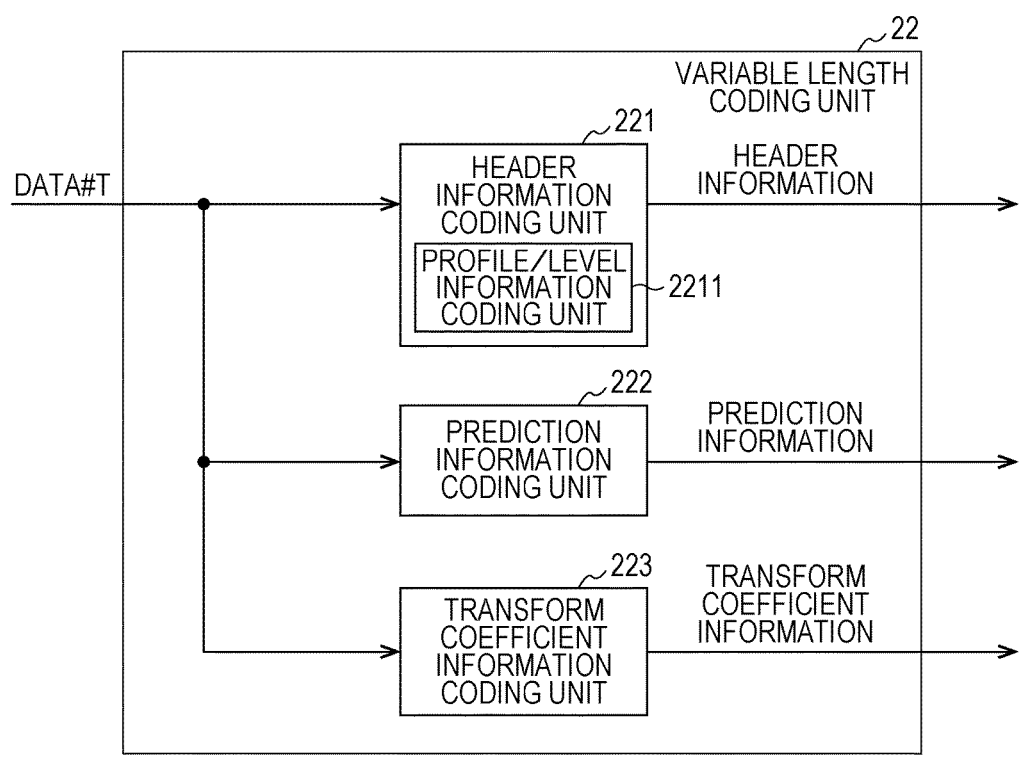
FIG. 21 is a functional block diagram illustrating a schematic configuration of a variable length decoding unit 22 according to the embodiment of the present invention.

Specifically, as illustrated in FIG. 21, the variable-length coding unit 22 includes a header information coding unit 221, a prediction information coding unit 222, and a transform coefficient information coding unit 223. Further, the header information coding unit 221 includes a profile/level information coding unit 2211.

[Header Information Coding Unit 221]

The header information decoding unit 221 outputs coded data of header information by coding the header information regarding parameters used for coding per sequence, per picture, or per slice, in the reverse process of the header information coding unit 121. In addition, the details of the profile/level information coding unit 2211 included in the header information coding unit 221 will be described later.

[Prediction Information Coding Unit 222]

The prediction information coding unit 222 outputs coded data of the prediction information by coding the prediction information regarding each CU or PU, in the reverse process of the prediction information decoding unit 122.

The prediction information includes, for example, information for designating a CU type or a PU type, and information for specifying the shape, the size, and the position of the CU.

[Transform Coefficient Information Coding Unit 223]

The transform coefficient information coding unit 223 outputs the coded data of transform coefficient information by coding the transform coefficient information such as a quantization prediction residual QD for each block and a quantization parameter difference Δqp for a tree block including the block, in the reverse process of the transform coefficient information decoding unit 123.

[NAL Multiplexing Unit 26]

The NAL multiplexing unit 26 generates a hierarchical moving image coded data DATA which is NAL-multiplexed by storing the target layer coded data DATA#T supplied from the variable-length coding unit 22 and the reference layer coded data DATA#R in the NAL unit, and outputs the generated image to the outside. In addition, coded data which is VCL-coded, and a header for properly delivering the coded data to the lower system which is the destination (NAL unit header: nal_unit_header( )) are added to the NAL unit.

Hereinafter, the respective details of the prediction information generation unit 25 and the texture information generation unit 24 will be described.

(Prediction Information Generation Unit)

Figure 22:
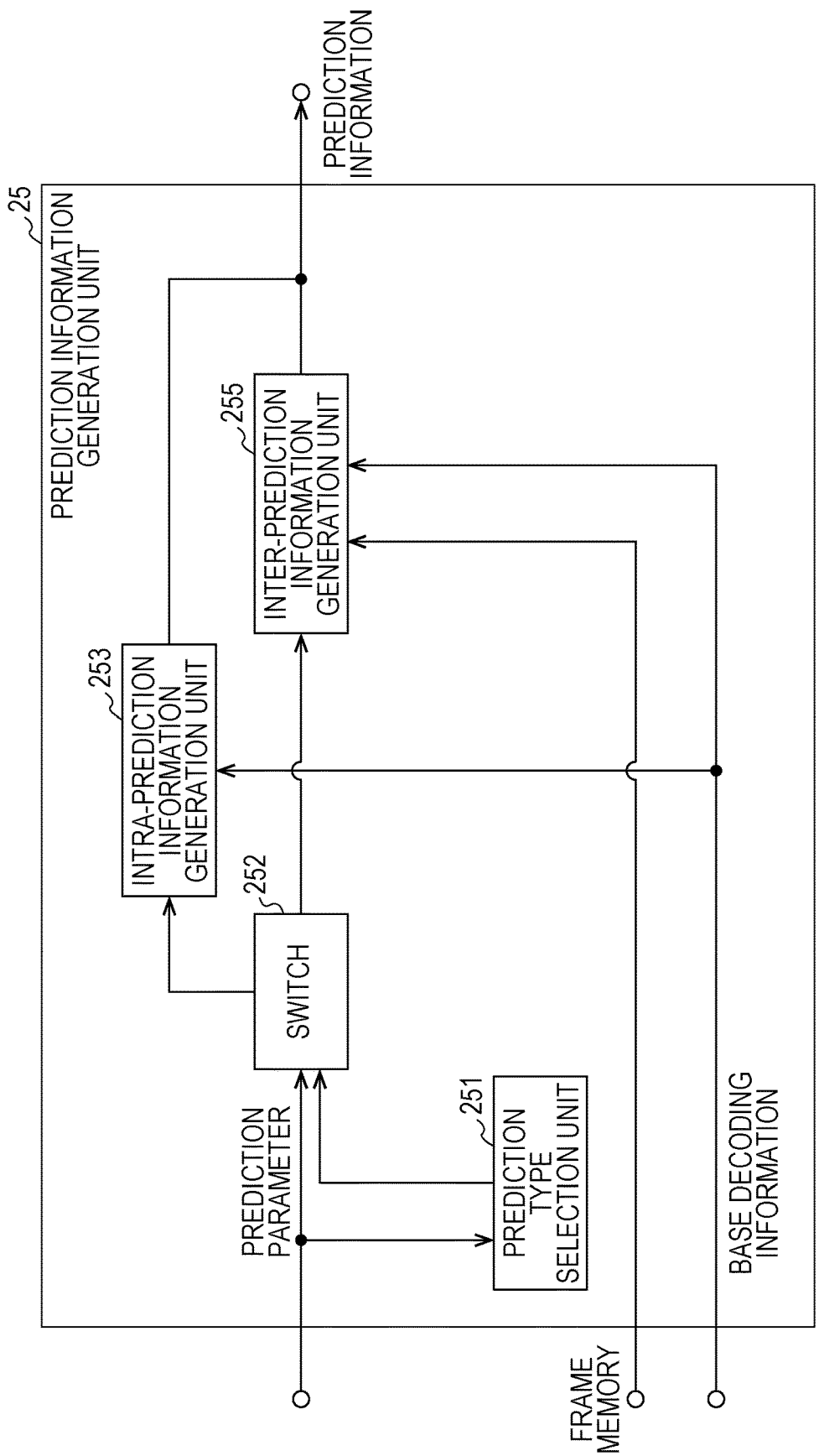
FIG. 22 is a functional block diagram illustrating a schematic configuration of a prediction information generation unit 25 included in the hierarchical moving image coding device.

The detailed configuration of the prediction information generation unit 25 will be described with reference to FIG. 22. FIG. 22 is a functional block diagram illustrating a configuration of the prediction information generation unit 25.

As illustrated in FIG. 22, the prediction information generation unit 25 includes a prediction type selection unit 251, a switch 252, an intra-prediction information generation unit 253, and an inter-prediction information generation unit 255.

The prediction type selection unit 251 sends a switching instruction in response to a CU type or a PU type to the switch 252 so as to control the derivation process of the prediction parameter. The details are as follows.

When the intra-CU or the intra-PU is not designated, the prediction type selection unit 251 controls the switch 252 so as for the intra-prediction information generation unit 253 to generate intra-prediction information (prediction information).

When any of the inter-CU and the inter-PU is not designated, the prediction type selection unit 251 controls the switch 252 so as for the inter-prediction information generation unit 255 to generate inter-prediction information.

The switch 252 supplies the prediction parameter to any of the intra-prediction information generation unit 253 and the inter-prediction information generation unit 255, in response to the instruction of the prediction type selection unit 251. The prediction information is generated in the supply destination of the prediction parameter.

The intra-prediction information generation unit 253 derives a syntax value regarding the intra-prediction mode. In other words, the intra-prediction information generation unit 253 generates the syntax value regarding the prediction mode as the prediction information.

The inter-prediction information generation unit 255 derives motion vector candidates which are estimated by an intra-layer motion estimation process or an inter-layer motion estimation process, by using the base decoding information. Subsequently, inter_pred_flag, mvd, an mvp_idx, and refIdx which are corresponding syntax element values are derived from the inter-prediction parameter of each PU, and are output as the inter-prediction information.

(Texture Information Generation Unit)

Figure 23:
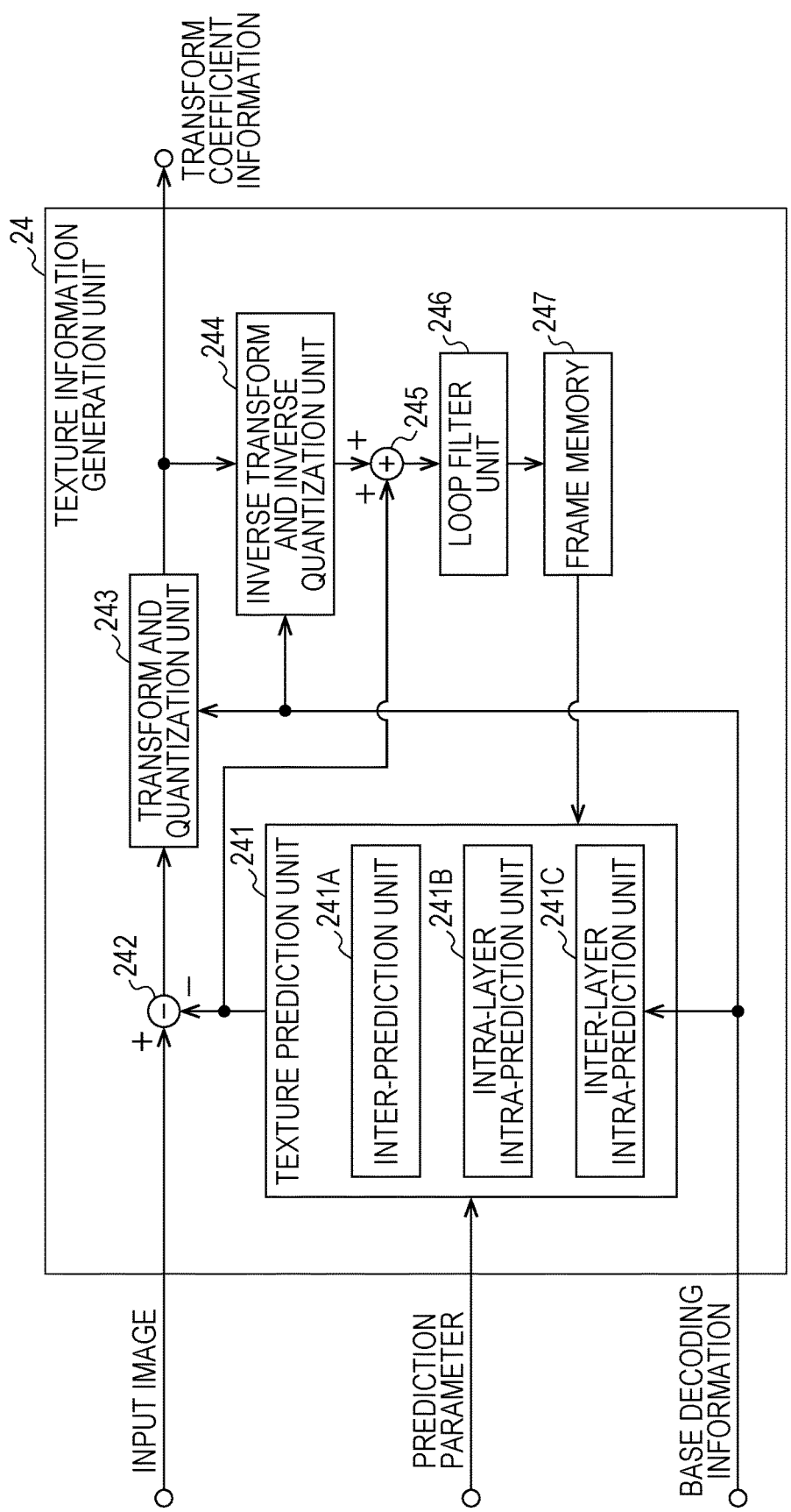
FIG. 23 is a functional block diagram illustrating a schematic configuration of a texture information generation unit 24 included in the hierarchical moving image coding device.

The detailed configuration of the texture information generation unit 24 will be described with reference to FIG. 23. FIG. 23 is a functional block diagram illustrating a configuration of the texture information generation unit 24.

As illustrated in FIG. 23, the texture information generation unit 24 includes a texture prediction unit 241, a subtractor 242, an orthogonal transform and quantization unit 243, an inverse orthogonal transform and inverse quantization unit 244, an adder 245, a loop filter unit 246, and a frame memory 247.

The subtractor 242 generates a prediction residual D by subtracting the predicted image supplied from the texture prediction unit 241, from the input image PIN#T. The subtractor 242 supplies the generated prediction residual D to the orthogonal transform and quantization unit 243.

The orthogonal transform and quantization unit 243 generates the quantized prediction residual by performing the orthogonal transform and quantization on the prediction residual D. In addition, here, the orthogonal transform means the orthogonal transform from the pixel region to the frequency region. Further, examples of the orthogonal transform include discrete cosine transform (DCT transform), discrete sine transform (DST transform), and the like. Further, a specific quantization process is as described already, and thus the description thereof will be omitted here. The orthogonal transform and quantization unit 243 supplies the transform coefficient information including the quantized prediction residual which is generated to the inverse orthogonal transform and inverse quantization unit 244 and the variable length coding unit 22.

Since the texture prediction unit 241, the inverse orthogonal transform and inverse quantization unit 244, the adder 245, the loop filter unit 246, and the frame memory 247 are respectively the same as the texture prediction unit 152, the inverse orthogonal transform and inverse quantization unit 151, the adder 153, the loop filter unit 154, and the frame memory 155 which are included in the hierarchical moving image decoding device 1, the description thereof will be omitted here. Here, the texture prediction unit 241 supplies the predicted image not only to the adder 245 but also to the subtractor 242.

Example 1

<<Details of Profile/Level Information Coding Unit 2211>>

Next, the configuration of the profile/level information coding unit 2211 according to Example 1 which is the reverse process of the profile/level information decoding unit 1211 according to Example 1 will be described with reference to FIG. 24.

Figure 24:
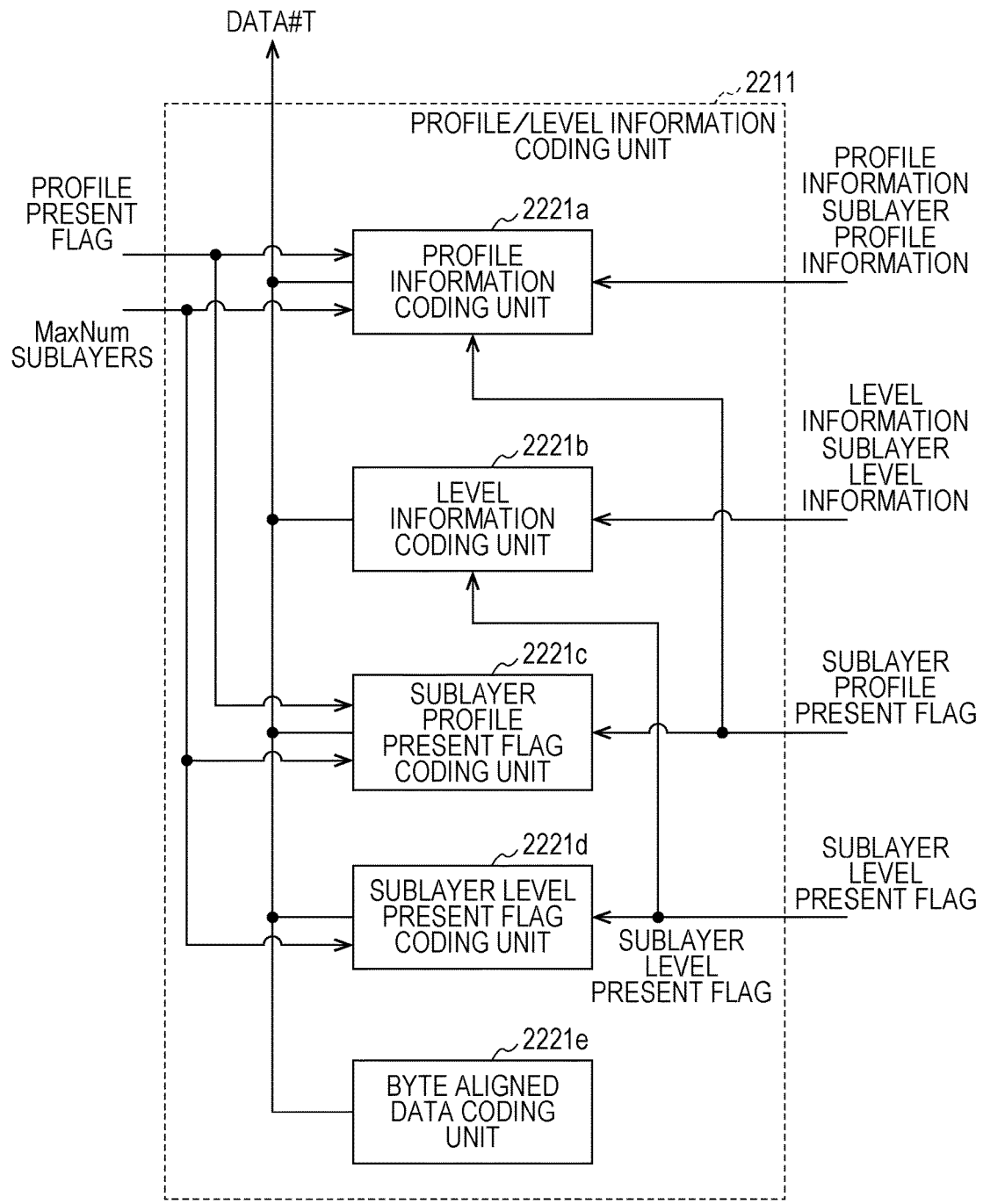
FIG. 24 is a functional block diagram illustrating a schematic configuration of a profile/level information coding unit 2211 according to the embodiment of the present invention.

FIG. 24 is a functional block diagram illustrating a configuration of the profile/level information coding unit 2211. As illustrated in FIG. 24, the profile/level information coding unit 2211 includes a profile information coding unit 2221a, a level information coding unit 2221b, a sublayer profile present flag coding unit 2221c, a sublayer level present flag coding unit 2221d, and a byte-aligned data coding unit 2221e. In addition, the profile/level information coding unit 2211 according to Example 1 codes the profile information, the level information, the sublayer profile present flag, the sublayer level present flag, the sublayer profile information, the sublayer level information, and the byte-aligned data, in respective functional blocks, according to the syntax definition of the profile/level information profile_tier_level( ) illustrated in FIG. 11.

[Profile Information Coding Unit 2221a]

The profile information coding unit 2221a codes profile information regarding the target layer which is supplied from the outside based on the profile present flag ProfilePresentFlag, and outputs the coded data. Specifically, when the profile present flag ProfilePresentFlag is 1, the profile information regarding the target layer is coded. When the profile present flag ProfilePresentFlag is 0, the profile information is not coded.

Further, the profile information coding unit 2221a codes the sublayer profile information regarding each sublayer which is supplied from the outside, based on the profile present flag ProfilePresentFlag, the number of sublayers MaxNumSubLayers, and the sublayer profile present flag of each sublayer sub_layer_profile_prenset_flag[i]. Specifically, when the profile present flag is 1, and the sublayer profile present flag of the sublayer i (temporalId=i+1) is 1, the corresponding sublayer profile information is coded. Otherwise, the sublayer profile information regarding the sublayer i is not coded.

[Level Information Coding Unit 2221b]

The level information coding unit 2221b codes the level information regarding the target layer which is supplied from the outside, and outputs the coded data. Further, the level information coding unit 2221b codes the sublayer level information regarding each sublayer which is supplied from the outside, based on the number of sublayers MaxNumSubLayers, and the sublayer level present flag of each sublayer sub_layer_level_present_flag[i], and outputs the coded data. Specifically, when the sublayer level present flag sub_layer_level_present_flag[i] is 1, the sublayer level information regarding the corresponding sublayer i (temporalId=i+1) is coded. Otherwise (sublayer level present flag sub_layer_level_present_flag[i] is 0), the sublayer level information regarding the sublayer i is not coded.

[Sublayer Profile Present Flag Coding Unit 2221c]

The sublayer profile present flag coding unit 2221c codes the sublayer profile present flag of each sublayer which is supplied from the outside, based on the number of sublayers MaxNumSubLayers, and outputs the coded flag.

[Sublayer Level Present Flag Coding Unit 2221d]

The sublayer level present flag coding unit 2221d codes the sublayer level present flag of each sublayer which is supplied from the outside, based on the number of sublayers MaxNumSubLayers, and outputs the coded flag.

[Byte-Aligned Data Coding Unit 2221e]

Until the current position (per bit) of the coded data is a byte boundary, in other words, a bit located in the next position of the current position on the coded data is a first bit of a byte, the byte-aligned data coding unit 2221e inserts (codes) the byte-aligned data alignment_bit per bit into the coded data.

<<Modification 1>>

Hereinafter, a configuration of the profile/level information coding unit 2211 corresponding to Modification 1 of the profile/level information decoding unit 1211 according to Example 1 will be described.

Further, the profile/level information coding unit 2211 may code the profile/level information as follows, in addition to the profile/level information profile_tier_level( ) shown in FIG. 11, for example, as illustrated in FIG. 13, As illustrated in the portions respectively denoted by the symbols SYNA201 and SYNA202 in FIG. 13, the sublayer profile present flag and the sublayer level present flag are separately signaled, As illustrated in the portion denoted by the symbol SYNA201 in FIG. 13, only when the profile present flag is 1, the sublayer profile present flag is signaled, As illustrated in the portions respectively denoted by the symbols SYNA201 and SYNA202 in FIG. 13, byte-aligned data is inserted respectively after the sublayer profile present flag and the sublayer level present flag. In this case, when the profile present flag ProfilePresentFlag is 0, since the sublayer profile present flag of the sublayer is not coded, as compared to the related art, there is an effect of reducing the symbol amount regarding the profile/level information.

Further, since all of the profile/level information is byte-aligned, it is possible to reduce the number of times of memory access regarding reading/writing when decoding/coding the sublayer profile present flag, the sublayer level present flag, the sublayer profile information, and the sublayer level information. In other words, there is an effect of reducing a processing amount required for decoding/coding the profile/level information.

<<Modification 2>>

Hereinafter, a configuration of the profile/level information coding unit 2211 corresponding to Modification 2 of the profile/level information decoding unit 1211 according to Example 1 will be described.

Further, the profile/level information coding unit 2211 may code the profile/level information as follows, in addition to the profile/level information profile_tier_level( ) shown in FIG. 11, for example, as illustrated in FIG. 15, As illustrated in the portions respectively denoted by the symbols SYNA302 and SYNA304 in FIG. 15, the tier flag general_tier_flag, the level identifier general_level_idc, the sublayer tier flag sub_layer_tier_flag [i], and the sublayer level identifier sub_layer_level_idc[i] are respectively signaled such that the signals of the syntax, and the tier flag general_tier_flag/sublayer tier flag sub_layer_tier_flag[i] which are related to the level information are not be dependent on the profile present flag ProfilePresentFlag/sublayer profile present flag sub_layer_profile_present_flag[i], Profile/level information in which the symbol lengths of the profile space general_profile_space denoted by the symbol SYNA301 and the sublayer profile space sub_layer_profile_space[i] denoted by the symbol SYNA303 in FIG. 15 are changed from two bits to three bits, and the symbol lengths of the level identifier general_level_idc denoted by the symbol SYNA305 and the sublayer level identifier denoted by the symbol SYNA306 in FIG. 15 are changed from eight bits to seven bits may be coded such that all of the profile/level information is byte-aligned.

In this case, the decoder can acquire a constraint of a level determined by the level identifier general_level_idc and the tier flag general_tier_flag, without being dependent on the value of the profile present flag ProfilePresentFlag.

Similarly, also in the sublayer, the decoder can acquire a constraint of a level determined by the sublayer level identifier sub_layer_level_idc[i] and the sublayer tier flag sub_layer_tier_flag[i], without being dependent on the values of the profile present flag and the sublayer profile present flag. In other words, locally the level identifier and the tier flag are signaled, such that the decoder can easily specify whether or not the coded data can be decoded. Further, since all of the profile/level information is byte-aligned, it is possible to reduce the number of times of memory access regarding reading/writing when decoding/coding each syntax of the profile/level information. In other words, there is an effect of reducing a processing amount required for decoding/coding the profile/level information.

<<Modification 2a>>

Hereinafter, a configuration of the profile/level information coding unit 2211 corresponding to Modification 2a of the profile/level information decoding unit 1211 according to Example 1 will be described.

Further, the profile/level information coding unit 2211 may code the profile/level information in which the syntax, and the tier flag general_tier_flag/sub_layer_tier_flag[i] regarding the tier tier, instead of the profile/level information illustrated in FIG. 15, are respectively replaced with the tier identifiers general_tier_idc/sub_layer_idc[i] which are extended from one bit to eight bits as denoted by symbols SYN302a and SYN304a in FIG. 16. In this case, since the tier has the values of 0 to 255, it allows the parameters regarding the level constraints determined by the level identifier and the tier to have scalability. Further, since all of the profile/level information is byte-aligned, it is possible to reduce the number of times of memory access regarding reading/writing when decoding/coding each syntax of the profile/level information. In other words, there is an effect of reducing a processing amount required for decoding/coding the profile/level information.

<<Modification 3>>

Hereinafter, a configuration of the profile/level information coding unit 2211 corresponding to Modification 3 of the profile/level information decoding unit 1211 according to Example 1 will be described.

Figure 25:
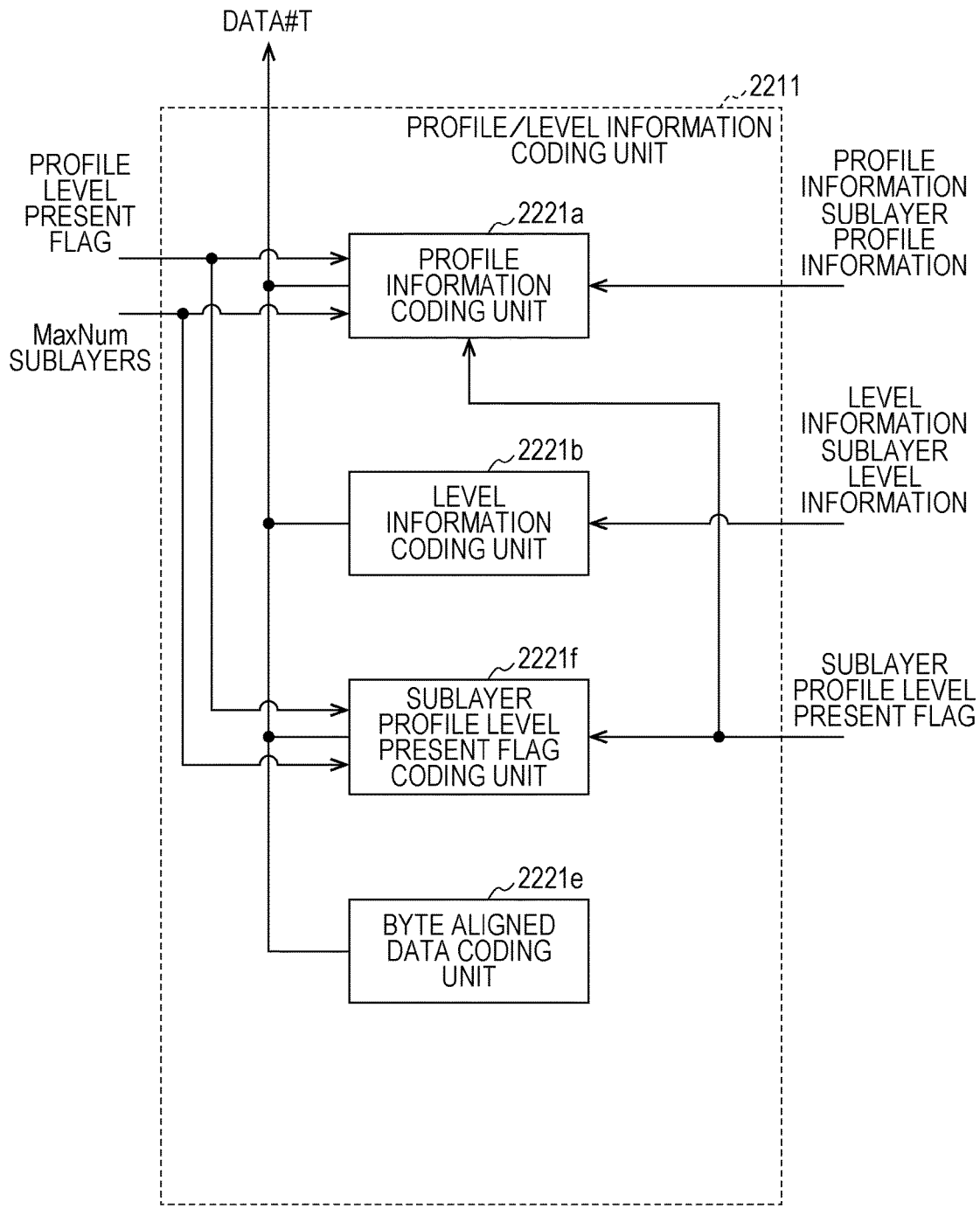
FIG. 25 is a functional block diagram illustrating another schematic configuration of the profile/level information coding unit 2211 according to the embodiment of the present invention (Modification 3).

Further, in order to reduce the redundancy of the signal of the level information, as illustrated in FIG. 17, the profile/level information coding unit 2211 may code the syntax of the profile/level information profile_tier_level( ) in which the profile present flag ProfilePresentFlag is replaced with the profile level present flag ProfileLevelPresentFlag indicating whether or not to present the profile information and the level information, and similarly, the sublayer profile present flag and the sublayer level present flag are replaced with the sublayer profile level present flag sub_layer_profile_level_present_flag indicating whether or not to present the sublayer profile information and the sublayer level information. In this case, as illustrated in FIG. 25, the profile/level information coding unit 2211 includes a profile information coding unit 2221a, a level information coding unit 2221b, a sublayer profile level present flag coding unit 2221f, and a byte-aligned data coding unit 2221e. In addition, since the profile information coding unit 2221a, the level information coding unit 2221b, and the byte-aligned data coding unit 2221e are the same as in Example 1, the description thereof will be omitted. However, it is assumed that the profile present flag ProfilePresentFlag in Example 1 is interpreted by being replaced with the profile level present flag ProfileLevelPresentFlag, and the sublayer profile present flag/sublayer level present flag is interpreted by being replaced with the sublayer profile level present flag.

[Sublayer Profile Level Present Flag Decoding Unit 2221*f*]

The sublayer profile level present flag coding unit 2221*f* codes the sublayer profile level present flag of each sublayer, based on the profile level present flag ProfileLevelPresentFlag and the number of sublayers MaxNumSubLayers, and outputs the coded data.

(Notes)

Further, in the related art (NPL 1), since there is no constraint between the sublayer profile information and the sublayer level information regarding the sublayer (sublayer profile/sublayer level/sublayer tier) and the profile information and the level information (profile/level/tier) to be referred to in order to decode the target layer, there is a problem in that the implementation load of the image decoding device is high (the complexity of the image decoding device is increased). For example, it is assumed that in FIG. 3(*a*), the profile of the target layer L#N and respective sublayer profiles of the sublayers SL#4 to SL#1 included in the target layer L#N are coded by configuration of three types of profiles as follows, the profile of the target layer L#N: "high profile", the profile (sublayer profile) of the sublayer SL#1: "base profile", the profile (sublayer profile) of the sublayer SL#2: "high profile", the profile (sublayer profile) of the sublayer SL#3: "high profile", and the profile (sublayer profile) of the sublayer SL#4: "main profile". Here, it is assumed that "high profile" is a higher profile of supporting all coding tools of "main profile", and "main profile" is a higher profile of supporting all coding tools of "base profile". In other words, the relationship between the profiles is "base profile"<"main profile"<"high profile".

In the case of this example, in the image decoding device supporting the profile "high profile", it is possible to decode the sublayers SL#1 to SL#4 in the target layer L#N. In other words, it is possible to completely decode the target layer L#N. However, in the image decoding device supporting the profile "main profile", since the profiles of the lower sublayers (SL#2, SL#3) are not compatible with the profile of the higher sublayer (SL#4), it is not possible to decode the lower sublayers (SL#2, SL#3) on which the sublayer SL#4 is dependent during decoding of the sublayer SL#4, and the higher sublayer SL#4, and it is possible to decode only the lowest sublayer SL#1 which is the lower profile "base profile". In other words, there is a possibility in that the image coding device generates coded data in which profiles are discontinuously configured in which the profile of the lower sublayer is not compatible with the profile of the higher sublayer. Therefore, when the image decoding device decodes the coded data, it is not possible to decode the lower sublayer to be decoded on which another sublayer is dependent, and as a result, there is a problem in that the granularity of time scalability becomes rough.

Further, in order for the image decoding device to flexibly realize scalability for such coded data, it needs to be implemented to support a plurality of profiles, such that there is a problem in that the complexity of the image decoding device is increased.

Thus, in order to solve the problem, it is preferable to provide the following constraints for the profile of the target layer and the profiles of the sublayers belonging to the target layer (sublayer profiles).

(1-1) Configuring the profile of the target layer so as to be the same as the profile of the highest sublayer included in the target layer.

(1-2) Configuring the profile of the higher sublayer to be equal to or greater than the profile of the lower sublayer on which the higher sublayer is dependent during decoding.

The image decoding device and the image coding device configure in advance the constraints of the profiles, such that there is an effect of preventing the generation of the coded data in which profiles are discontinuously configured in which the profile of the lower sublayer is not compatible with the profile of the higher sublayer. Further, since it is possible to suppress the profile to which the image decoding device corresponds, to a necessary minimum value, there is an effect of reducing the complexity of the image decoding device.

Further, the syntax (profile constraint flag "profile_restrict_flag") indicating whether or not to perform the constraint regarding the profile of the target layer and the profile of the sublayer belonging to the target layer may explicitly be decoded/coded by the header information decoding unit 121 and the header information coding unit 221, immediately before the profile/level information profile_tier_level( ), in the sequence layer such as the video parameter set VPS or the sequence parameter set SPS. In addition to the same effect described above, there is an effect that the image decoding device can easily determine whether there is the profile constraint at each layer on the VPS or the SPS in advance, prior to decoding the profile/level information profile_tier_level( ).

Similarly, with respect to the level/tier, since there is no constraint between the level/tier of the target layer and the sublayer level/sublayer tier of the sublayer belonging to the target layer, the same problem as in the case without the profile constraint occurs. In other words, there is a possibility in that the image coding device generates coded data in which the level and the tier are discontinuously set in which the level and the tier of the lower sublayer is not compatible with the level and the tier of the higher sublayer, and there is a problem in that the granularity of time scalability becomes rough and flexibility is impaired in the image decoding device.

Further, in order for the image decoding device to flexibly realize the scalability for the coded data, it needs to be implemented to support a plurality of levels and tiers, and thus there is a problem of an increase in the complexity of the image decoding device.

Thus, in order to solve the problem, it is preferable to provide the following constraints between the level/tier of the target layer and the levels/tiers of the sublayers belonging to the target layer (sublayer level/sublayer tier).

The constraints regarding a level is (2-1) Setting the level of the target layer so as to be the same as the level of the highest sublayer included in the target layer.

(2-2) Setting the level of the higher sublayer to be equal to or greater than the level of the lower sublayers on which the higher sublayer is dependent during decoding.

The constraints regarding a tier is (3-1) Setting the tier of the target layer so as to be the same as the tier of the highest sublayer included in the target layer.

(3-2) Setting the tier of the higher sublayer to be equal to or greater than the tier of the lower sublayers on which the higher sublayer is dependent during decoding.

The image decoding device and the image coding device configure in advance the constraints of the level/tier, such that there is an effect of preventing the generation of the coded data in which levels are discontinuously set in which the level and the tier of the lower sublayer are not compatible with the level and the tier of the higher sublayer. Further, since it is possible to suppress the level and the tier to which the image decoding device corresponds, to necessary minimum values, there is an effect of reducing the complexity of the image decoding device.

Further, the syntax (level tier constraint flag "level_tier_restrict_flag") indicating whether or not to perform the constraint regarding the tier/level of the target layer and the tier/level of the sublayer belonging to the target layer may explicitly be decoded/coded by the header information decoding unit 121 and the header information coding unit 221, immediately before the profile/level information profile_tier_level( ), in the sequence layer such as the video parameter set VPS or the sequence parameter set SPS. In addition to the same effect described above, there is an effect of being able to easily determine whether there is the level/tier constraint at each layer on the VPS or the SPS in advance.

Further, the image decoding device and the image coding device set in advance the profile constraint and the level/tier constraints, such that there is an effect of preventing the generation of coded data in which levels are discontinuously set in which the profile, the level, and the tier of the lower sublayer are not compatible with the profile, the level and the tier of the higher sublayer. Further, since it is possible to suppress the profile, the level, and the tier to which the image decoding device corresponds, to necessary minimum values, there is an effect of reducing the complexity of the image decoding device.

Further, syntax (profile level tier constraint flag "profile_level_tier_restrict_flag") indicating whether or not to perform the profile constraint and the level/tier constraints may respectively explicitly be decoded/coded by the header information decoding unit 121 and the header information coding unit 221, immediately before the profile/level information (profile_tier_level( )), in the sequence layer such as the video parameter set VPS or the sequence parameter set SPS. In addition to the same effect described above, there is an effect that the image decoding device can easily determine whether there is the profile constraint and the level/tier constraints at each layer on the VPS or the SPS in advance, prior to decoding the profile/level information profile_tier_level( ).

(Application Example to Another Hierarchical Moving Image Coding/Decoding System)

The hierarchical moving image coding device 2 and the hierarchical moving image decoding device 1 which are described above can be used by being mounted in various devices that perform transmission, reception, recording, and playing of the moving image. In addition, the moving image may be a natural moving image which is captured by a camera and the like, or an artificial moving image (including a CG and a GUI) which is generated by a computer or the like.

First, a fact that the hierarchical moving image coding device 2 and the hierarchical moving image decoding device 1, which are described above, can be used for transmitting and receiving a moving image will be described with reference to FIG. 26.

Figure 26:
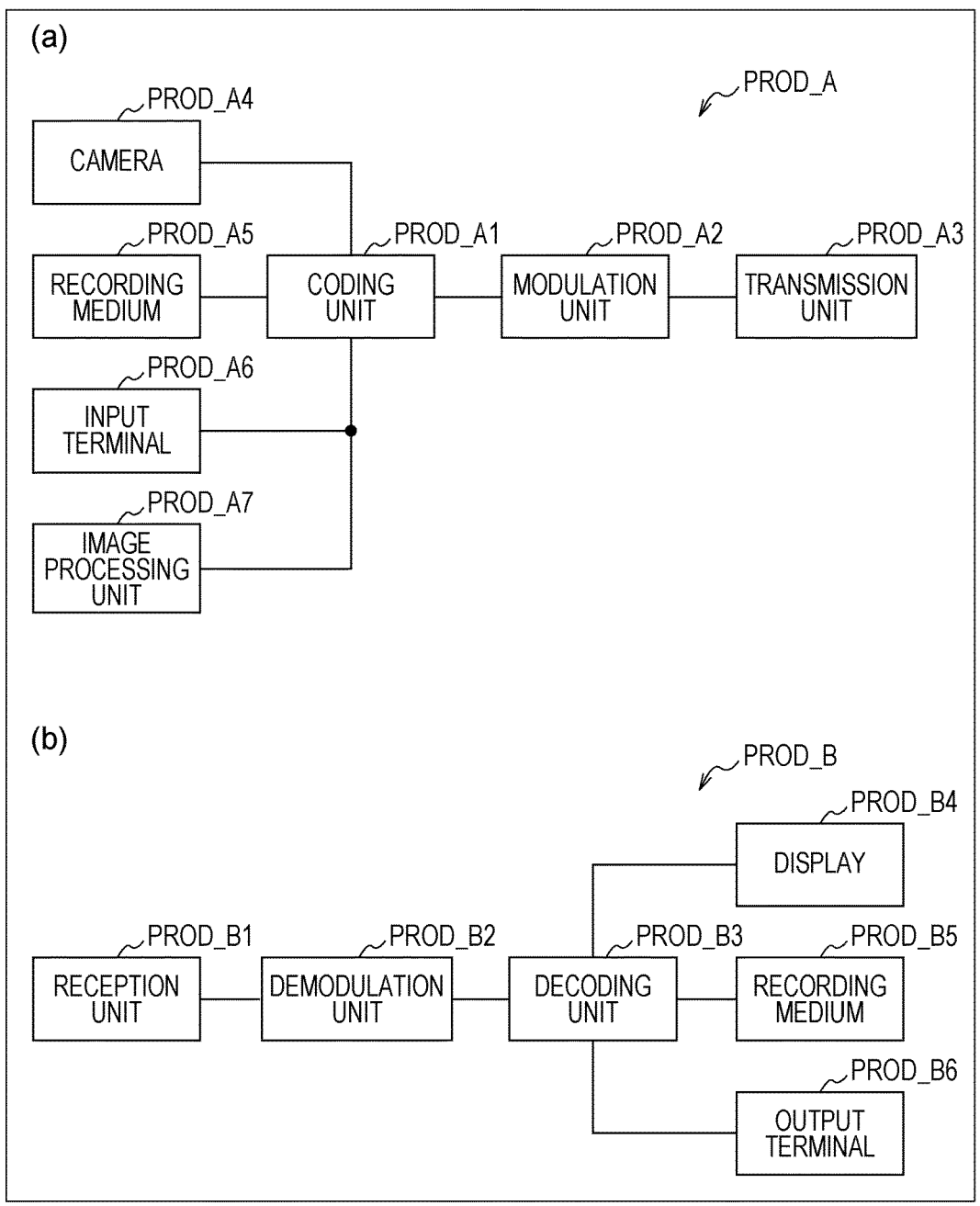
FIG. 26 is a diagram illustrating configurations of a transmission device equipped with the hierarchical moving image coding device and a reception device equipped with the hierarchical moving image decoding device. (a) illustrates the transmission device equipped with the hierarchical moving image coding device, and (b) illustrates the reception device equipped with the hierarchical moving image decoding device.

(a) of FIG. 26 is a block diagram illustrating a configuration of a transmission device PROD-A equipped with the hierarchical moving image coding device 2. As illustrated in (a) of FIG. 26, the transmission device PROD-A includes a coding unit PROD-A1 that obtains coded data by coding a moving image, a modulation unit PROD-A2 that obtains a modulation signal by modulating a carrier with the coded data obtained by the coding unit PROD-A1, and a transmission unit PROD-A3 that transmits the modulation signal obtained by the modulation unit PROD-A2. The hierarchical moving image coding device 2 described above is used as the coding unit PROD-A1.

The transmission device PROD-A may further include a camera PROD-A4 that captures a moving image, as a source of a moving image to be input to the coding unit PROD-A1, a recording medium PROD-A5 that records a moving image, an input terminal PROD-A6 for inputting a moving image from an outside, and an image processing unit A7 that generates and processes an image. (a) of FIG. 26 illustrates a configuration in which the transmission device PROD-A includes all these, but some parts may be omitted.

In addition, the recording medium PROD-A5 may record the moving image which is not coded, or may record a moving image which has been coded by a coding scheme for recording different from the coding scheme for transmission. In the latter case, a decoding unit (not shown) that decodes the coded data which is read from the recording medium PROD-A5 according to the coding scheme for recording may be interposed between the recording medium PROD-A5 and the coding unit PROD-A1.

(b) of FIG. 26 is a block diagram illustrating a configuration of a reception device PROD-B equipped with the hierarchical moving image decoding device 1. As illustrated in (b) of FIG. 26, the reception device PROD-B includes a reception unit PROD-B1 that receives a modulation signal, a demodulation unit PROD-B2 that obtains coded data by demodulating the modulation signal received by the reception unit PROD-B1, and a decoding unit PROD-B3 that obtains a moving image by decoding the coded data obtained by the demodulation unit PROD-B2. The hierarchical moving image decoding device 1 described above is used as the decoding unit PROD-B3.

The reception device PROD-B may further include a display PROD-B4 that displays a moving image, as a source of the moving image that is output by the decoding unit PROD-B3, a recording medium PROD-B5 that records the moving image, and an output terminal PROD-B6 for outputting the moving image to the outside. (b) of FIG. 26 illustrates a configuration in which the reception device PROD-B includes all these, but some parts may be omitted.

In addition, the recording medium PROD-B5 may record the moving image which is not coded, or may be a moving image which has been coded by a coding scheme for recording different from the coding scheme for transmission. In the latter case, a coding unit (not shown) that codes the moving image which is acquired from the decoding unit PROD-B3 according to the coding scheme for recording may be interposed between the decoding unit PROD-B3 and the recording medium PROD-B5.

In addition, the transmission medium for transmitting the modulation signal may be a wireless transmission medium, and a wired transmission medium. Further, the transmission mode for transmitting the modulation signal may be broadcasting (here, indicating a transmission mode in which a transmission destination is not specified in advance) and communication (here, indicating a transmission mode in which a transmission destination is not specified in advance). In other words, the transmission of the modulation signal may be realized by any of wireless broadcasting, wired broadcasting, wireless communication, and wireless communication.

For example, a broadcasting station (such as broadcasting equipment)/a receiving station (such as a television receiver) of terrestrial digital broadcasting are an example of the transmission device PROD-A/reception device PROD-B that respectively transmits and receives a modulation signal in radio broadcasting. Further, a broadcasting station (such as broadcasting equipment)/a receiving station (such as a television receiver) of cable television broadcasting are an example of the transmission device PROD-A/reception device PROD-B that respectively transmits and receives a modulation signal in wired broadcasting.

A server (such as a workstation)/a client (a television receiver, a personal computer, a smart phone, and the like) of a video on demand (VOD) service and a moving image sharing service using an inter-network are an example of the transmission device PROD-A/reception device PROD-B that respectively transmits and receives a modulation signal in communication (typically, either wired or wireless is used as a transmission medium in a LAN, and a wired can be used as a transmission medium in a WAN). Here, examples of the personal computer include a desktop PC, a laptop PC, and a tablet PC. Further, examples of the smart phone include a multi-functional mobile phone terminal.

In addition, the client of the moving image sharing service has a function of coding a moving image which has been captured by a camera and uploading the image to the server, in addition to a function of decoding coded data which has been downloaded from the server and displays the data on a display. In other words, the client of the moving image sharing service functions as both the transmission device PROD-A and the reception device PROD-B.

Next, the recording and playback of a moving image by the hierarchical moving image coding device 2 and the hierarchical moving image decoding device 1 that are described above will be will be described with reference to FIG. 27.

Figure 27:
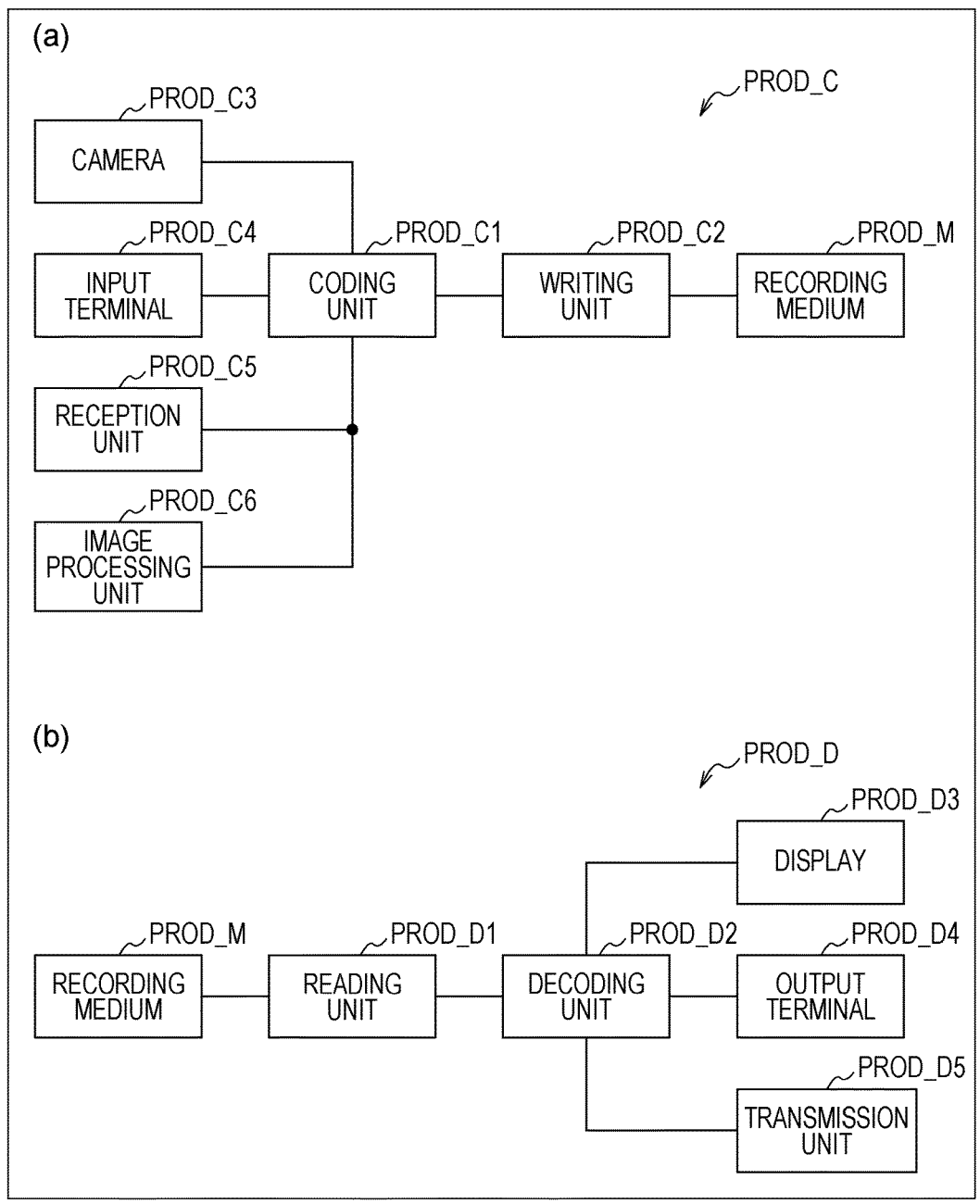
FIG. 27 is a diagram illustrating configurations of a recording device equipped with the hierarchical moving image coding device and a playback device equipped with the hierarchical moving image decoding device. (a) illustrates the recording device equipped with the hierarchical moving image coding device. (b) illustrates the playback device equipped with the hierarchical moving image decoding device.

(a) of FIG. 27 is a block diagram illustrating a configuration of the recording device PROD-C equipped with the hierarchical moving image coding device 2 described above. As illustrated in (a) of FIG. 27, the recording device PROD-C includes the coding unit PROD-C1 that obtains coded data by coding a moving image, and the writing unit PROD-C2 that writes the coded data obtained by the coding unit PROD-C1 to the recording medium PROD-M. The hierarchical moving image coding device 2 described above is used as the coding unit PROD-C1.

In addition, the recording medium PROD-M, (1) may be a type incorporated in the recording device PROD-C, such as the hard disk drive (HDD) and a solid state drive (SDD), (2) may also be a type that is connected to the recording device PROD-C, such as an SD memory card, and a universal serial bus (USB) flash memory, or (3) may be mounted on a drive device (not shown) incorporated in the recording device PROD-C, such as a digital versatile disc (DVD) or a Blu-ray Disc (BD (registered trademark)).

Further, the recording device PROD-C may further include a camera PROD-C3 capturing a moving image, an input terminal PROD-C4 inputting an moving image from the outside, the reception unit PROD-C5 receiving an moving image, and the image processing unit C6 generating or processing an image, as a source of a moving images to be input to the coding unit PROD-C1. In (a) of FIG. 27, all these are exemplified as components included in the recording device PROD-C, but some may be omitted.

In addition, the reception unit PROD-C5 may receive a moving image that has not be coded, and may receive coded data which has been coded in a transmission coding scheme different from a recording coding scheme. In the latter case, a transmission decoding unit (not shown) that decodes the coded data in the transmission coding scheme may be interposed between the reception unit PROD-C5 and the coding unit PROD-C1.

Examples of the recording device PROD-C include, for example, a DVD recorder, a BD recorder, and a hard disk drive (HDD) recorder (in this case, the input terminal PROD-C4 or the reception unit PROD-C5 are the main source of a moving image). Further, a camcorder (in this case, the camera PROD-C3 is the main source of a moving image), a personal computer (in this case, the reception unit PROD-C5 or the image processing unit C6 are the main source of a moving image), a smart phone (in this case, the camera PROD-C3 or the reception unit PROD-C5 are the main source of the moving image) and the like are the examples of the recording device PROD-C.

(b) of FIG. 27 is a block diagram illustrating a configuration of a playback device PROD-D equipped with the hierarchical moving image decoding device 1 described above. As illustrated in (b) of FIG. 27, the playback device PROD-D includes a reading unit PROD-D1 that reads coded data that is written in the recording medium PROD-M, and a decoding unit PROD-D2 that obtains a moving image by decoding the coded data that is read by the reading unit PROD-D1. The hierarchical moving image decoding device 1 described above is used as the decoding unit PROD-D2.

In addition, the recording medium PROD-M (1) may be a type incorporated in the playback device PROD-D such as a HDD or an SSD, (2) may also be a type that is connected to the playback device PROD-D, such as an SD memory card, or a USB flash memory, or (3) may be mounted on a drive device (not shown) incorporated in the playback device PROD-D, such as a DVD or a BD.

Further, the playback device PROD-D may further include a display PROD-D3 displaying a moving image, an output terminal PROD-D4 outputting a moving image to the outside, and a transmission unit PROD-D5 transmitting a moving image, as a source of a moving image that is output by the decoding unit PROD-D2. In (b) of FIG. 27, all these are exemplified as components included in the playback device PROD-D, but some may be omitted.

In addition, the transmission unit PROD-D5 may transmit a moving image that has not be coded, and may transmit coded data which has been coded in a transmission coding scheme different from a recording coding scheme. In the latter case, a coding unit (not shown) that codes a moving image in the transmission coding scheme may be interposed between the decoding unit PROD-D2 and the transmission unit PROD-D5.

Examples of the playback device PROD-D includes, for example, a DVD player, a BD player, a HDD player, and the like (in this case, the output terminal PROD-D4 connected to a television receiver or the like is the main source of a moving image). Further, a television receiver (in this case, the display PROD-D3 is the main source of a moving image), a digital signage (also referred to as a digital signage and an electronic bulletin board, and the display PROD-D3 or the transmission unit PROD-D5 are the main destination of a moving image), a desktop PC (in this case, the output terminal PROD-D4 or the transmission unit PROD-D5 is the main destination of a moving image), a laptop or tablet PC (in this case, the display PROD-D3 or the transmission unit PROD-D5 is the main destination of a moving image), a smartphone (in this case, the display PROD-D3 or the transmission unit PROD-D5 is the main destination of a moving image) are the examples of the playback device PROD-D.

[Summary]

An image decoding device according to an aspect of the present invention is an image decoding device which decodes hierarchically coded data obtained by hierarchically coding image information regarding images of different qualities for respective layers, and restores an image of a target layer to be decoded, the image decoding device includes profile information decoding means (profile information decoding unit 1221*a*) for decoding profile information regarding the target layer from the coded data, in a case where a profile present flag indicates that the profile information regarding the target layer is to be presented, and configuring profile information regarding a predetermined decoded layer to profile information regarding a target layer, in a case where the profile present flag indicates that profile information regarding a target layer is not presented, in which the profile present flag (ProfilePresentFlag) indicates whether or not to present profile information indicating that coded data of the target layer can be decoded by an image decoding device including which profile, level information decoding means (level information decoding unit 1221*b*) for decoding level information indicating that the coded data of the target layer can be decoded by an image decoding device including which level, from the coded data, sublayer profile present flag decoding means (sublayer profile present flag decoding unit 1221*c*) for decoding a sublayer profile present flag (sub_layer_profile_flag) indicating whether or not to present sublayer profile information regarding each sublayer included in the target layer, from the coded data, sublayer level present flag decoding means (sublayer level present flag decoding unit 1221*d*) for decoding a sublayer level present flag (sub_layer_level_flag) indicating whether or not to present sublayer level information regarding each sublayer included in the target layer, from the coded data, sublayer profile information decoding means (profile information decoding unit 1221*a*) for decoding the sublayer profile information regarding each sublayer included in the target layer, in a case where after the decoding of the sublayer profile present flag regarding each sublayer, the sublayer profile present flag indicates that the sublayer profile information is presented, and configuring the profile information regarding the target layer to the sublayer profile information regarding the sublayer in a case where the sublayer profile present flag indicates that the sublayer profile information is not presented, and sublayer level information decoding means (level information decoding unit 1221*b*) for decoding the sublayer level information regarding each sublayer included in the target layer, in a case where after the decoding of the sublayer level present flag regarding each sublayer, the sublayer level present flag indicates that the sublayer level information is presented, and configuring the level information regarding the target layer to the sublayer level information regarding the sublayer in a case where the sublayer level present flag indicates that the sublayer level information is not presented.

According to the above configuration, after decoding the sublayer profile present flag and/or the sublayer level present flag regarding each sublayer, the sublayer profile information and/or sublayer level information are decoded or configured.

In other words, according to the configuration, the sublayer profile present flag and the sublayer level present flag corresponding to each sublayer, and the sublayer profile information and the sublayer level information corresponding to each sublayer are separately decoded.

Therefore, it is possible to easily specify an offset per bit until decoding start points of sublayer profile information and sublayer level information regarding a specific sublayer, based on a value of the sublayer profile present flag, a symbol amount of the sublayer profile information, a value of the sublayer level present flag, and a symbol amount of the sublayer level information.

Accordingly, there is an effect of reducing a processing amount required for decoding the sublayer profile information and the sublayer level information.

The image decoding device according to an aspect of the present invention may further include a byte-aligned data decoding means (byte-aligned data decoding unit 1221*e*) for decoding byte-aligned data until the decoding start position is located in a byte boundary, from the coded data, after decoding the sublayer profile present flag and the sublayer level present flag.

According to the configuration, the sublayer profile present flag and the sublayer level present flag corresponding to each sublayer, and the sublayer profile information and the sublayer level information corresponding to each sublayer are separately decoded, and byte-aligned data which is inserted for byte alignment between both (between the sublayer profile present flag and the sublayer level present flag, and the sublayer profile information and the sublayer level information) is further decoded.

Accordingly, as compared to the related art, it is possible to performing decoding in a state where all syntax of the profile/level information is byte-aligned. Therefore, it is possible to reduce the number of times of memory access regarding reading when decoding the sublayer profile present flag, the sublayer level present flag, the sublayer profile information, and the sublayer level information. In other words, there is an effect of reducing a processing amount required for decoding the profile/level information.

In the image decoding device according to an aspect of the present invention, when the profile present flag indicates that the profile information is presented, the sublayer profile present flag decoding means may decode the sublayer profile present flag from the coded data, and when the profile present flag indicates that the profile information is not presented, the sublayer profile present flag decoding means may set a value indicating not to present sublayer profile information in the sublayer profile present flag.

According to the configuration, when profile present flag indicates that the profile information is not presented, it is estimated that the sublayer profile present flag of the sublayer is not presented, and the sublayer profile present flag is not explicitly decoded, such that as compared to the related art, there is an effect of reducing a processing amount for decoding the sublayer profile present flag.

In the image decoding device according to an aspect of the present invention, when the profile present flag indicates that the profile information is presented, the byte-aligned data decoding means may decode the byte-aligned data until the decoding start position is located in the byte boundary, from the coded data, after decoding the sublayer profile present flag.

According to the configuration, when the sublayer profile present flag and the sublayer level present flag corresponding to the sublayer are separately decoded and the profile present flag indicates that the profile information is presented, the byte-aligned data which is inserted for byte alignment therebetween is further decoded. Accordingly, as compared to the related art, it is possible to performing decoding in a state where all syntax of the profile/level information is byte-aligned. Therefore, it is possible to reduce the number of times of memory access regarding reading when decoding the sublayer profile present flag, the sublayer level present flag, the sublayer profile information, and the sublayer level information. In other words, there is an effect of reducing a processing amount required for decoding the profile/level information.

In the image decoding device according to an aspect of the present invention, when the profile present flag indicates that the profile information is presented, the profile information decoding means may decode at least, a profile space, a profile identifier, and profile compatibility information as the profile information, and the level information decoding means may decode a level identifier and a tier flag as the level information, without being dependent on the value of the profile present flag.

According to the configuration, it is possible to decode the level identifier and the tier flag without being dependent on the profile present flag. Therefore, as compared to the related art, even when the profile present flag indicates that the profile information is not presented, there is an effect of acquiring a constraint of a level determined by the level identifier and the tier flag, and of easily specifying whether a decoder is able to decode the coded data of the target layer.

In the image decoding device according to an aspect of the present invention, when the profile present flag indicates that the profile information is presented and the sublayer profile present flag indicates that the sublayer profile information is presented, the sublayer profile information decoding means may decode at least a sublayer profile space, a sublayer profile identifier, and sublayer profile compatibility information as the sublayer profile information, and the sublayer level information decoding means may decode a sublayer level identifier and a sublayer tier flag as the sublayer level information without being dependent on the value of the sublayer profile present flag.

According to the configuration, it is possible to decode the sublayer level identifier and the sublayer tier flag without being dependent on the profile present flag and the sublayer profile present flag. Therefore, as compared to the related art, even when the profile present flag or the sublayer profile present flag indicates that the profile information regarding the sublayer is not presented, there is an effect of acquiring a constraint of a level determined by the sublayer level identifier and the sublayer tier flag, with respect to the sublayer, and of easily specifying whether a decoder is able to decode the coded data of the sublayer included in the target layer.

The image decoding device according to an aspect of the present invention further includes constraint flag decoding means for decoding a constraint flag indicating whether or not to apply a profile constraint, a level constraint, or a tier constraint from the coded data, when the constraint flag indicates that the profile constraint is applied,
the profile information decoding means may
determine that a profile of a highest layer included in the target layer and a profile of the target layer is the same, and
determine that a profile of each sublayer is configured to be equal to or greater than a profile of a lower sublayer on which the highest sublayer is dependent during decoding,
when the constraint flag indicates that the level constraint is applied,
the level information decoding means may
determine that a level of the highest layer included in the target layer and a level of the target layer is the same, and
determine that a level of each sublayer is set to be equal to or greater than a level of a lower sublayer on which the highest sublayer is dependent during decoding, and
when the constraint flag indicates that the tier constraint is applied,
the level information decoding means may
determine that a tier of the highest layer included in the target layer and a tier of the target layer is the same, and
determine that a tier of each sublayer is set to be equal to or greater than a tier of a lower sublayer on which the highest sublayer is dependent during decoding.

According to the above configuration, the image decoding device can easily determine whether the profile, the level, and the tier of each sublayer belonging to the target sublayer and the profile, the level, and the tier of a higher sublayer are coded data which is discontinuously generated without compatibility, before decoding the profile information/level information. Further, there is an effect of preventing the generation of coded data in which the profile/level/tier not compatible with the profile, the level, and the tier of the higher sublayer are discontinuously set, by configuring whether or not to apply the profile constraint, the level constraint, and the tier constraint between the image decoding device and the image coding device. Further, since it is possible to suppress the profile, the level, and the tier to which the image decoding device corresponds, to necessary minimum values, there is an effect of reducing the complexity of the image decoding device.

An image decoding device according to an aspect of the present invention is an image decoding device which decodes hierarchically coded data obtained by hierarchically coding image information regarding images of different qualities for respective layers, and restores an image of a target layer to be decoded, the image decoding device includes profile information decoding means (profile information decoding unit 1221*a*) for decoding profile information regarding the target layer from the coded data, in a case where a profile level present flag (ProfileLevelPresentFlag) indicates that profile information and level information regarding the target layer are presented, and configuring profile information regarding a predetermined decoded layer to the profile information regarding the target layer, in a case where the profile level present flag indicates that the profile information and the level information regarding the target layer are not presented, in which the profile level present flag indicates whether or not to present the profile information and the level information respectively indicating that the coded data of the target layer can be decoded by an image decoding device including which profile and which level, level information decoding means (level information decoding unit 1221*b*) for decoding level information regarding the target layer from the coded data, in a case where the profile level present flag indicates that the profile information and the level information regarding the target layer are presented, and configuring level information regarding a predetermined decoded layer to the level information regarding the target layer, in a case where the profile level present flag indicates that the profile information and the level information regarding the target layer are not presented, sublayer profile level present flag decoding means for decoding a sublayer profile level present flag indicating whether or not to present sublayer profile information and sublayer level information regarding each sublayer included in the target layer, sublayer profile information decoding means (profile information decoding unit 1221a) for decoding the sublayer profile information regarding each sublayer included in the target layer, in a case where the sublayer profile level present flag indicates that the sublayer profile information and the sublayer level information are presented, and configuring the profile information regarding the target layer to the sublayer profile information regarding the sublayer, in a case where the sublayer profile level present flag indicates that the sublayer profile information and the sublayer level information are not presented, and sublayer level information decoding means (level information decoding unit 1221b) for decoding the sublayer level information regarding each sublayer included in the target layer, in a case where the sublayer profile level present flag indicates that the sublayer profile information and the sublayer level information are presented, and configuring the level information regarding the target layer to the sublayer level information regarding the sublayer, in a case where the sublayer profile level present flag indicates that the sublayer profile information and the sublayer level information are not presented.

According to the above configuration, when the profile and the level are in common in a plurality of layers, it is possible to omit presenting the profile information and the level information regarding the target layer. In other words, when the profile level present flag indicates that the profile information and the level information are not presented, since the profile information and the level information regarding a predetermined layer which is decoded is configured to the profile information and the level information regarding the target layer, and the profile information and the level information are not explicitly decoded, as compared to the related art, there is an effect of reducing a processing amount for decoding the profile information and the level information regarding the target layer.

Further, when the profile and the level of the target layer and the sublayer profile and the sublayer level of the sublayer included in the target layer are common, it is possible to omit presenting the sublayer profile information and the sublayer level information regarding the sublayer. In other words, when the sublayer profile level present flag indicates that the sublayer profile information and the sublayer level information are not presented, since the profile information and the level information regarding the target layer which is decoded is configured to the sublayer profile information and the sublayer level information regarding the target sublayer, and the sublayer profile information and the sublayer level information are not explicitly decoded, as compared to the related art, there is an effect of reducing a processing amount for decoding the sublayer profile information and the sublayer level information.

In addition, the image decoding device may include byte-aligned data decoding means for decoding the byte-aligned data until the decoding start position is located in the byte boundary, from the coded data, after decoding the sublayer profile level present flag.

According to the configuration, as compared to the related art, it is possible to performing decoding in a state where all syntax of the profile/level information is byte-aligned. Therefore, it is possible to reduce the number of times of memory access regarding reading when decoding the sublayer profile present flag, the sublayer level present flag, the sublayer profile information, and the sublayer level information. In other words, there is an effect of reducing a processing amount required for decoding the profile/level information.

The image coding device that is configured as described above belongs to the scope of the present invention, and also in this case, it is possible to obtain the same effects as in the image decoding device.

Further, a data structure of hierarchically coded data that is generated in the image coding device and decoded in the image decoding device also belongs to the scope of the present invention.

(Hardware Realization and Software Realization)

Finally, respective blocks of the hierarchical moving image decoding device 1 and the hierarchical moving image coding device 2 may be implemented in hardware by a logic circuit formed on an integrated circuit (IC chip), or may be implemented in software using a central processing unit (CPU).

In the latter case, the respective devices include a CPU that executes instructions of a control program for realizing each function, a read only memory (ROM) that stores the program, a random access memory (RAM) that deploys the program, and a memory (recording medium) that stores the program and various data. Then, the object of the present object may be realized by supplying a recording medium in which recording program codes of the control programs of the respective devices, which are software for realizing the functions described above (an executable program, an intermediate code program, and a source program), are recorded in a readable manner by the computer, to the respective devices, and by the computer (or a CPU or a micro processing unit (MPU)) reading and executing the program codes which are recorded on the recording medium.

As the recording medium, for example, tapes such as a magnetic tape or a cassette tape, disks including magnetic disk such as a floppy (registered trademark) disk/a hard disk, or an optical disk such as a compact disc read-only memory (CD-ROM)/a magneto-optical (MO)/a mini disc (MD)/a digital versatile disk (DVD)/a CD recordable (CD-R), cards such as an IC card (including a memory card)/an optical card, semiconductor memories such as a mask ROM/an erasable programmable read-only memory (EPROM)/an electrically erasable and programmable read-only memory (EEPROM (registered trademark))/a flash ROM, or logic circuits such as a programmable logic device (PLD) and a field programmable gate array (FPGA) can be used.

Further, the respective devices are configuration to be connected to a communication network, and the program codes may be supplied over the communications network. As long as any communication network is capable of transmitting the program codes, it is not particularly limited. For example, an inter-network, an intra-network, an extranet, a local area network (LAN), an integrated services digital network (ISDN), a value-added network (VAN), a community antenna television (CATV) communication network, a virtual private network, a telephone network, a mobile communication network, a satellite communication network and the like are available. Further, transmission media constituting the communication networks may be any medium capable of transmitting the program codes, and there is no restriction in a specific configuration or a type. For example, a wired medium such as the institute of electrical and electronic engineers (IEEE) 1394, a USB, a power-line carrier, a cable TV line, a telephone line, and an asymmetric digital subscriber line (ADSL) line, or a wireless medium such as an infrared ray such as an infrared data association (IrDA) or a remote control, Bluetooth (registered trademark), IEEE802.11 wireless, high data rate (HDR), near field communication (NFC), digital living network alliance (DLNA, registered trademark), a mobile telephone network, a satellite connection, a terrestrial digital network are available. In addition, the present invention may be realized in the form of a computer data signal embedded in a carrier wave, in which the program codes are embodied by electronic transmission.

The present invention is not limited to the examples described above, various variations are possible in the scope of claims, and examples obtained by appropriately combining technical means disclosed in the examples are also included in the technical scope of the present invention.

(Supplementary Note)

At least the following inventions are described in the present specification.

<1>

An image decoding device which decodes hierarchically coded data obtained by hierarchically coding image information regarding images of different qualities for respective layers, and restores an image of a target layer to be decoded, the image decoding device comprising:

profile information decoding means for decoding, from the coded data, profile information regarding the target layer, in a case where a profile present flag (ProfilePresentFlag) indicating whether or not to present profile information indicating that coded data of the target layer can be decoded by an image decoding device including which profile indicates that the profile information regarding the target layer is presented, and configuring profile information regarding a predetermined decoded layer to the profile information regarding the target layer, in a case where the profile present flag indicates that the profile information regarding the target layer is not presented;

level information decoding means for decoding, from the coded data, level information indicating that the coded data of the target layer can be decoded by an image decoding device including which level;

sublayer profile present flag decoding means for decoding, from the coded data, a sublayer profile present flag (sub_layer_profile_flag) indicating whether or not to present sublayer profile information regarding each sublayer included in the target layer;

sublayer level present flag decoding means for decoding, from the coded data, a sublayer level present flag (sub_layer_level_flag) indicating whether or not to present sublayer level information regarding each sublayer included in the target layer;

sublayer profile information decoding means for decoding the sublayer profile information regarding each sublayer included in the target layer, in a case where after the decoding of the sublayer profile present flag regarding each sublayer, the sublayer profile present flag indicates that the sublayer profile information is presented, and configuring the profile information regarding the target layer to the sublayer profile information regarding the sublayer in a case where the sublayer profile present flag indicates that the sublayer profile information is not presented; and sublayer level information decoding means for decoding the sublayer level information regarding each sublayer included in the target layer, in a case where after the decoding of the sublayer level present flag regarding each sublayer, the sublayer level present flag indicates that the sublayer level information is presented, and configuring the level information regarding the target layer to the sublayer level information regarding the sublayer in a case where the sublayer level present flag indicates that the sublayer level information is not presented.

<2>

The image decoding device according to <1>, further comprising: a byte-aligned data decoding means for decoding, from the coded data, byte-aligned data until the decoding start position is located in a byte boundary, after decoding the sublayer profile present flag and the sublayer level present flag.

<3>

The image decoding device according to <1> or <2>, wherein in a case where the profile present flag indicates that the profile information is presented, the sublayer profile present flag decoding unit decodes the sublayer profile present flag from the coded data, and in a case where the profile present flag indicates that the profile information is not presented, the sublayer profile present flag decoding unit sets a value indicating not to present sublayer profile information in the sublayer profile present flag.

<4>

The image decoding device according to <2>, wherein in a case where the profile present flag indicates that the profile information is presented, the byte-aligned data decoding unit decodes, from the coded data, the byte-aligned data until the decoding start position is located in the byte boundary, after decoding the sublayer profile present flag.

<5>

The image decoding device according to <1> or <2>, wherein in a case where the profile present flag indicates that the profile information is presented, the profile information decoding unit decodes at least, a profile space, a profile identifier, and profile compatibility information as the profile information, and the level information decoding unit decodes a level identifier and a tier flag as the level information, without being dependent on the value of the profile present flag.

<6>

The image decoding device according to <5>, wherein in a case where the profile present flag indicates that the profile information is presented and the sublayer profile present flag indicates that the sublayer profile information is presented, the sublayer profile information decoding unit decodes at least a sublayer profile space, a sublayer profile identifier, and sublayer profile compatibility information as the sublayer profile information, and the sublayer level information decoding unit decodes a sublayer level identifier and a sublayer tier flag as the sublayer level information without being dependent on the value of the sublayer profile present flag.

<7>

The image decoding device according to <1>, further comprising constraint flag decoding means for decoding, from the coded data, a constraint flag indicating whether or not to apply a profile constraint, a level constraint, or a tier constraint, wherein in a case where the constraint flag indicates to apply the profile constraint, the profile information decoding unit determines that a profile of a highest sublayer included in the target layer and a profile of the target layer are the same, and determines that a profile of each sublayer is configured to be equal to or greater than a profile of a lower sublayer on which the highest sublayer is dependent during decoding, in a case where the constraint flag indicates to apply the level constraint, the level information decoding unit determines that a level of the highest layer included in the target layer and a level of the target layer are the same, and determines that a level of each sublayer is set to be equal to or greater than a level of a lower sublayer on which the highest sublayer is dependent during decoding, and in a case where the constraint flag indicates to apply the tier constraint, the level information decoding unit determines that a tier of the highest layer included in the target layer and a tier of the target layer are the same, and determines that a tier of each sublayer is set to be equal to or greater than a tier of a lower sublayer on which the highest sublayer is dependent during decoding.

<8>

An image decoding device which decodes hierarchically coded data obtained by hierarchically coding image information regarding images of different qualities for respective layers, and restores an image of a target layer to be decoded, the image decoding device comprising:

profile information decoding means for decoding, from the coded data, profile information regarding the target layer, in a case where a profile level present flag (ProfileLevelPresentFlag) indicates whether or not to present the profile information and the level information respectively indicating that the coded data of the target layer can be decoded by an image decoding device including which profile and which level indicates that profile information and level information regarding the target layer are presented, and configuring profile information regarding a predetermined decoded layer to the profile information regarding the target layer, in a case where the profile level present flag indicates that the profile information and the level information regarding the target layer are not presented;

level information decoding means for decoding, from the coded data, level information regarding the target layer, in a case where the profile level present flag indicates that the profile information and the level information regarding the target layer are presented, and configuring level information regarding a predetermined decoded layer to the level information regarding the target layer, in a case where the profile level present flag indicates that the profile information and the level information regarding the target layer are not presented;

sublayer profile level present flag decoding means for decoding, form the coded data, a sublayer profile level present flag indicating whether or not to present sublayer profile information and sublayer level information regarding each sublayer included in the target layer;

sublayer profile information decoding means for decoding the sublayer profile information regarding each sublayer included in the target layer, in a case where the sublayer profile level present flag indicates that the sublayer profile information and the sublayer level information are presented, and configuring the profile information regarding the target layer to the sublayer profile information regarding the sublayer, in a case where the sublayer profile level present flag indicates that the sublayer profile information and the sublayer level information are not presented; and sublayer level information decoding means for decoding the sublayer level information regarding each sublayer included in the target layer, in a case where the sublayer profile level present flag indicates that the sublayer profile information and the sublayer level information are presented, and configuring the level information regarding the target layer to the sublayer level information regarding the sublayer, in a case where the sublayer profile level present flag indicates that the sublayer profile information and the sublayer level information are not presented.

INDUSTRIAL APPLICABILITY

The present invention is applicable to a hierarchical moving image decoding device that decodes coded data in which image data is hierarchically coded, and a hierarchical moving image coding device that generates coded data in which image data is hierarchically coded. Further, the present invention is suitably applicable to a data structure of the hierarchically coded data which is generated by the hierarchical moving image coding device and is referred to by the hierarchical moving image decoding device.

REFERENCE SIGNS LIST

1: HIERARCHICAL MOVING IMAGE DECODING DEVICE (IMAGE DECODING DEVICE)
11: NAL DEMULTIPLEXING UNIT
12: VARIABLE LENGTH DECODING UNIT
121: HEADER INFORMATION DECODING UNIT
1211: PROFILE/LEVEL INFORMATION DECODING UNIT
1221a: PROFILE INFORMATION DECODING UNIT
1221b: LEVEL INFORMATION DECODING UNIT
1221c: SUBLAYER PROFILE PRESENT FLAG DECODING UNIT
1221d: SUBLAYER LEVEL PRESENT FLAG DECODING UNIT
1221e: BYTE-ALIGNED DATA DECODING UNIT
1221f: SUBLAYER PROFILE LEVEL PRESENT FLAG DECODING UNIT
122: PREDICTION INFORMATION DECODING UNIT
123: TRANSFORM COEFFICIENT INFORMATION DECODING UNIT
14: PREDICTION PARAMETER RESTORATION UNIT
15: TEXTURE RESTORATION UNIT
16: BASE DECODING UNIT
2: HIERARCHICAL MOVING IMAGE CODING DEVICE (IMAGE CODING DEVICE)
21: PREDICTION PARAMETER DETERMINATION UNIT
22: VARIABLE-LENGTH CODING UNIT
221: HEADER INFORMATION CODING UNIT
2211: PROFILE/LEVEL INFORMATION CODING UNIT
2221a: PROFILE INFORMATION CODING UNIT
2221b: LEVEL INFORMATION CODING UNIT
2221c: SUBLAYER PROFILE PRESENT FLAG CODING UNIT
2221d: SUBLAYER LEVEL PRESENT FLAG CODING UNIT
2221e: BYTE-ALIGNED DATA CODING UNIT
2221f: SUBLAYER PROFILE LEVEL PRESENT FLAG CODING UNIT
222: PREDICTION INFORMATION CODING UNIT

223: TRANSFORM COEFFICIENT INFORMATION CODING UNIT
23: BASE DECODING UNIT
24: TEXTURE INFORMATION GENERATION UNIT
25: PREDICTION INFORMATION GENERATION UNIT
26: NAL MULTIPLEXING UNIT

The invention claimed is:

1. An image decoding device which decodes coded data obtained by coding image information, the image decoding device comprising:
 a processor; and
 a memory connected to the processor, wherein
 the processor receives a video parameter set,
 the processor decodes information for extension, having a code length of 16bits, in the video parameter set, and
 thereafter receives profile/level information included in the video parameter set,
 the processor decodes sublayer profile present flags, included in the profile/level information, indicating the presence or absence of sublayer profile information regarding respective sublayers,
 the processor decodes byte-aligned data, included in the profile/level information, determined based on the number of the sublayers, and
 the processor decodes each of the sublayer profile information, included in the profile/level information, regarding the respective sublayers when each of the sublayer profile present flags of the respective sublayers is equal to 1,
 a first bit of the profile/level information is byte-aligned by the information for extension, and
 a first bit of the sublayer profile information is byte-aligned by the byte-aligned data.

2. An image decoding method for decoding coded data obtained by coding image information, the image decoding method comprising:
 receiving a video parameter set,
 decoding information for extension, having a code length of 16bits, in the video parameter set, and
 thereafter receiving profile/level information included in the video parameter set,
 decoding sublayer profile present flags, included in the profile/level information, indicating the presence or absence of sublayer profile information regarding respective sublayers,
 decoding byte-aligned data, included in the profile/level information, determined based on the number of the sublayers, and
 decoding each of the sublayer profile information, included in the profile/level information, regarding the respective sublayers when each of the sublayer profile present flags of the respective sublayers is equal to 1,
 a first bit of the profile/level information is byte-aligned by the information for extension, and
 a first bit of the sublayer profile information is byte-aligned by the byte-aligned data.

* * * * *